US010916975B2

(12) United States Patent
Yoon et al.

(10) Patent No.: US 10,916,975 B2
(45) Date of Patent: Feb. 9, 2021

(54) MOTOR ASSEMBLY AND CLEANER HAVING SAME

(71) Applicant: Samsung Electronics Co., Ltd., Suwon-si (KR)

(72) Inventors: Keun Young Yoon, Osan-si (KR); Young Kwan Kim, Anyang-si (KR); Kwang Soo Kim, Seoul (KR); Deok Jin Kim, Hwaseong-si (KR); Mohammad Ali, Suwon-si (KR); Byung Ryel In, Suwon-si (KR); Jong Jin Park, Suwon-si (KR); Myung Bae Bang, Pyeongtaek-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 153 days.

(21) Appl. No.: 15/317,644

(22) PCT Filed: Mar. 31, 2015

(86) PCT No.: PCT/KR2015/003176
§ 371 (c)(1),
(2) Date: Dec. 9, 2016

(87) PCT Pub. No.: WO2015/190678
PCT Pub. Date: Dec. 17, 2015

(65) Prior Publication Data
US 2017/0126076 A1 May 4, 2017

(30) Foreign Application Priority Data

Jun. 10, 2014 (KR) ........................ 10-2014-0069826
Dec. 19, 2014 (KR) ........................ 10-2014-0184841

(51) Int. Cl.
H02K 1/14 (2006.01)
A47L 9/22 (2006.01)
(Continued)

(52) U.S. Cl.
CPC ............... *H02K 1/148* (2013.01); *A47L 5/28* (2013.01); *A47L 5/362* (2013.01); *A47L 9/22* (2013.01);
(Continued)

(58) Field of Classification Search
CPC ... A47L 5/28; A47L 5/362; A47L 9/22; A47L 9/28; F04D 17/16; F04D 25/0606;
(Continued)

(56) References Cited

U.S. PATENT DOCUMENTS 5,402,028 A 3/1995 Koeber et al.
5,703,426 A * 12/1997 Ueno ................. H02K 1/148
29/596

(Continued)

FOREIGN PATENT DOCUMENTS

EP 2 961 038 12/2015
JP 8-65979 3/1996
(Continued)

OTHER PUBLICATIONS

Australian Office Action dated Feb. 2, 2018 in Australian Patent Application No. 2015272357.
(Continued)

Primary Examiner — Shawki S Ismail
Assistant Examiner — Demetries A Gibson
(74) Attorney, Agent, or Firm — Staas & Halsey LLP

(57) ABSTRACT

Disclosed herein are a motor assembly and a cleaner having the same. The motor assembly includes a rotor configured to rotate and a stator configured to electromagnetically interact with the rotor. The stator includes a pair of stator bodies disposed to be symmetrical to each other with the rotor in between, each stator body having at least two stator cores arranged in parallel to each other.

21 Claims, 41 Drawing Sheets

(51) Int. Cl.
| | |
|---|---|
| *H02K 15/03* | (2006.01) |
| *H02K 1/27* | (2006.01) |
| *H02K 11/215* | (2016.01) |
| *F04D 25/06* | (2006.01) |
| *F04D 17/16* | (2006.01) |
| *F04D 29/44* | (2006.01) |
| *H02K 11/33* | (2016.01) |
| *H02K 3/32* | (2006.01) |
| *H02K 1/18* | (2006.01) |
| *H02K 5/173* | (2006.01) |
| *A47L 5/28* | (2006.01) |
| *A47L 5/36* | (2006.01) |
| *A47L 9/28* | (2006.01) |
| *H02K 11/02* | (2016.01) |

(52) U.S. Cl.
CPC ............... *A47L 9/28* (2013.01); *F04D 17/16* (2013.01); *F04D 25/0606* (2013.01); *F04D 29/441* (2013.01); *H02K 1/185* (2013.01); *H02K 1/278* (2013.01); *H02K 3/325* (2013.01); *H02K 5/1732* (2013.01); *H02K 11/215* (2016.01); *H02K 11/33* (2016.01); *H02K 15/03* (2013.01); *H02K 11/02* (2013.01); *H02K 2213/03* (2013.01)

(58) Field of Classification Search
CPC .... F04D 29/441; H02K 11/02; H02K 11/215; H02K 11/33; H02K 15/03; H02K 1/148; H02K 1/185; H02K 1/278; H02K 2213/03; H02K 3/325; H02K 5/1732
USPC ............... 310/216.009, 216.021, 216.022
See application file for complete search history.

(56) References Cited

U.S. PATENT DOCUMENTS

| | | | | |
|---|---|---|---|---|
| 5,708,406 | A * | 1/1998 | Tsunoda | H01F 7/14 310/156.08 |
| 5,780,951 | A | 7/1998 | Stephens | |
| 5,925,963 | A | 7/1999 | Yang | |
| 6,034,461 | A * | 3/2000 | Sun | H02K 1/08 310/218 |
| RE37,576 | E | 3/2002 | Stephens et al. | |
| 2006/0238059 | A1* | 10/2006 | Komatsu | H02K 1/14 310/162 |
| 2009/0001824 | A1* | 1/2009 | Marioni | H02K 1/148 310/400 |
| 2009/0078489 | A1* | 3/2009 | Feier | F16H 61/0006 180/339 |
| 2010/0196174 | A1 | 8/2010 | Lee | |
| 2013/0076194 | A1* | 3/2013 | Benner, Jr. | H02K 33/16 310/216.022 |
| 2013/0094982 | A1* | 4/2013 | Sugimoto | H02K 11/33 417/423.7 |
| 2013/0249330 | A1* | 9/2013 | King | H02K 21/14 310/43 |
| 2015/0280497 | A1* | 10/2015 | Qin | H02K 1/16 310/216.055 |

FOREIGN PATENT DOCUMENTS

| | | |
|---|---|---|
| JP | 2000-92755 | 3/2000 |
| JP | 2001-342996 | 12/2001 |
| JP | 2002-64950 | 2/2002 |
| JP | 2004-242471 | 8/2004 |
| JP | 2005-237066 | 9/2005 |
| JP | 2009-79763 | 4/2009 |
| JP | 2013-90373 | 5/2013 |
| KR | 10-2006-0105828 | 10/2006 |
| KR | 20-2008-0004155 | 9/2008 |
| KR | 10-2009-0006821 | 1/2009 |
| WO | 92/10020 | 6/1992 |

OTHER PUBLICATIONS

Extended European Search Report dated Dec. 7, 2017 in European Patent Application No. 15807377.5.
European Communication pursuant to Rules 161(2) and 162 EPC dated Jan. 20, 2017 in corresponding European Patent Application No. 15807377.5.
Australian Office Action dated Sep. 7, 2017 in corresponding Australian Patent Application No. 2015272357.
International Search Report dated Jul. 9, 2015 in corresponding International Application No. PCT/KR2015/003176.
Australian Notice of Acceptance dated Jun. 27, 2018 in Australian Patent Application No. 1074225.
Chinese Office Action dated Jul. 13, 2018 in Chinese Patent Application No. 201580042413.9.
European Patent Office issued Communication pursuant to Article 94(3) EPC in European Application No. 15807377.5 dated Oct. 18, 2018 (8 pages).
European Office Action dated May 6, 2019 in corresponding European Patent Application No. 15807377.5.
European Office Action dated Dec. 3, 2019 in related European Patent Application No. 15 807 377.5.
Korean Office Action dated Aug. 11, 2020 in Korean Patent Application No. 10-2014-0184841.
European Communication dated Jul. 30, 2020 in European Patent Application No. 15807377.5.

* cited by examiner

[Fig. 1]
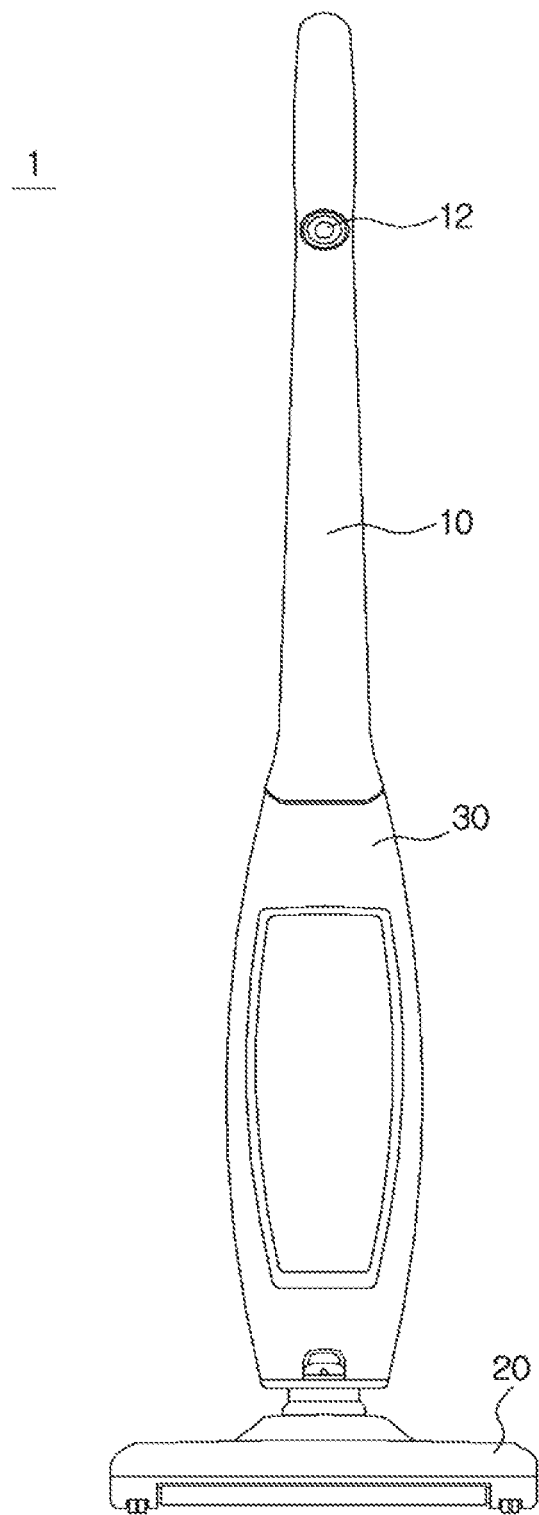

[Fig. 2]
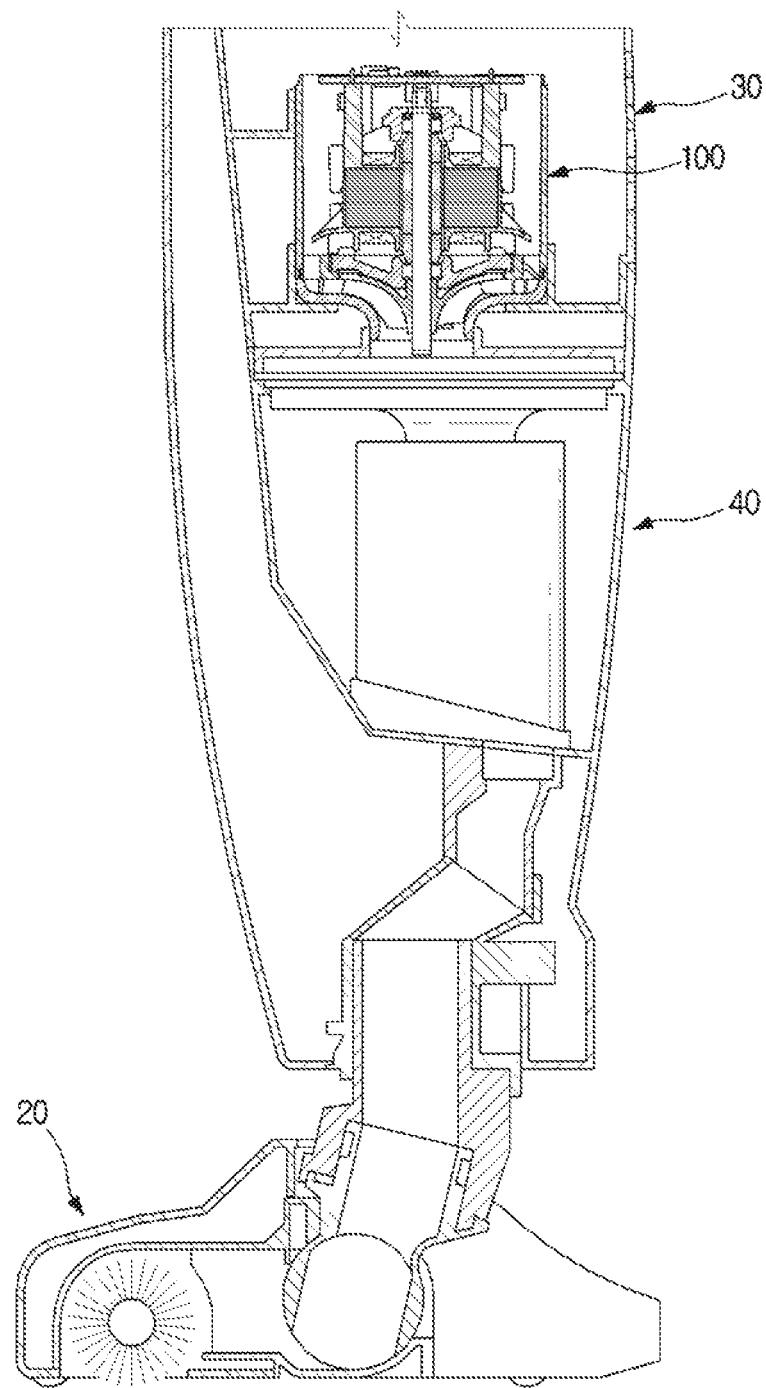

[Fig. 3]
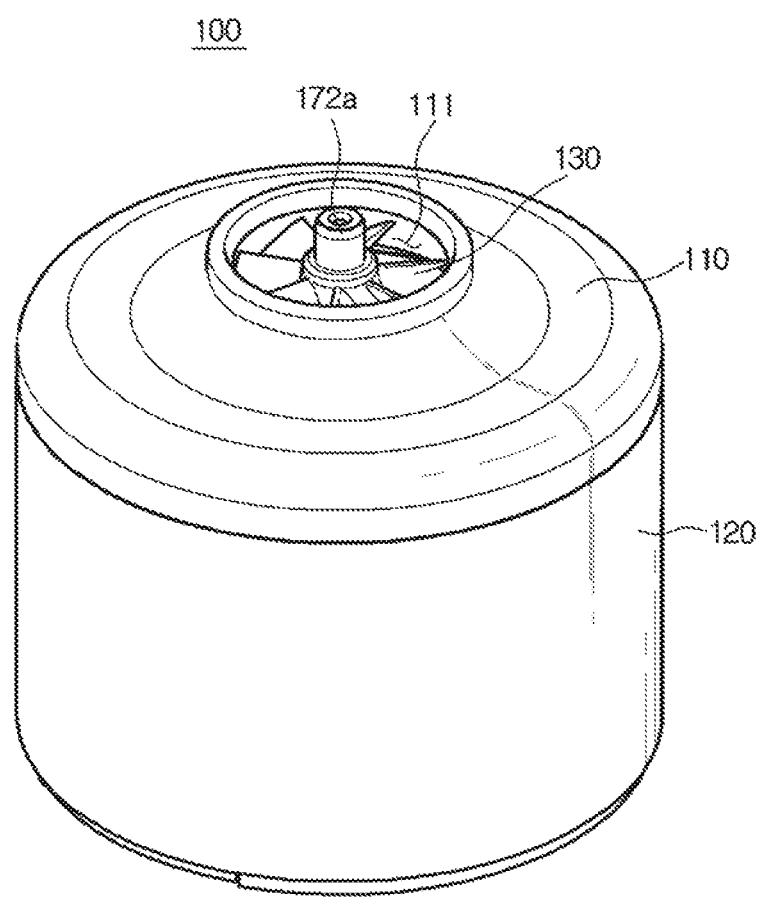

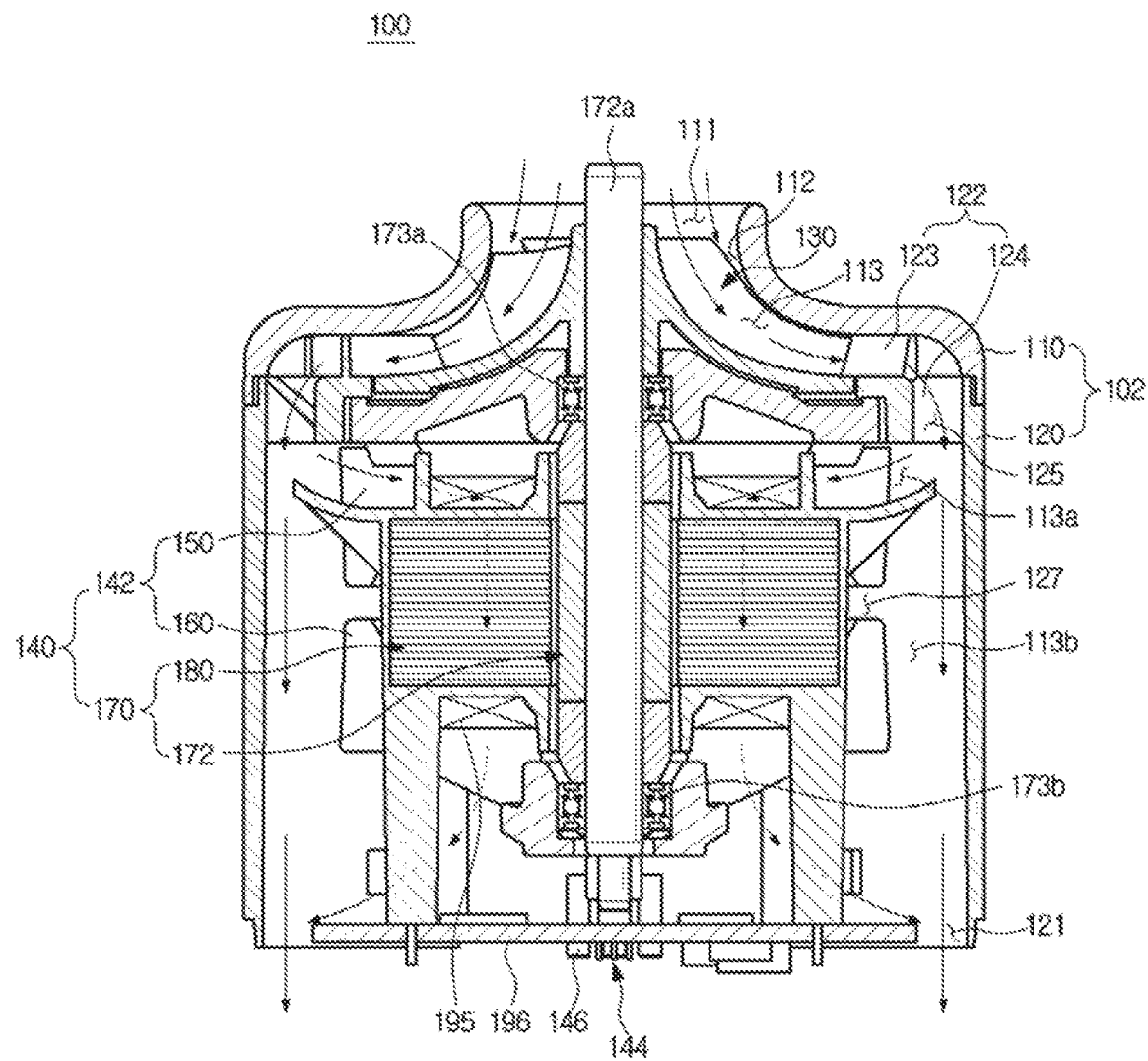
[Fig. 4]

[Fig. 5]
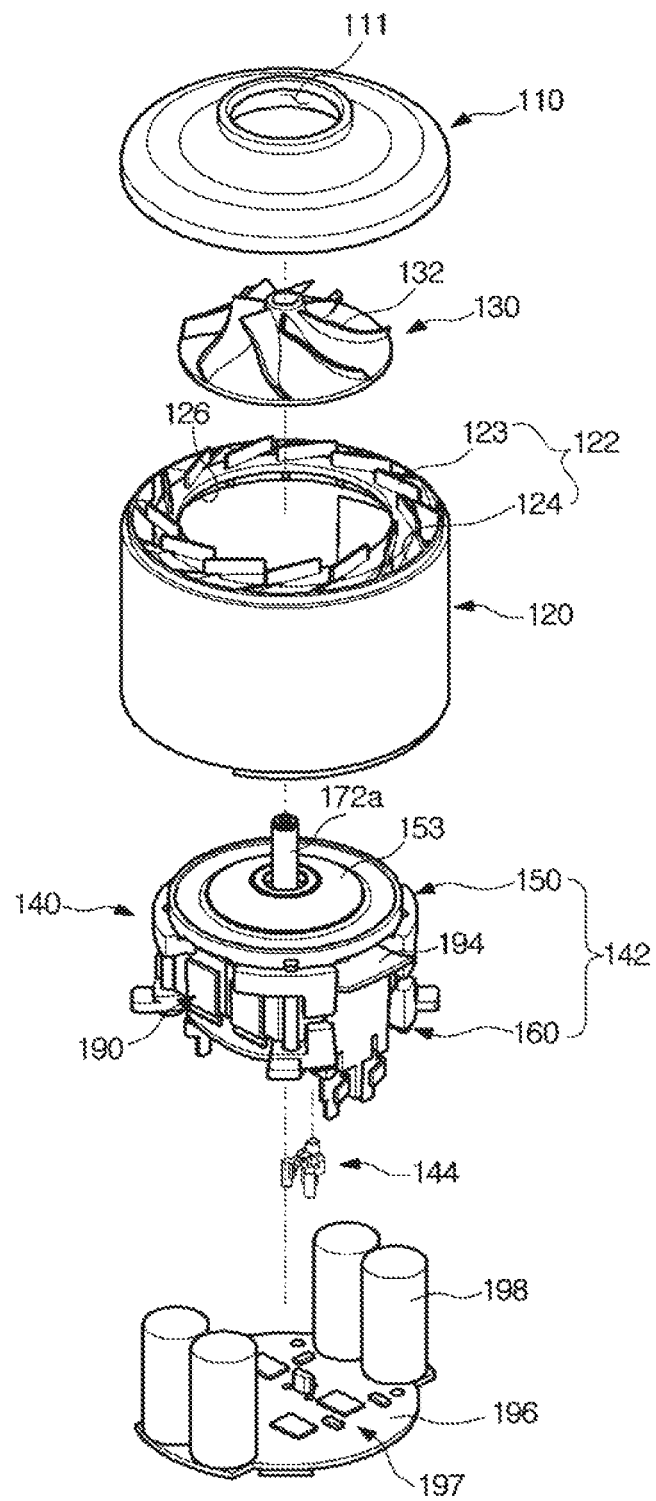

[Fig. 6a]
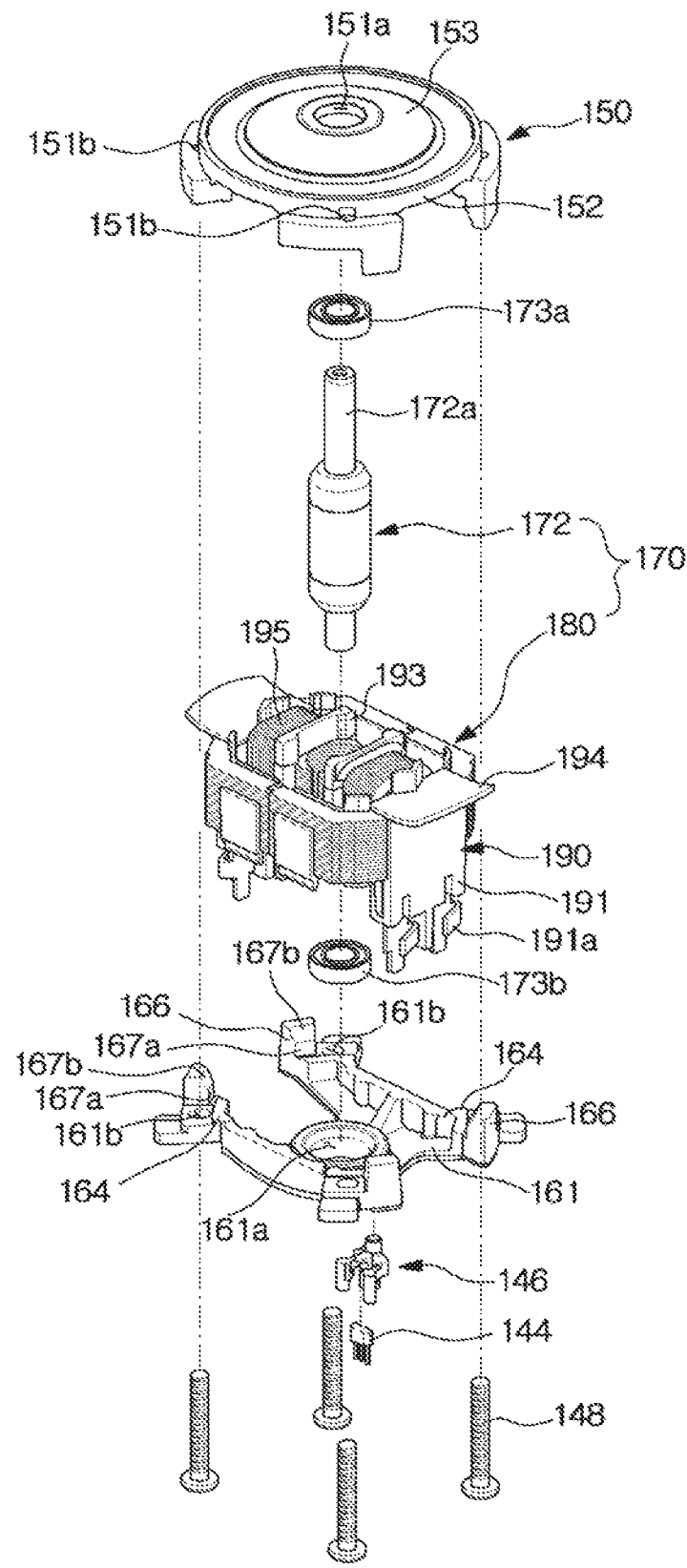

[Fig. 6b]
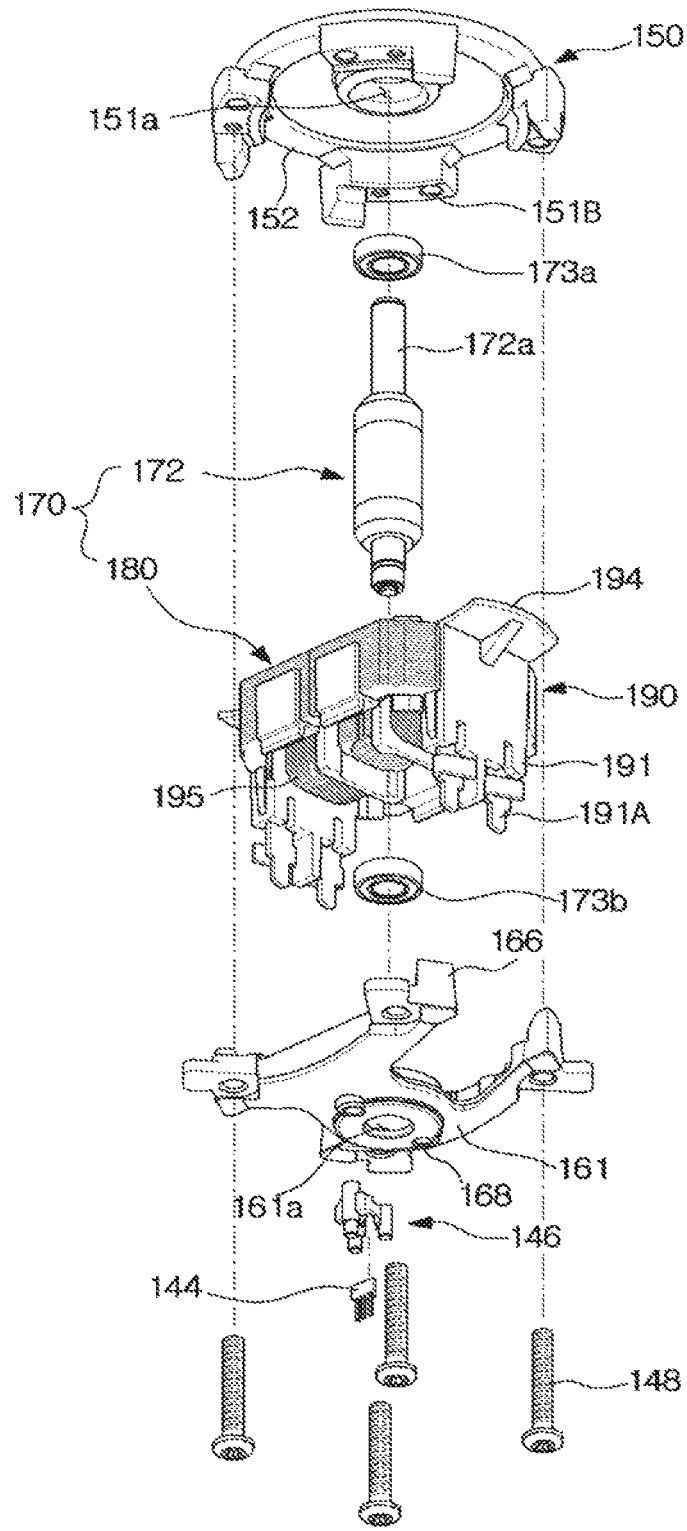

[Fig. 7]
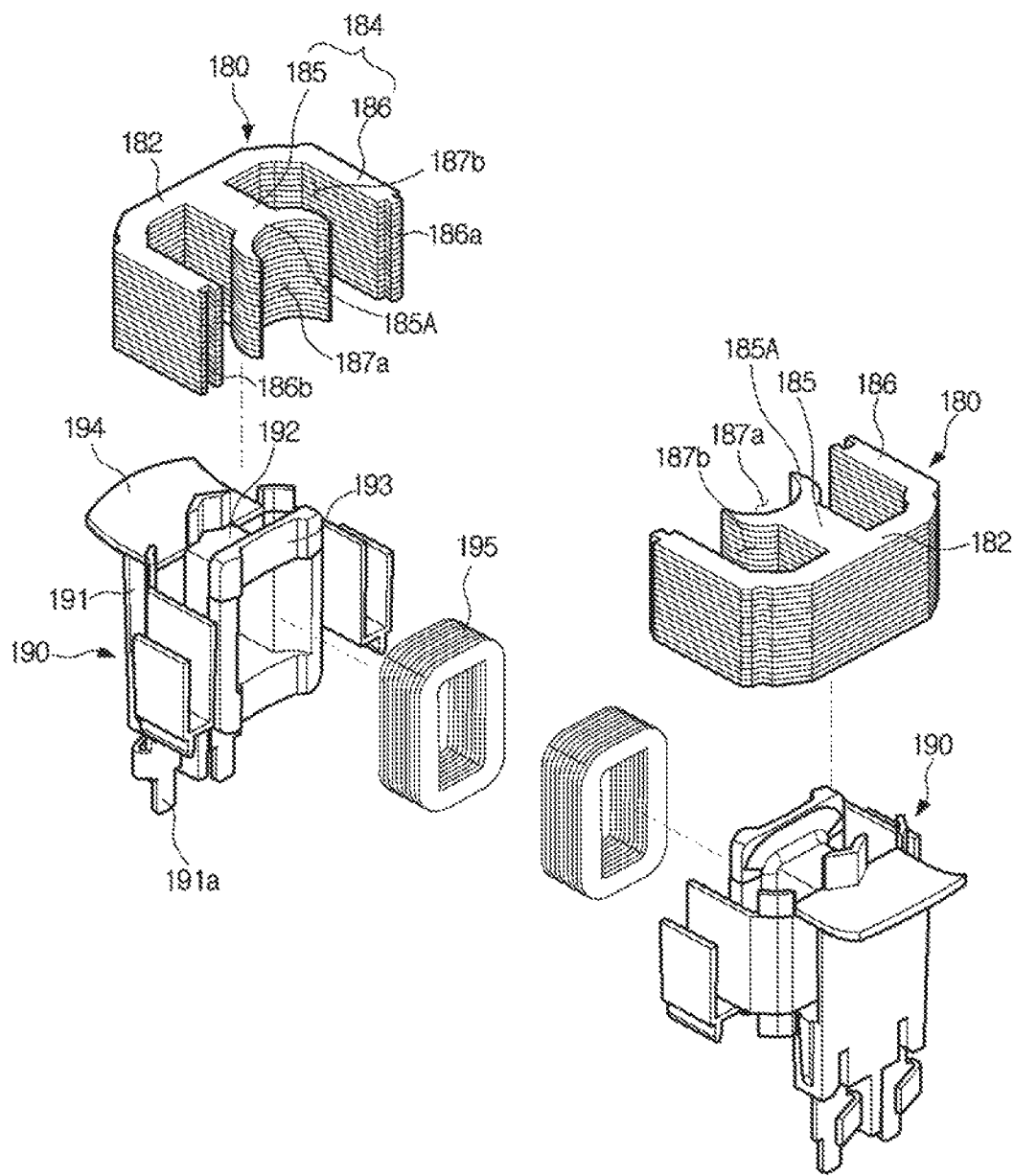

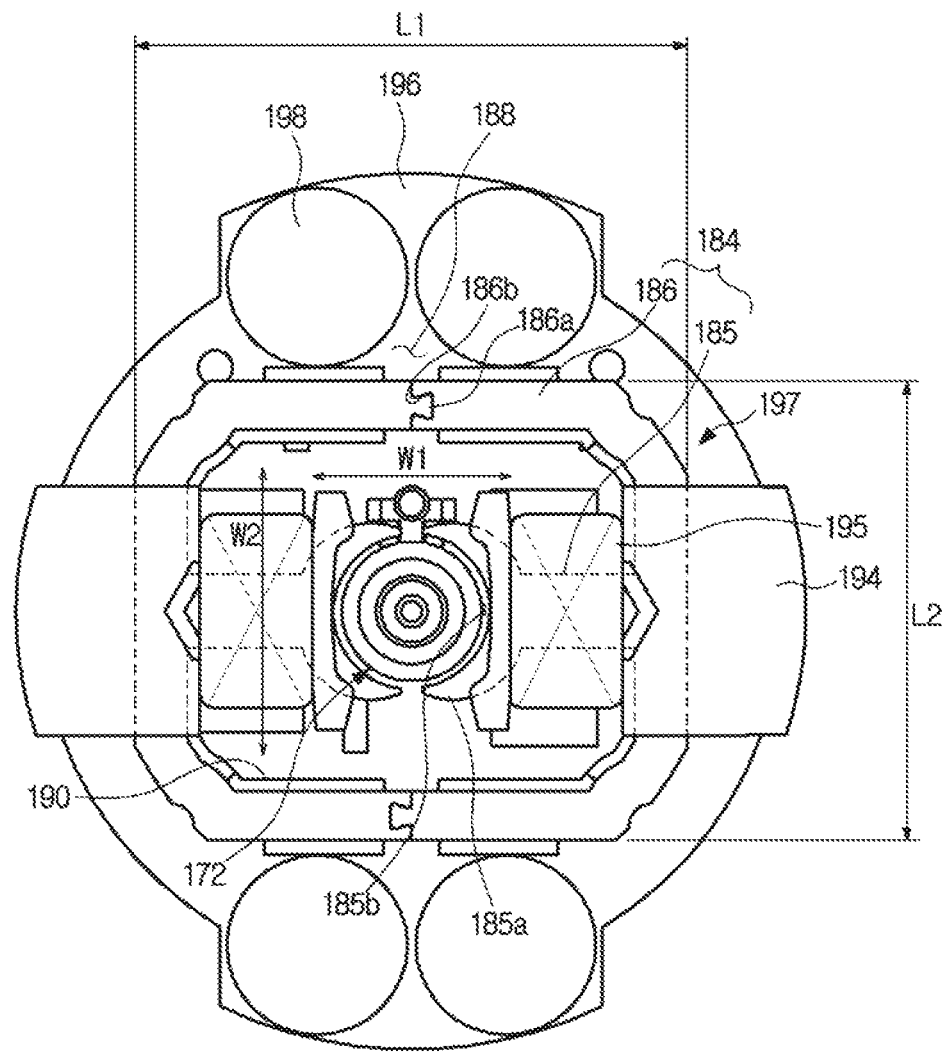
[Fig. 8]

[Fig. 9]
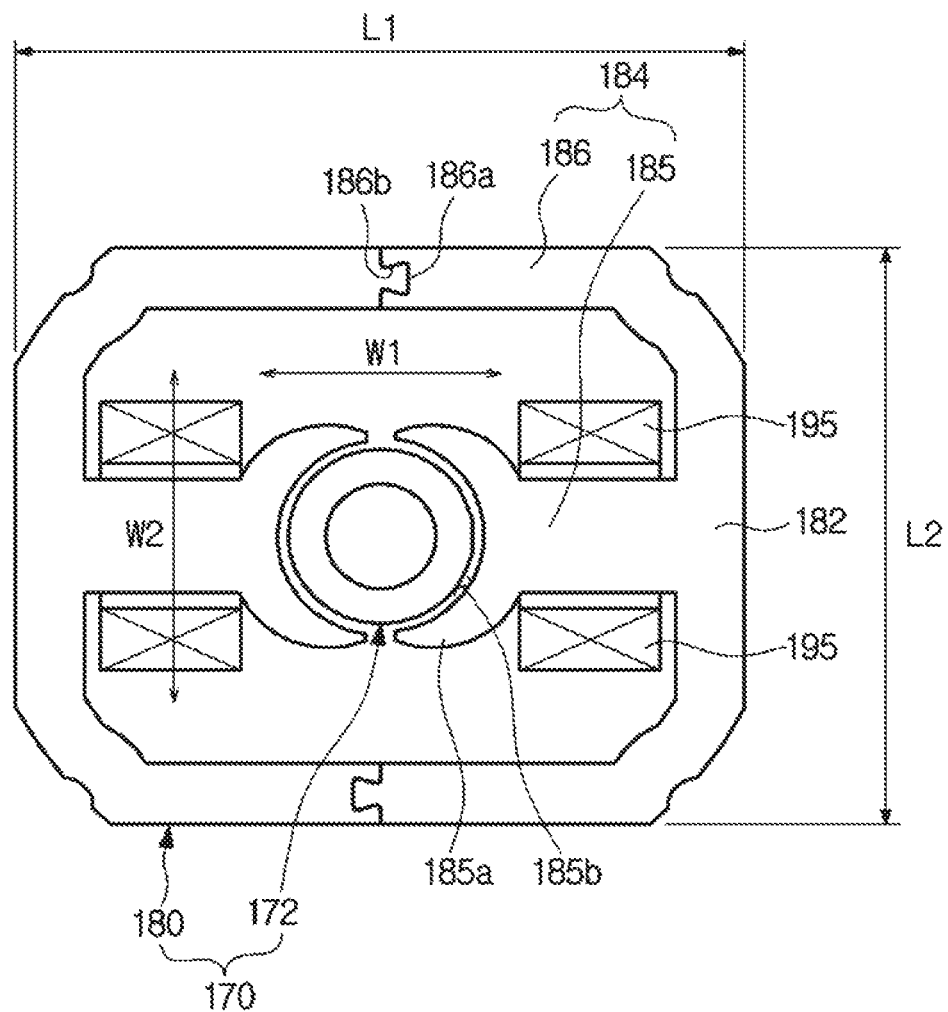

[Fig. 10]
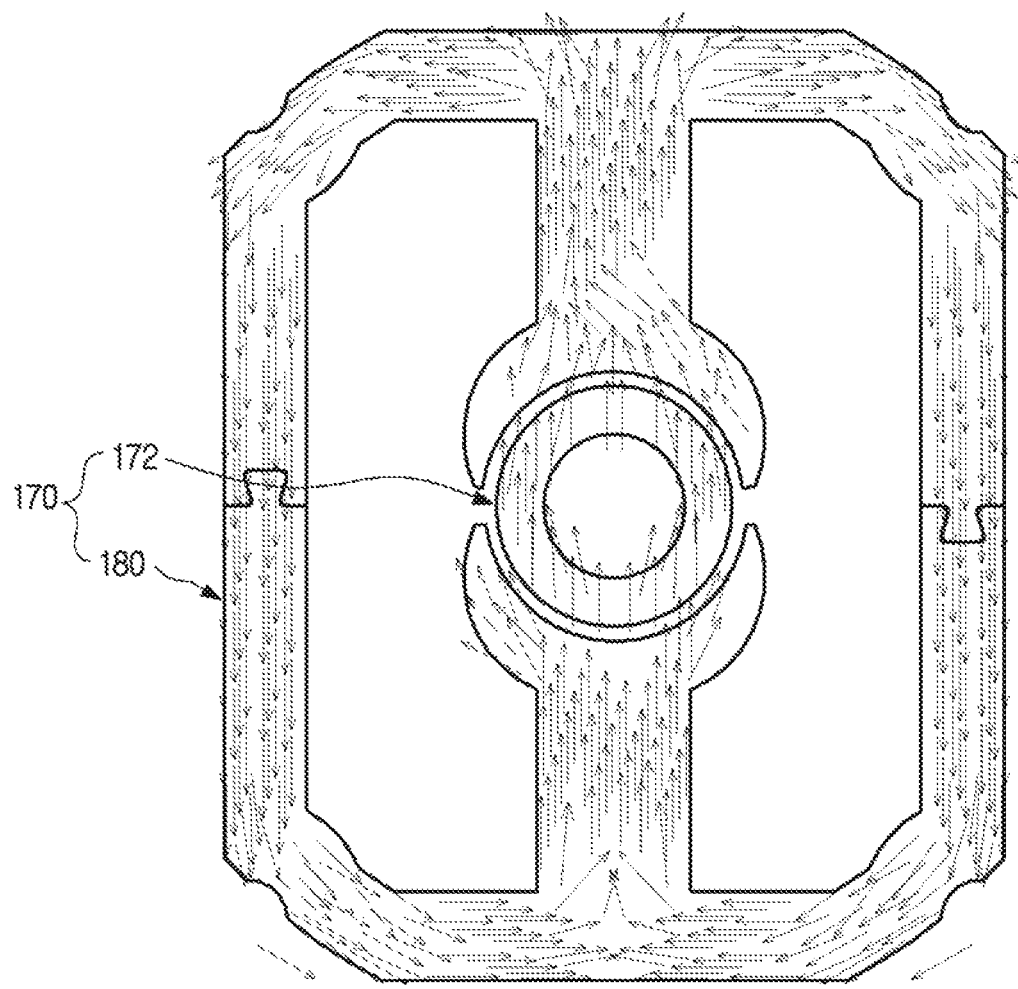

[Fig. 11]
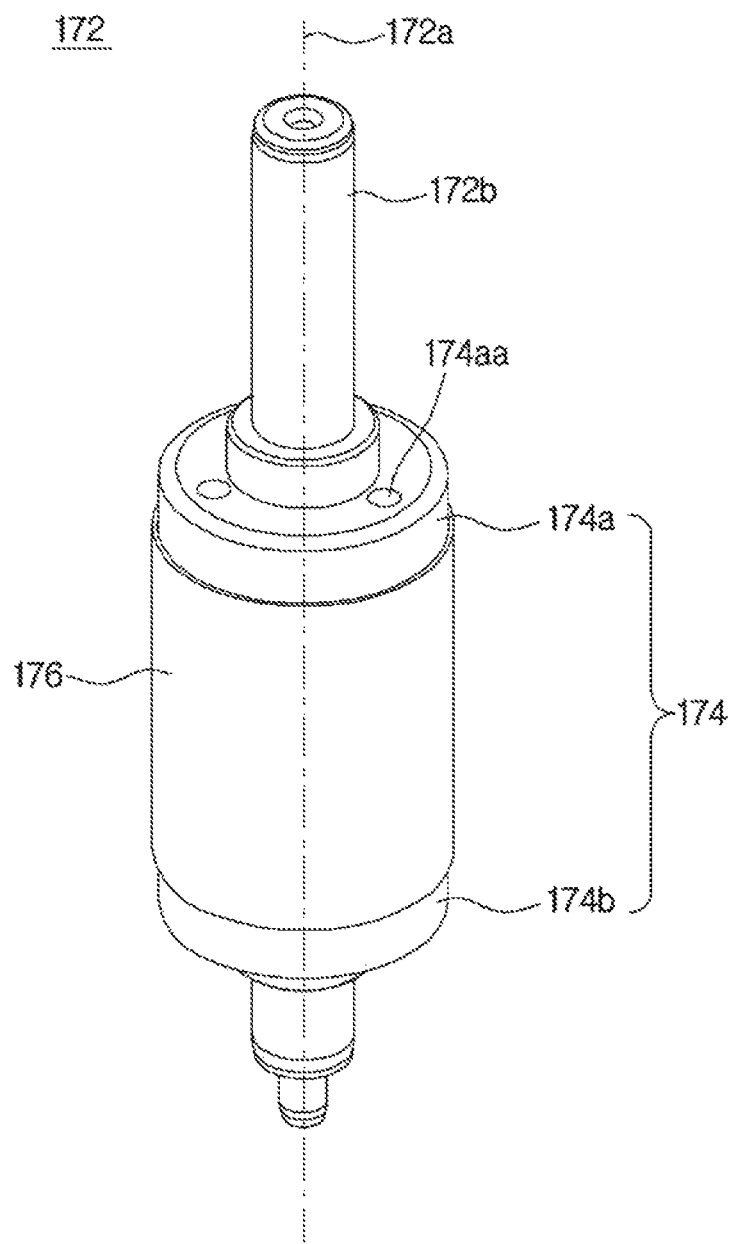

[Fig. 12]
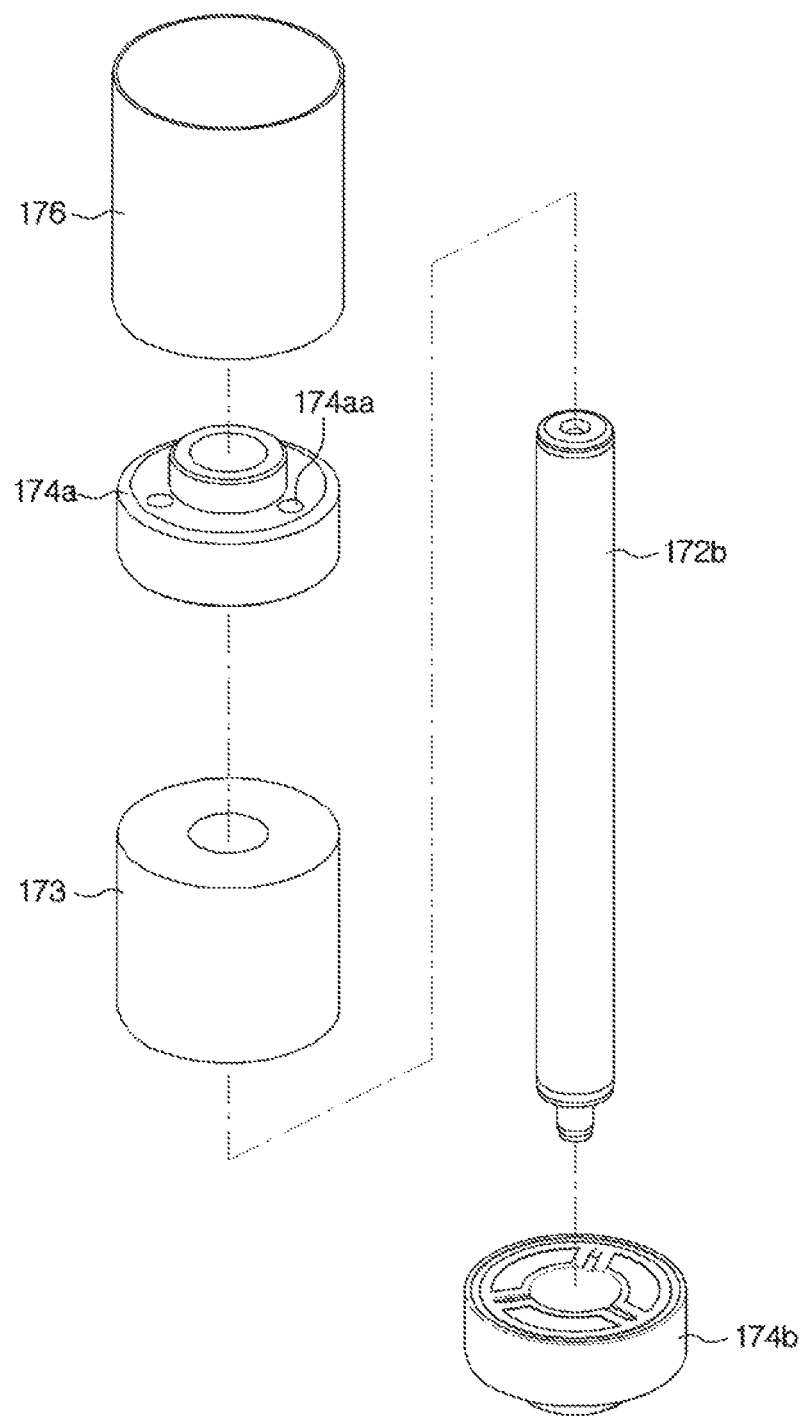

[Fig. 13a]
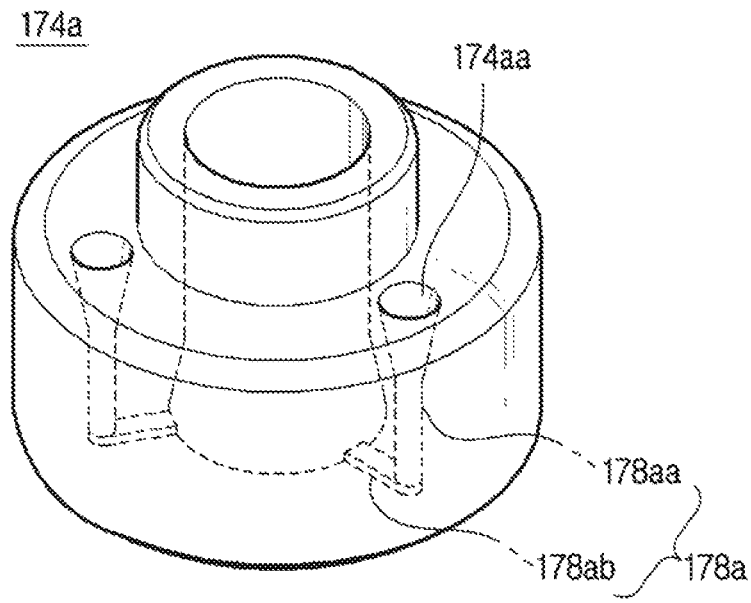
[Fig. 13b]
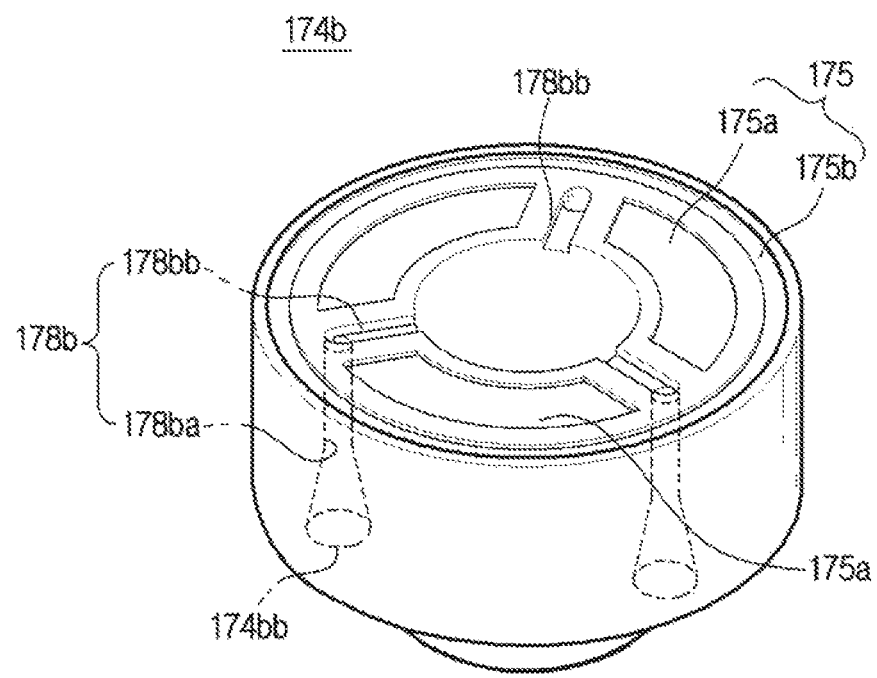

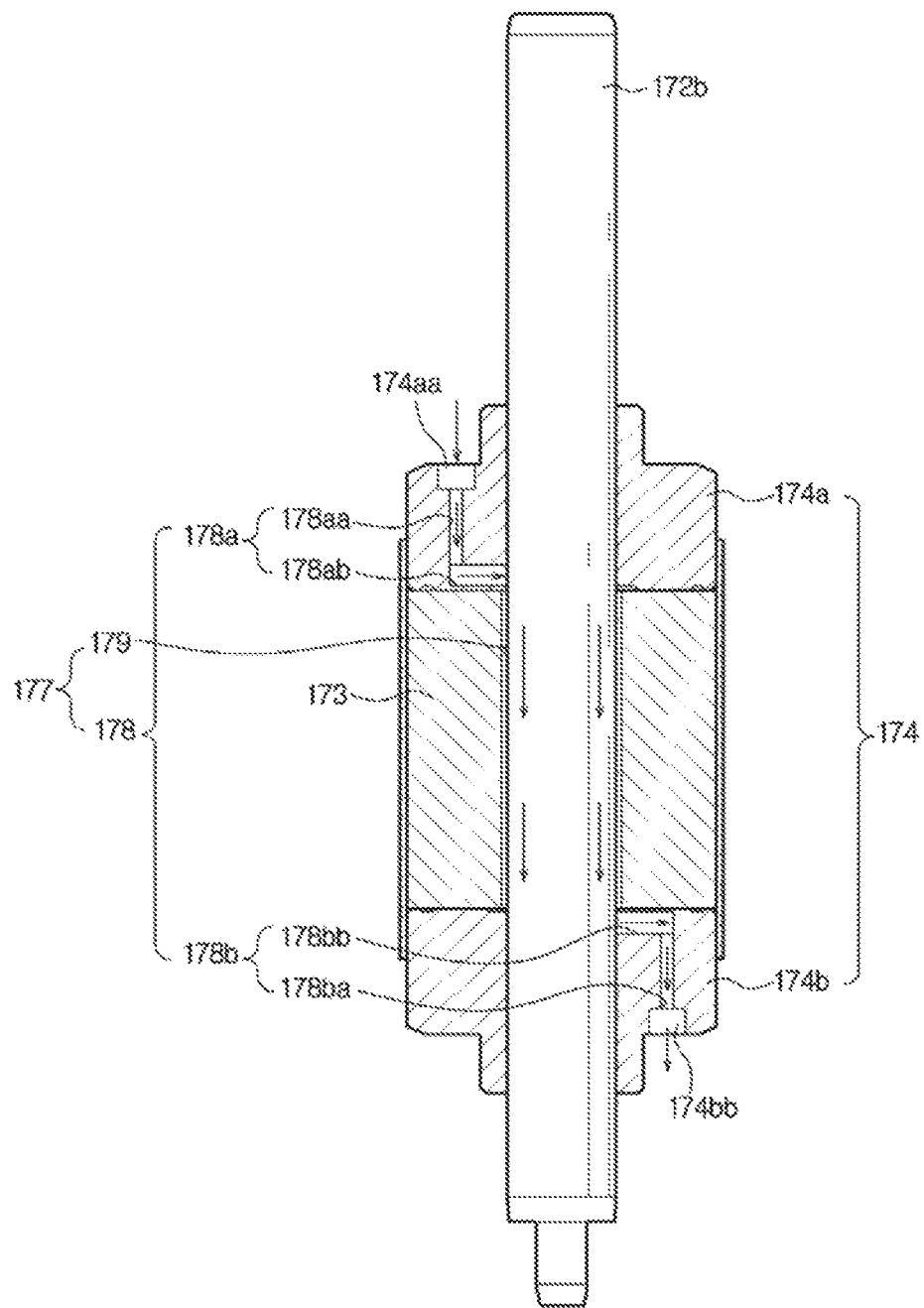
[Fig. 14]

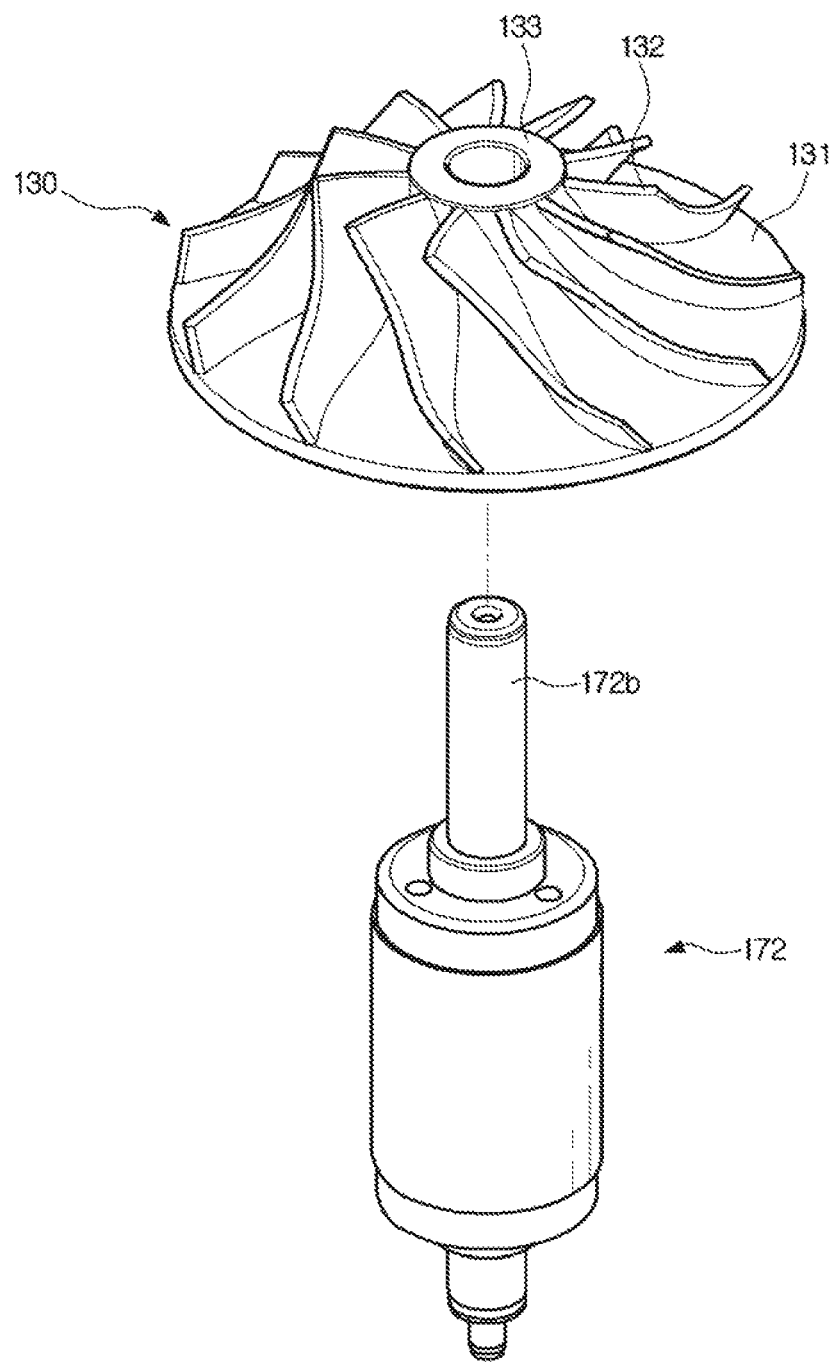
[Fig. 15]

[Fig. 16]
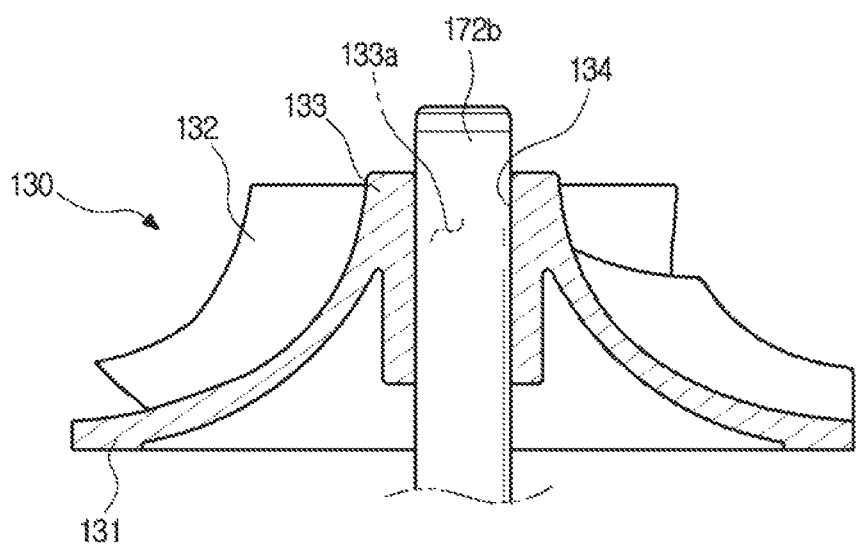
[Fig. 17]
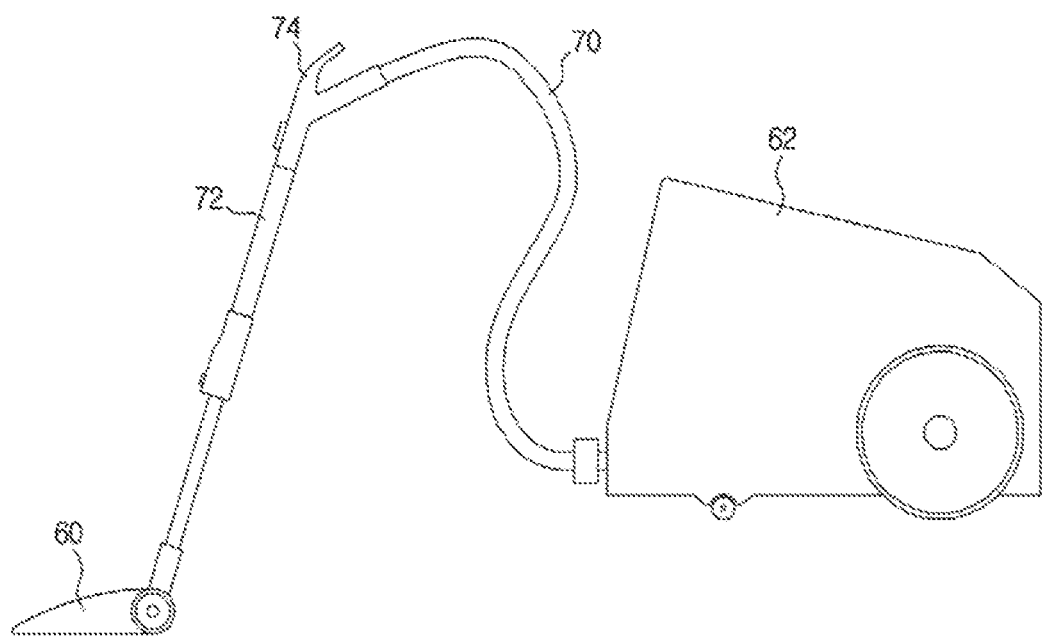

[Fig. 18]
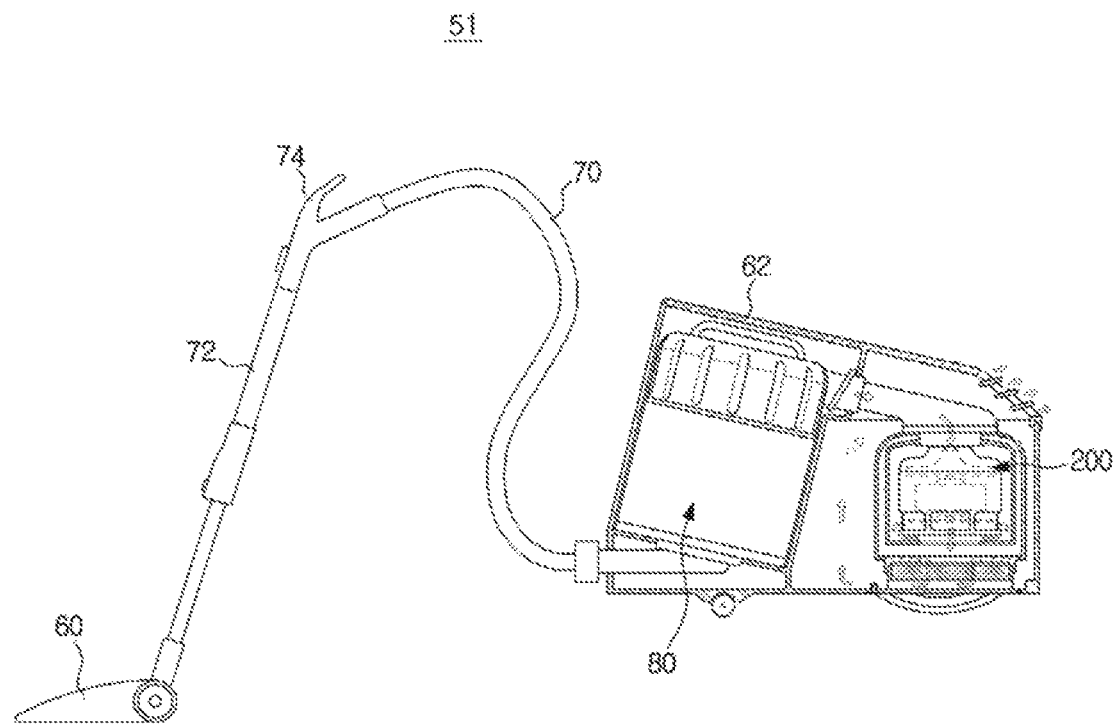

[Fig. 19]
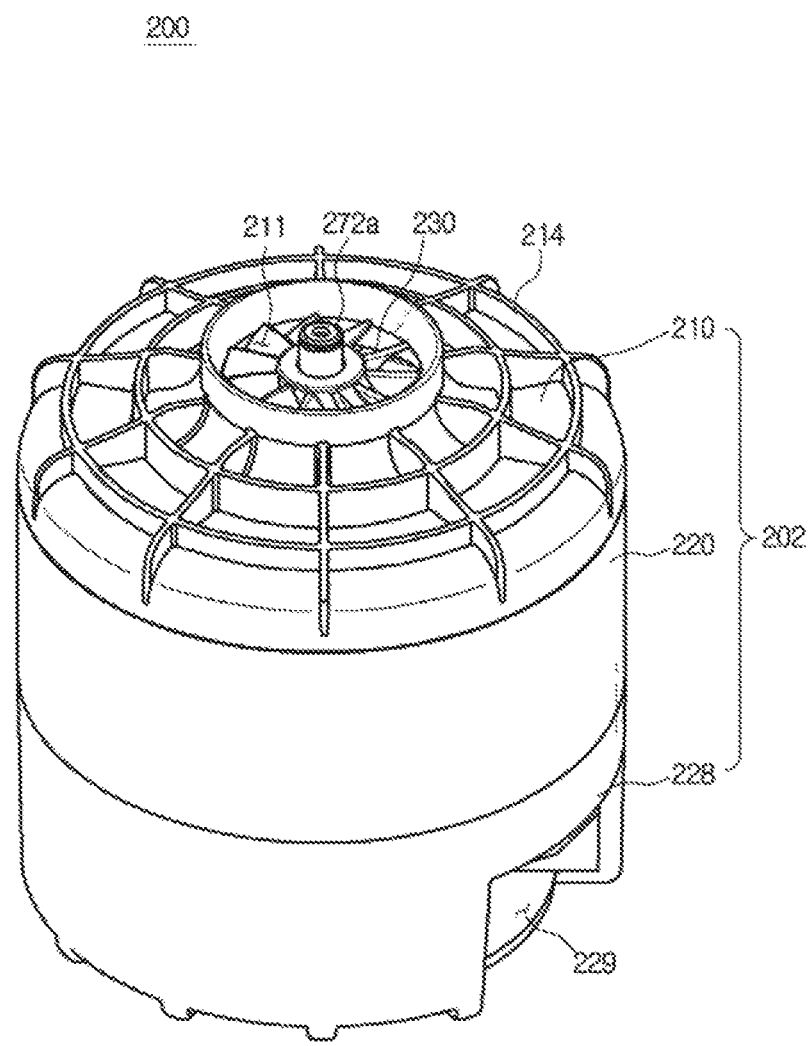

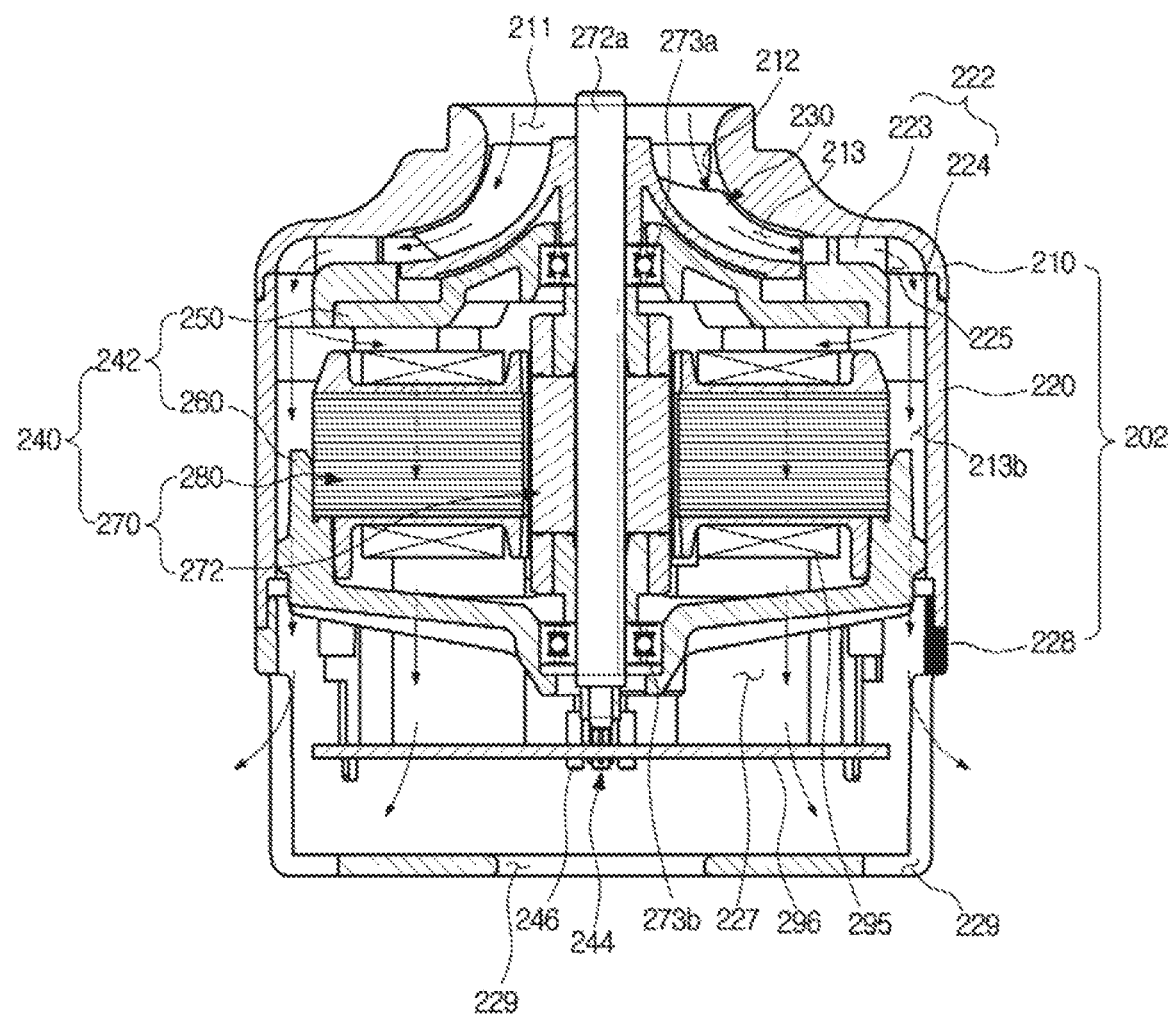
[Fig. 20]

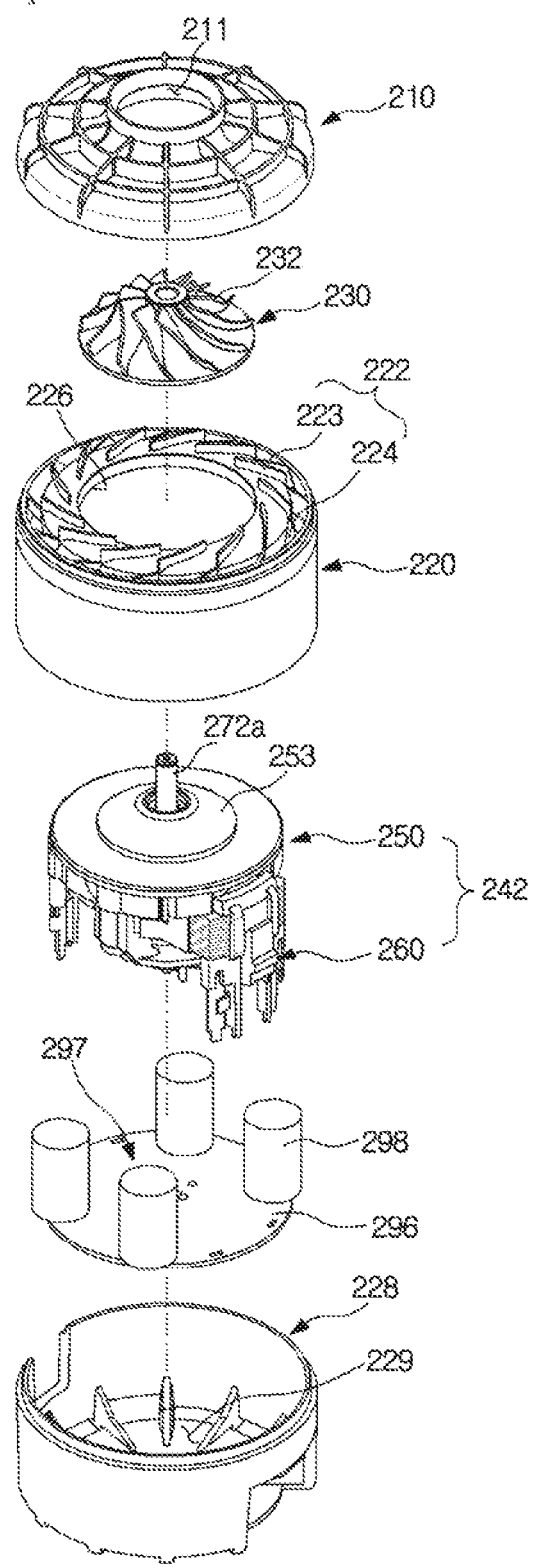
[Fig. 21]

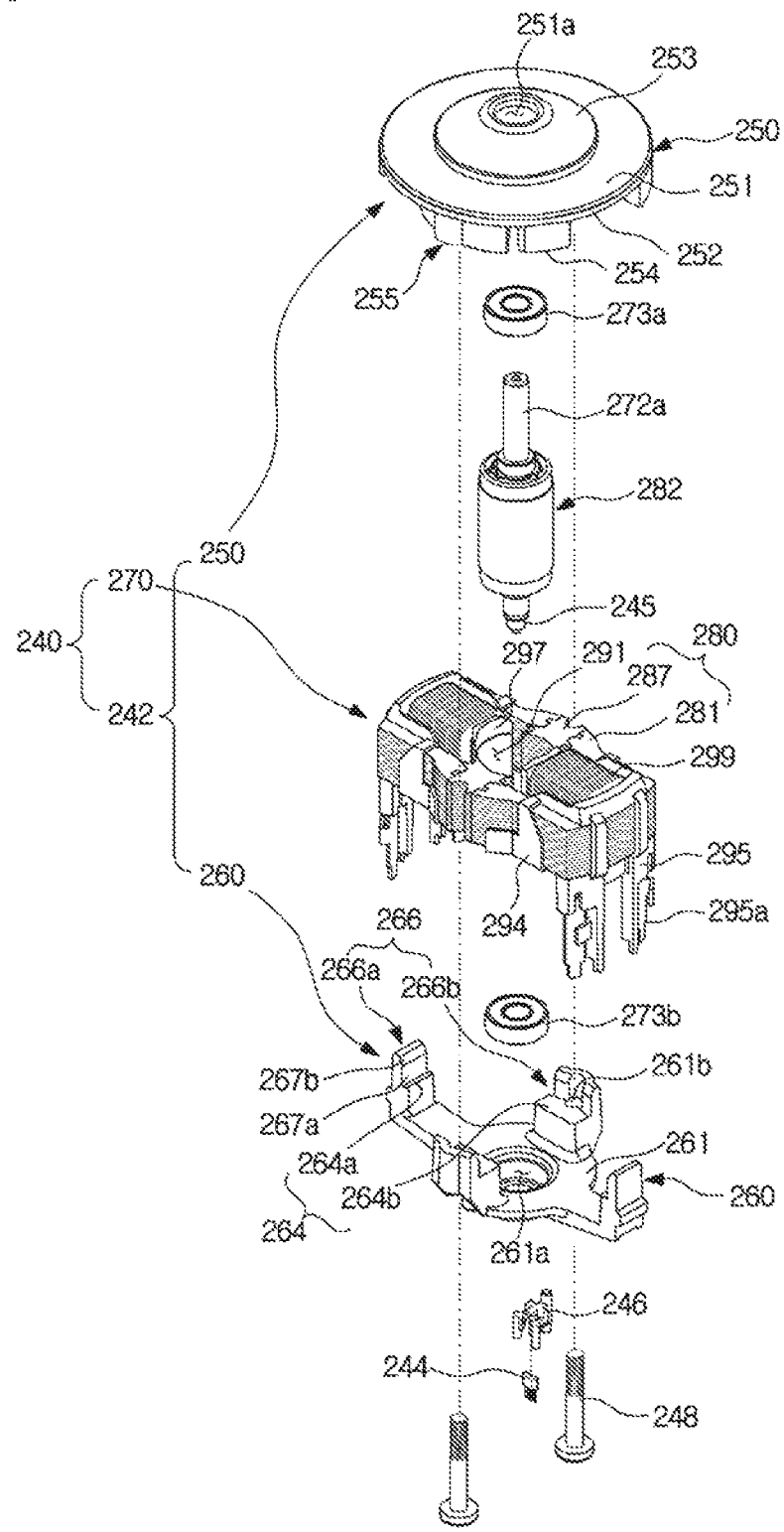
[Fig. 22a]

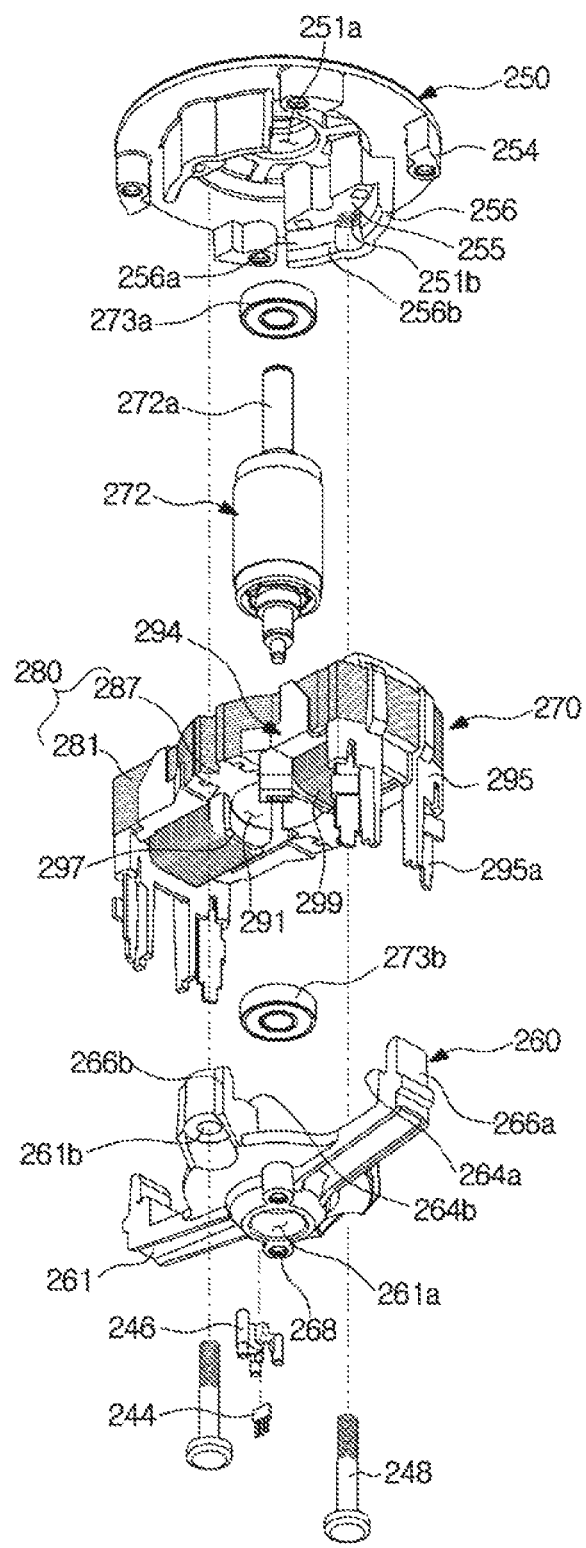
[Fig. 22b]

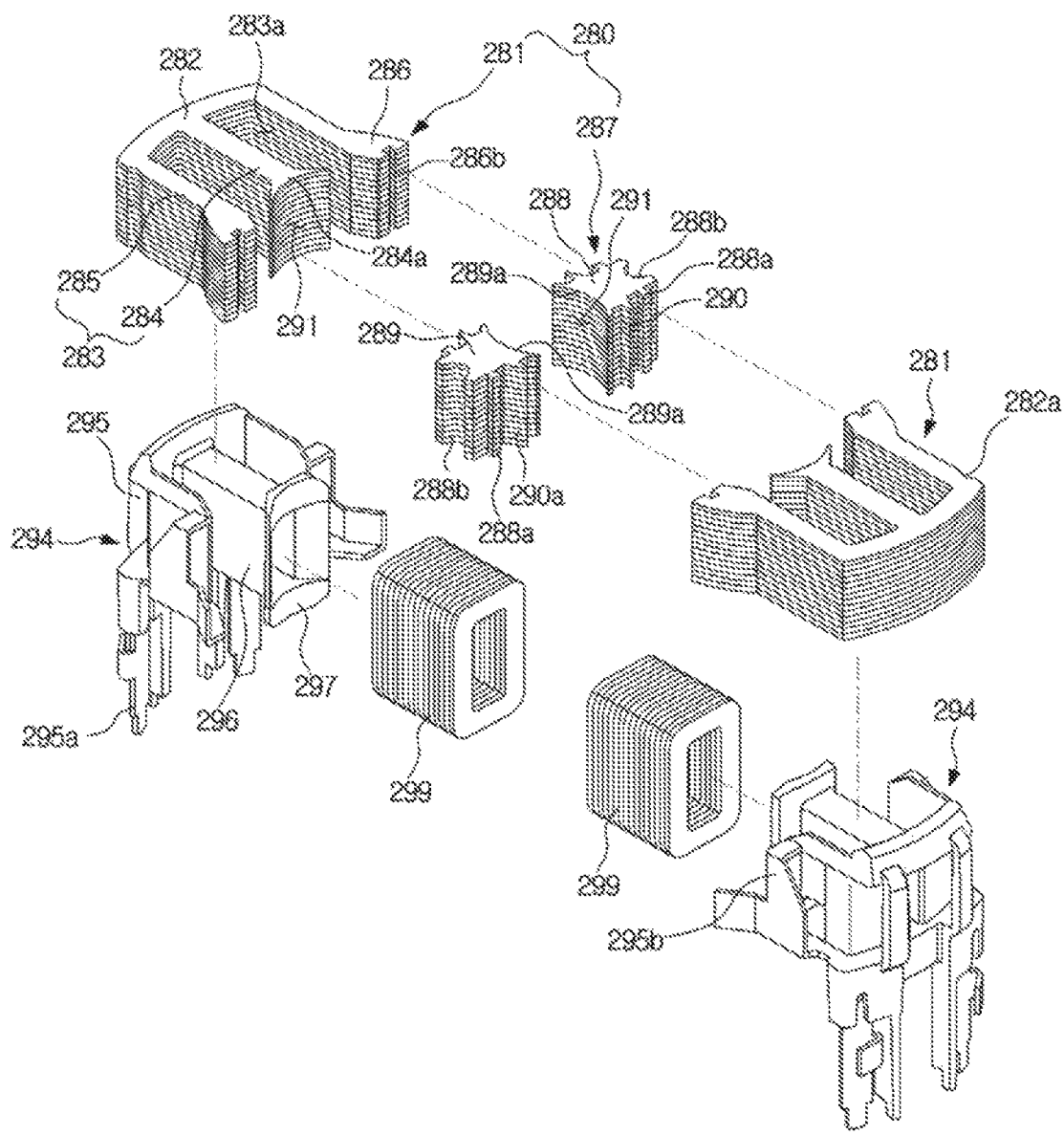
[Fig. 23]

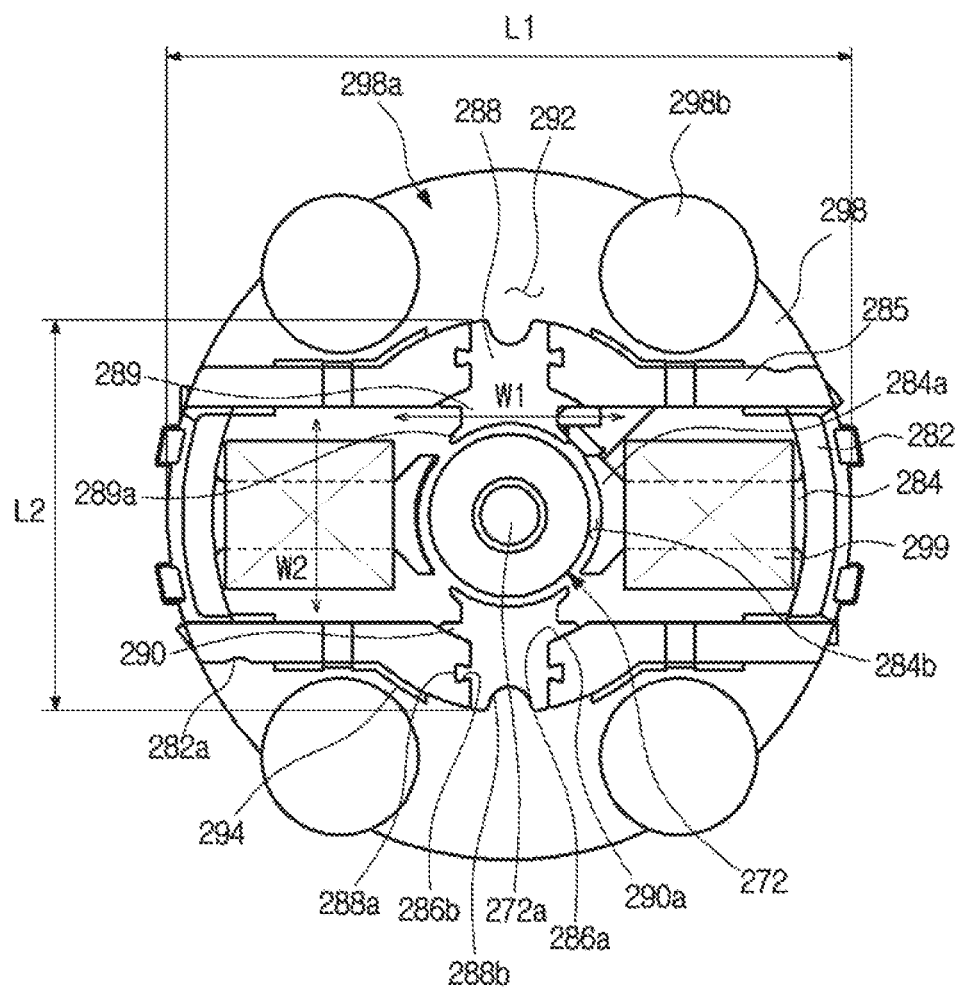
[Fig. 24]

[Fig. 25]
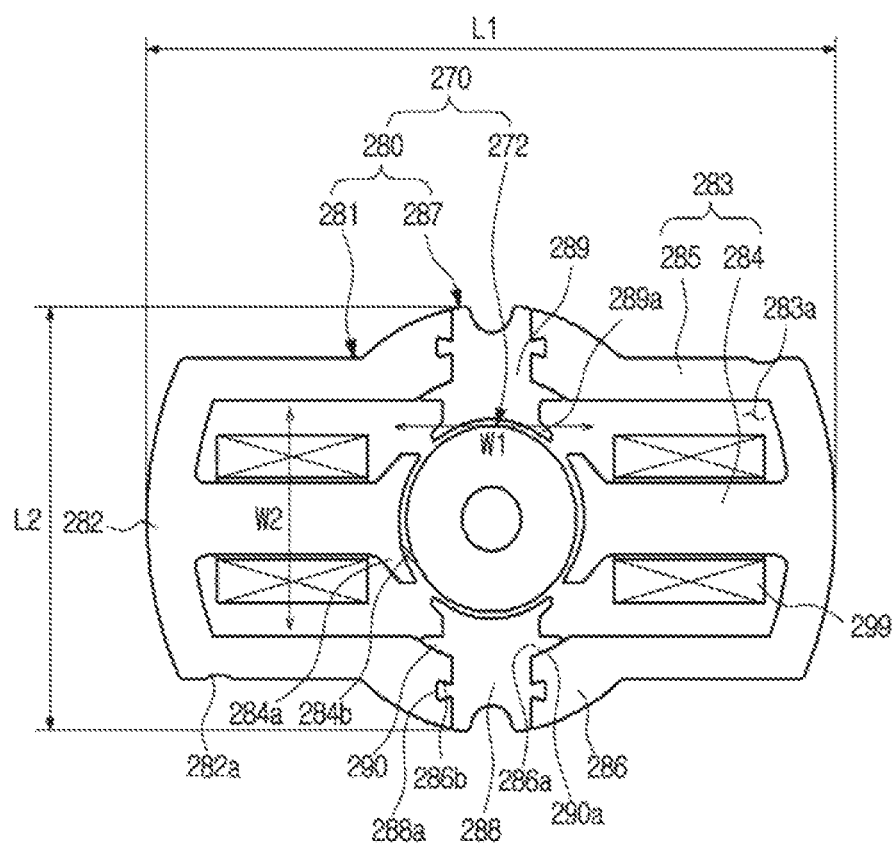

[Fig. 26]
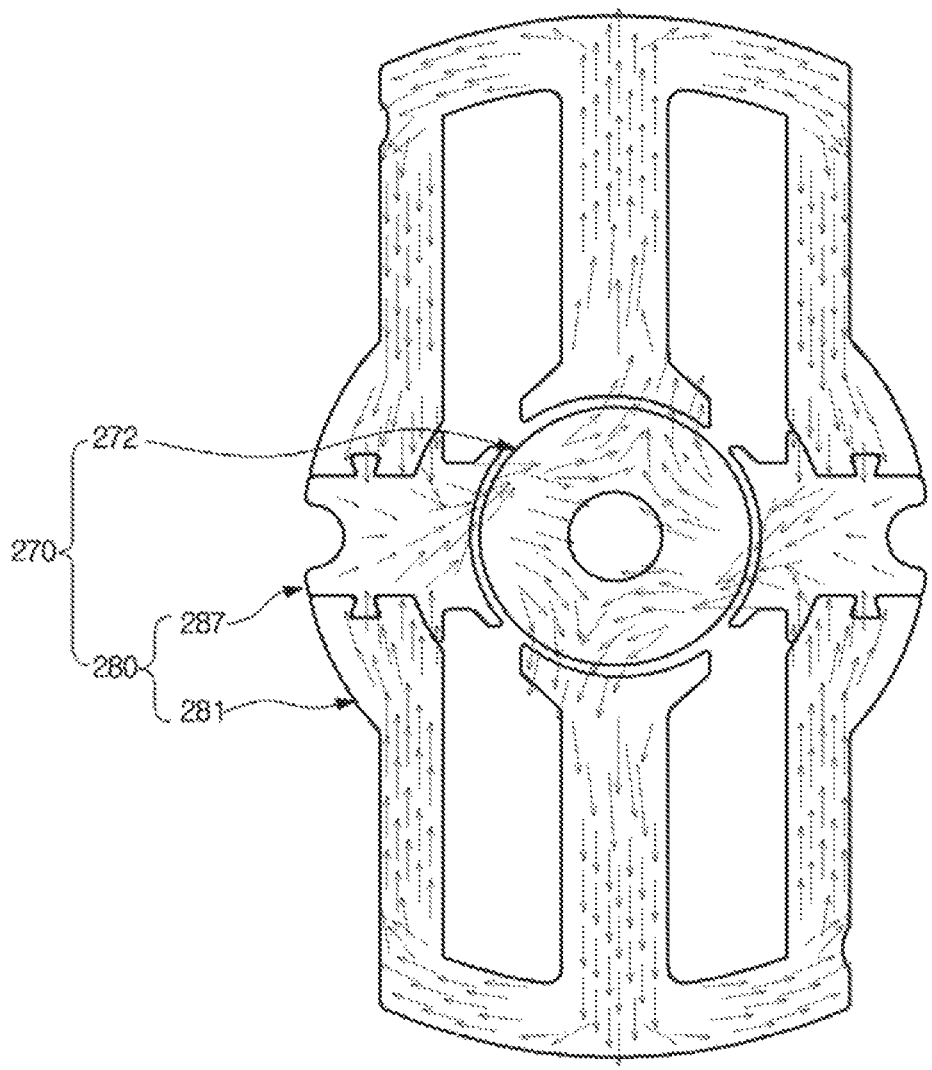

[Fig. 27]
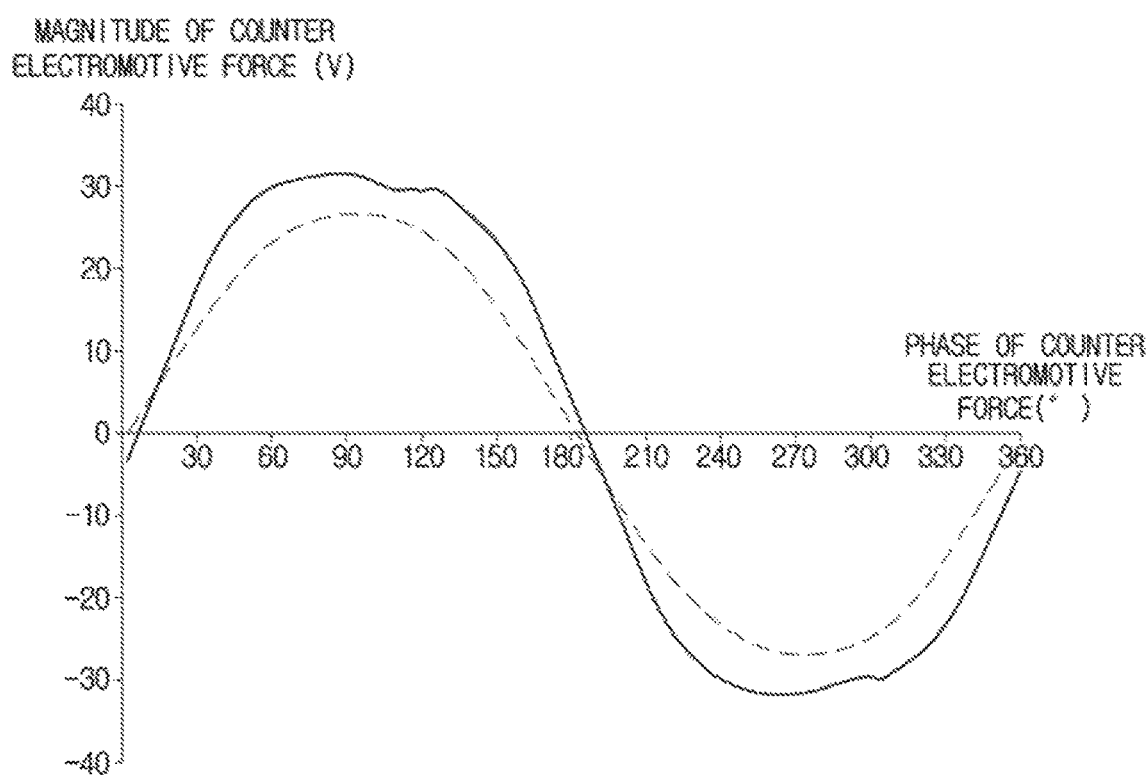

[Fig. 28]
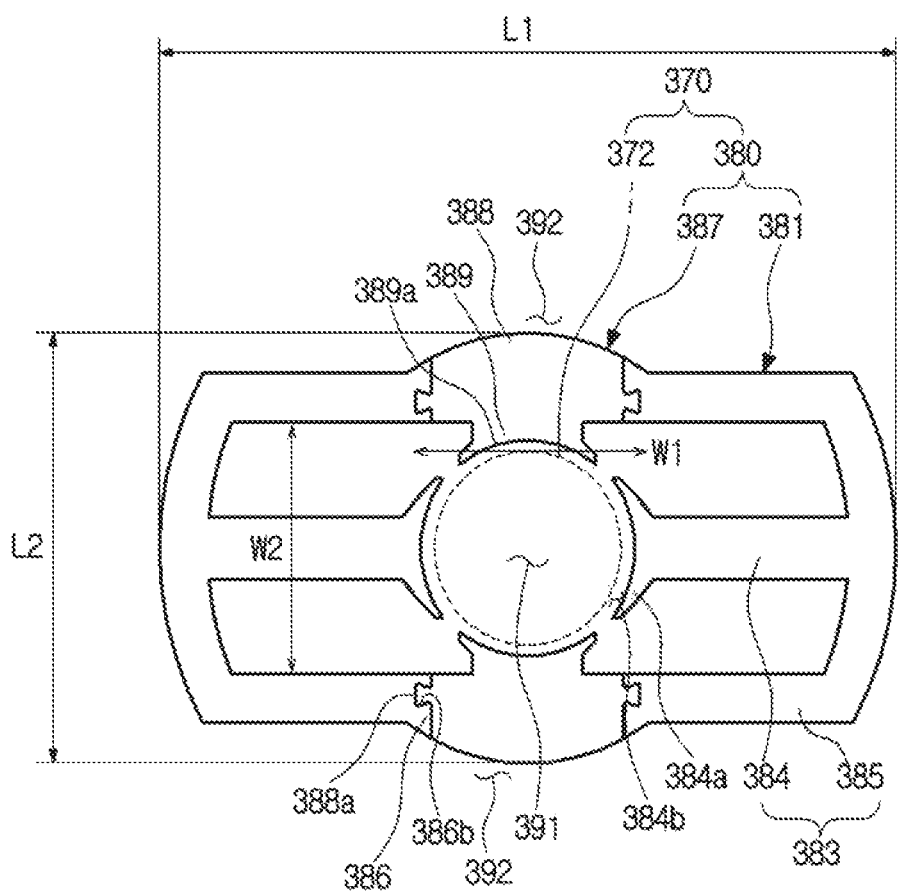

[Fig. 29]
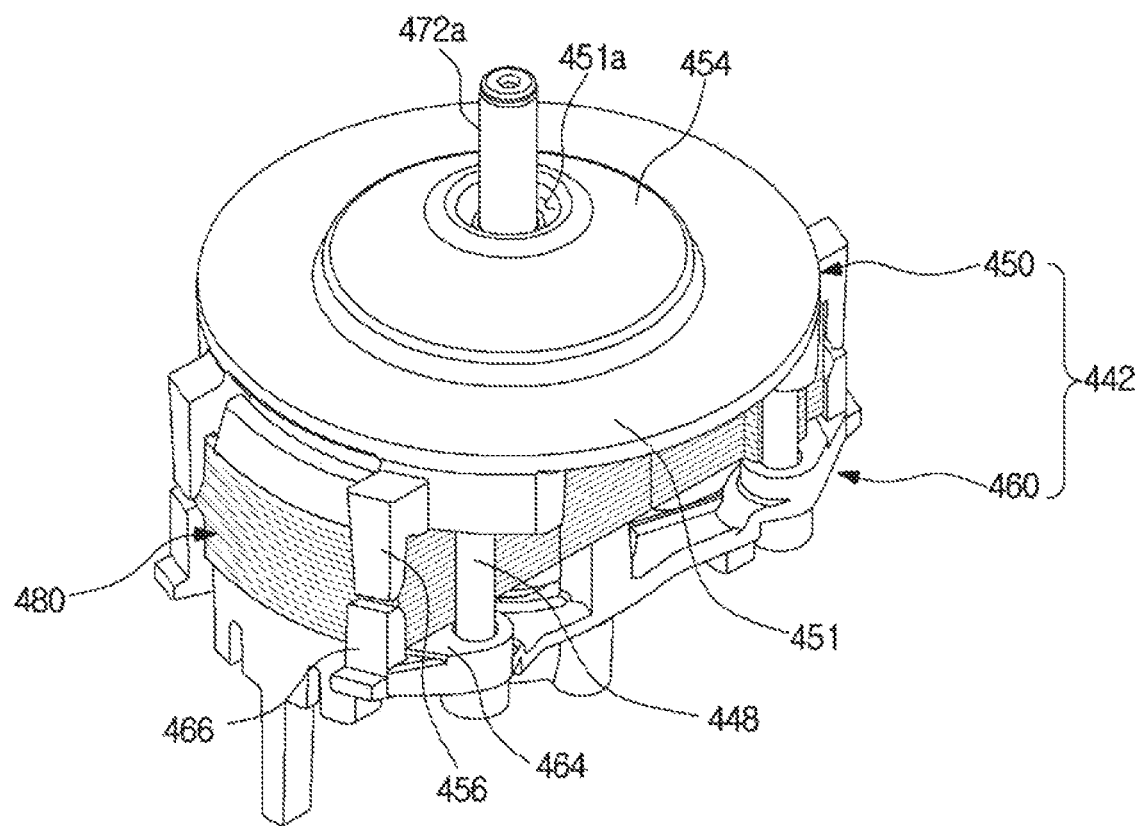

[Fig. 30]
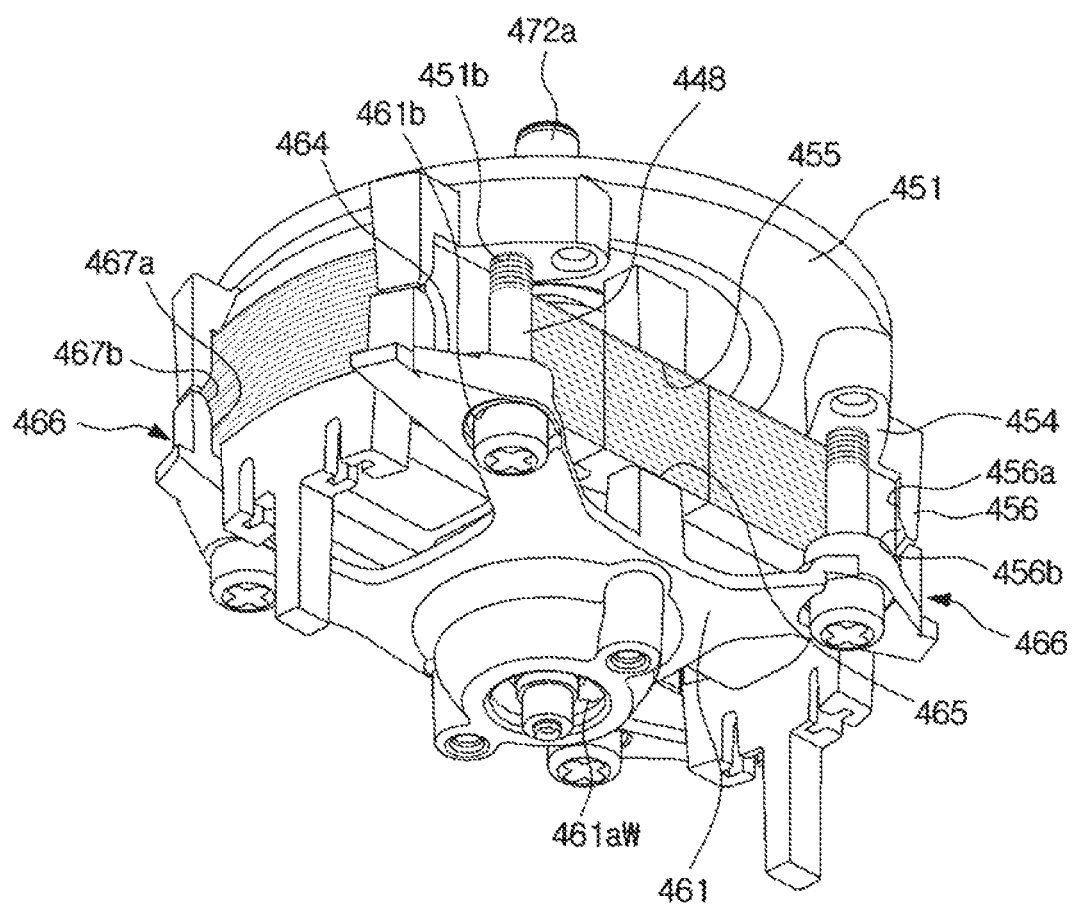

[Fig. 31]
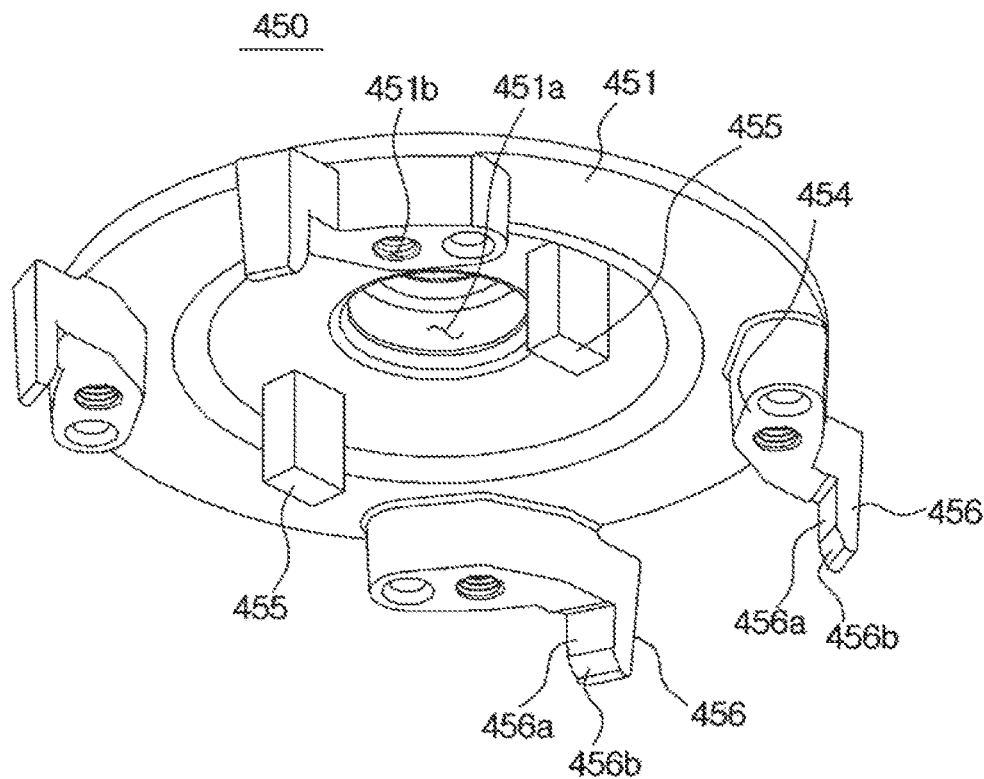
[Fig. 32]
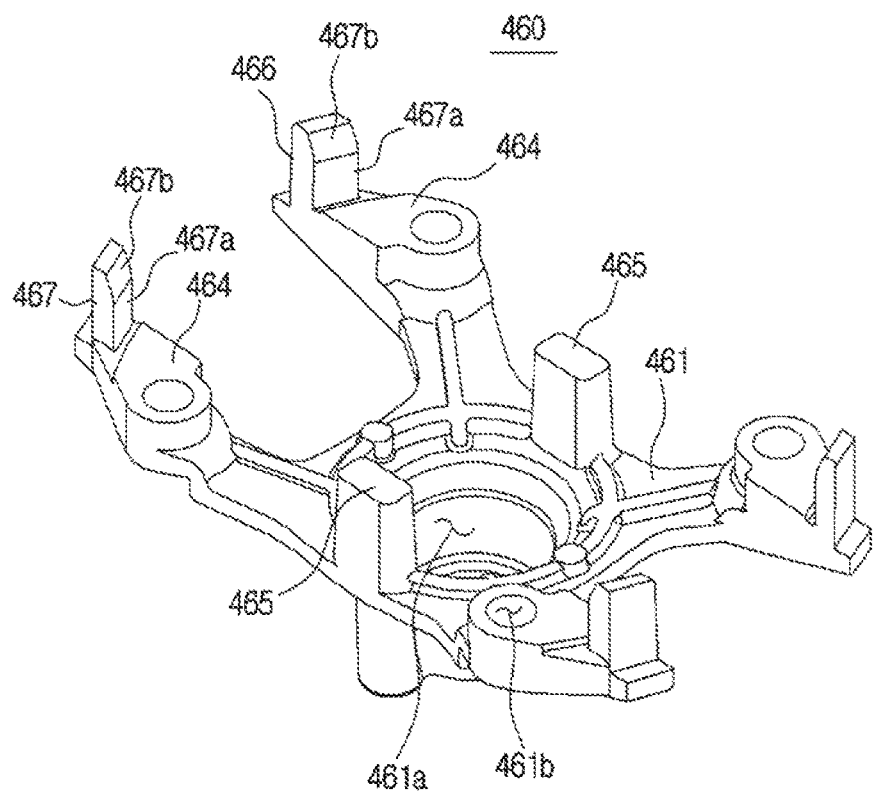

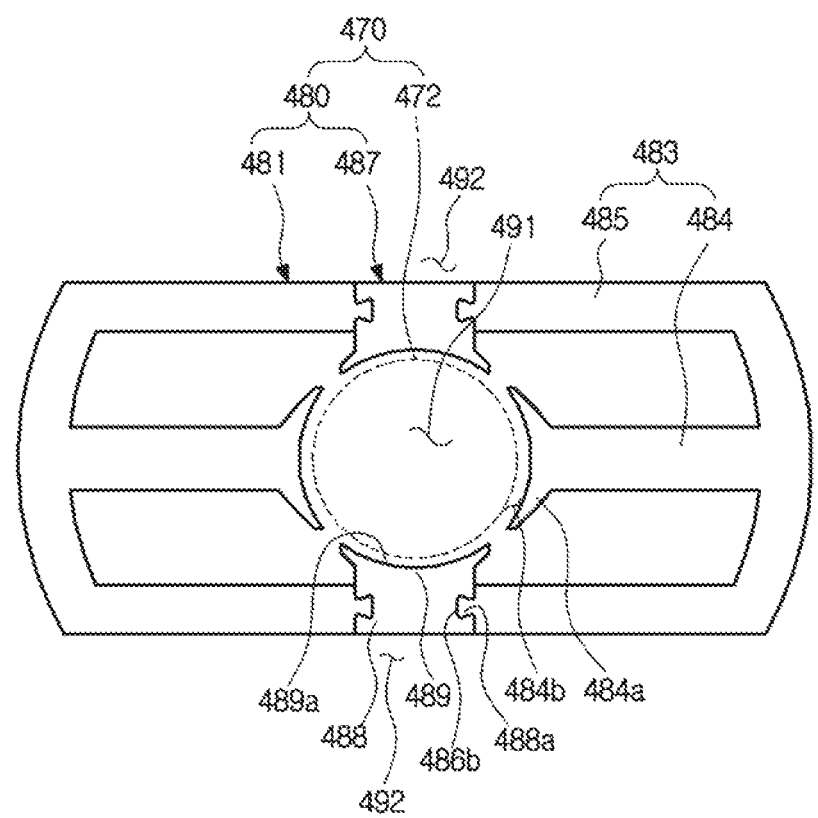
[Fig. 33]

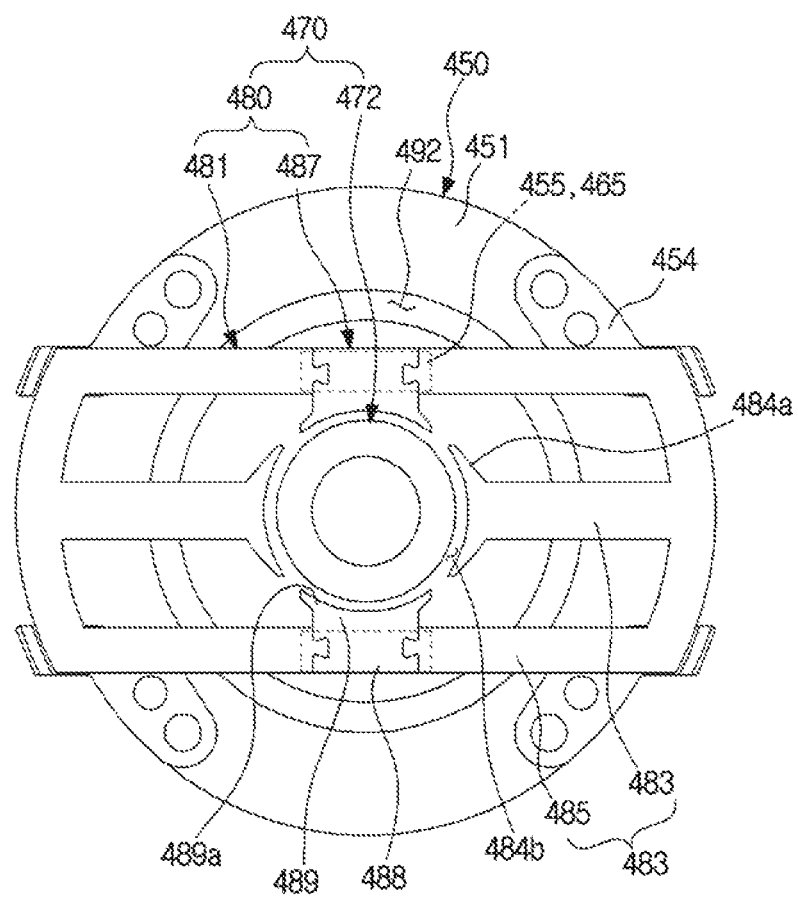

[Fig. 35]
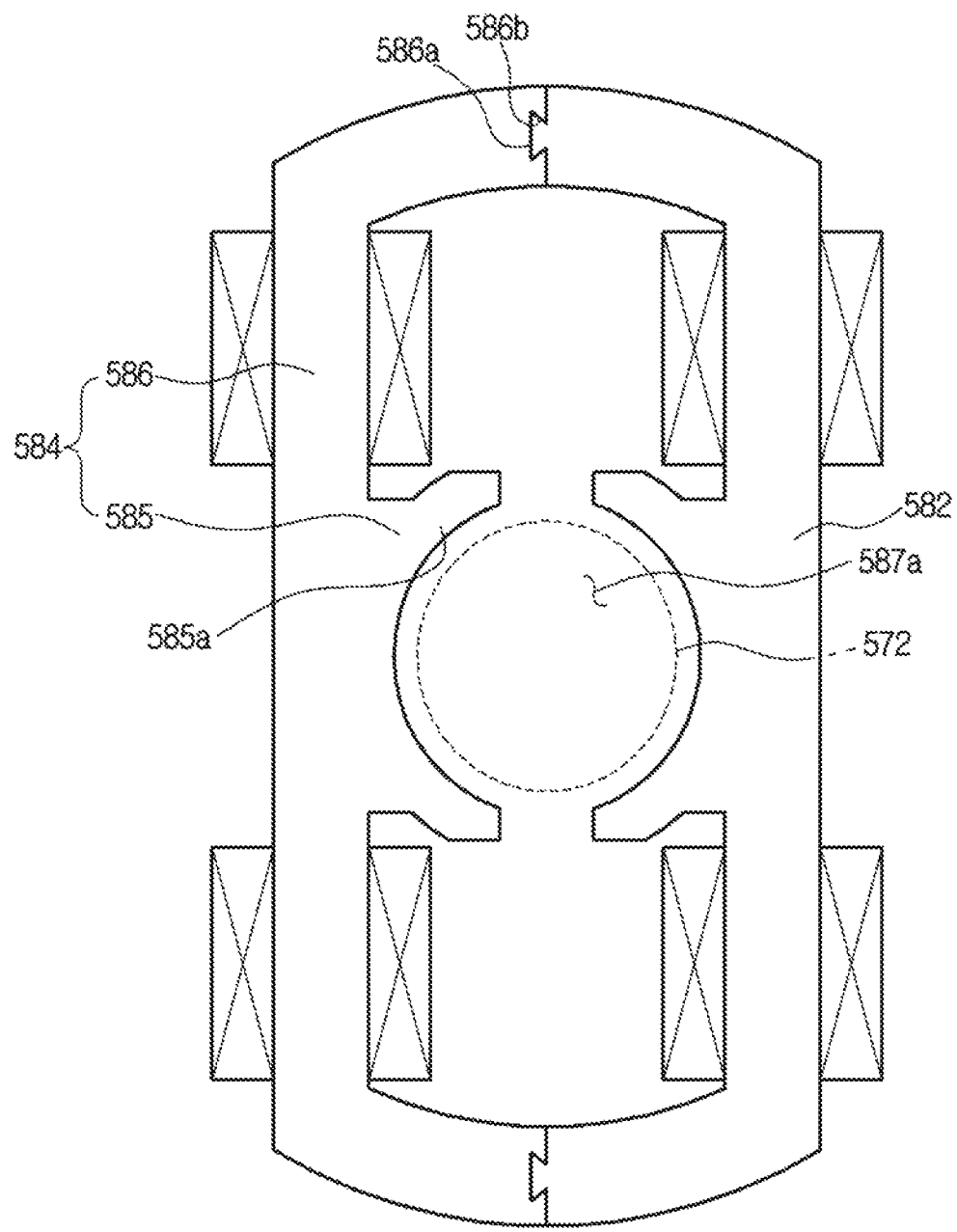

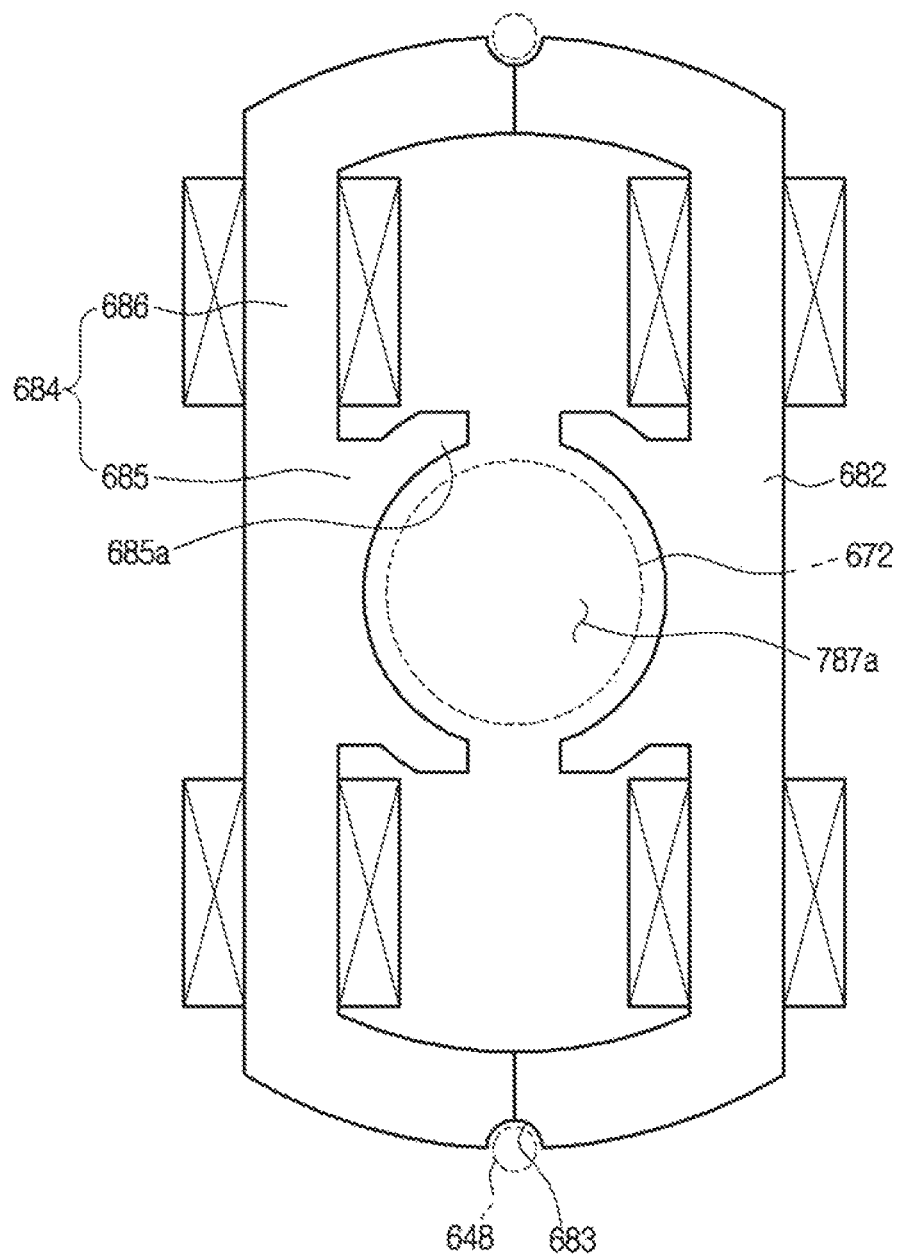
[Fig. 36]

[Fig. 37]
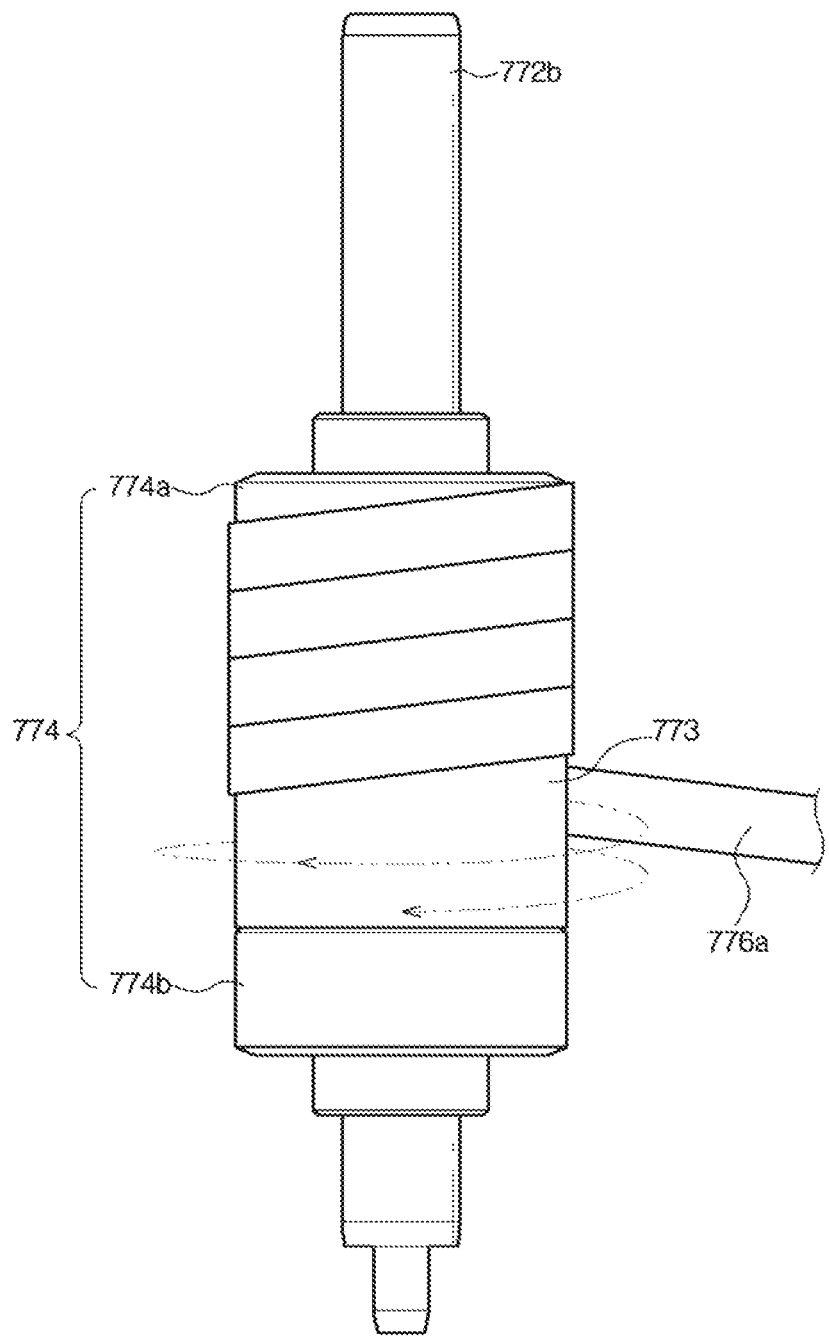

[Fig. 38]
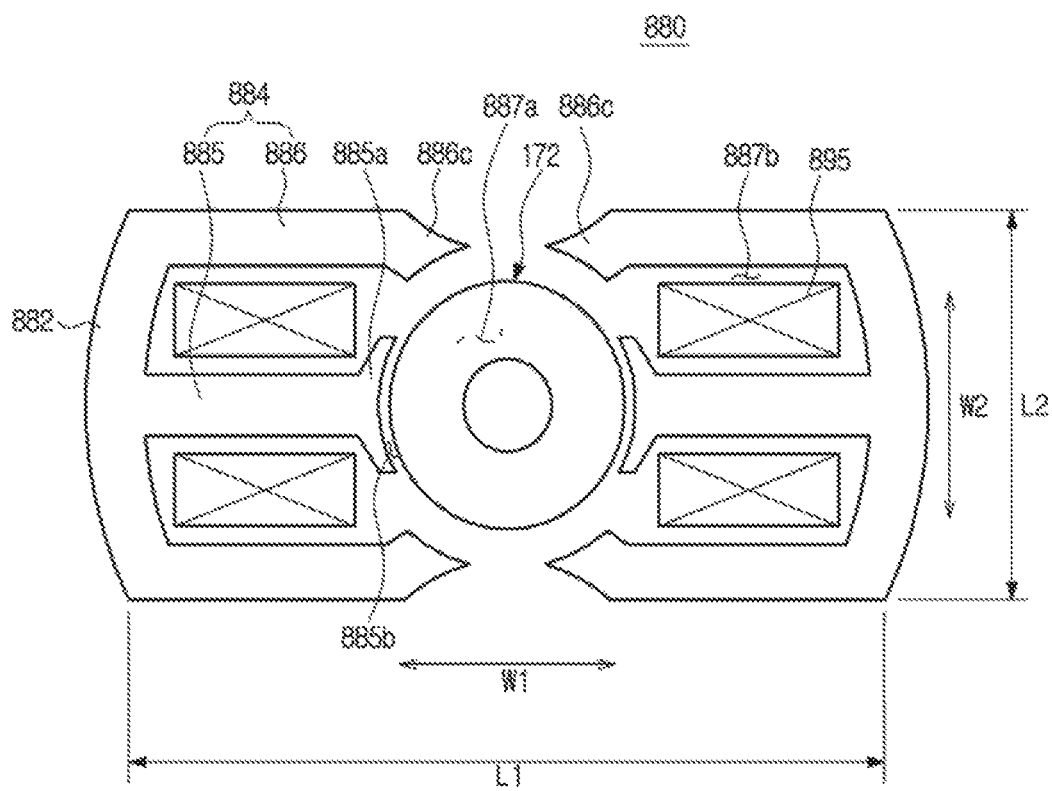
[Fig. 39]
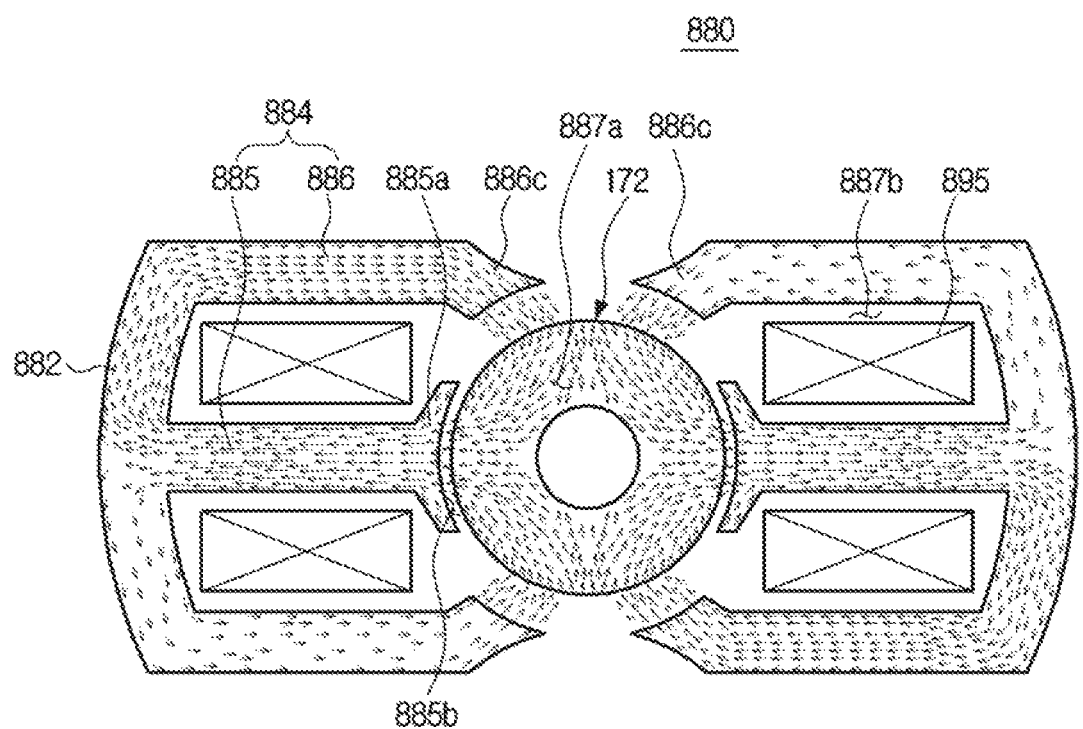

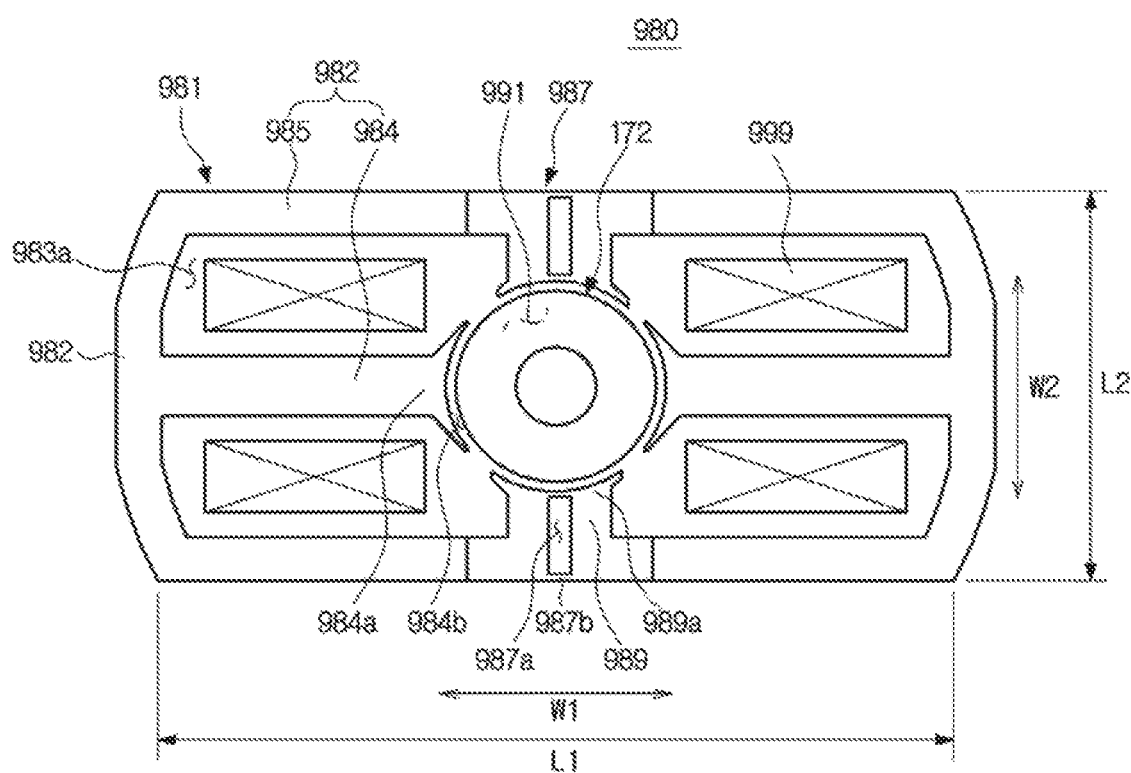
[Fig. 40]

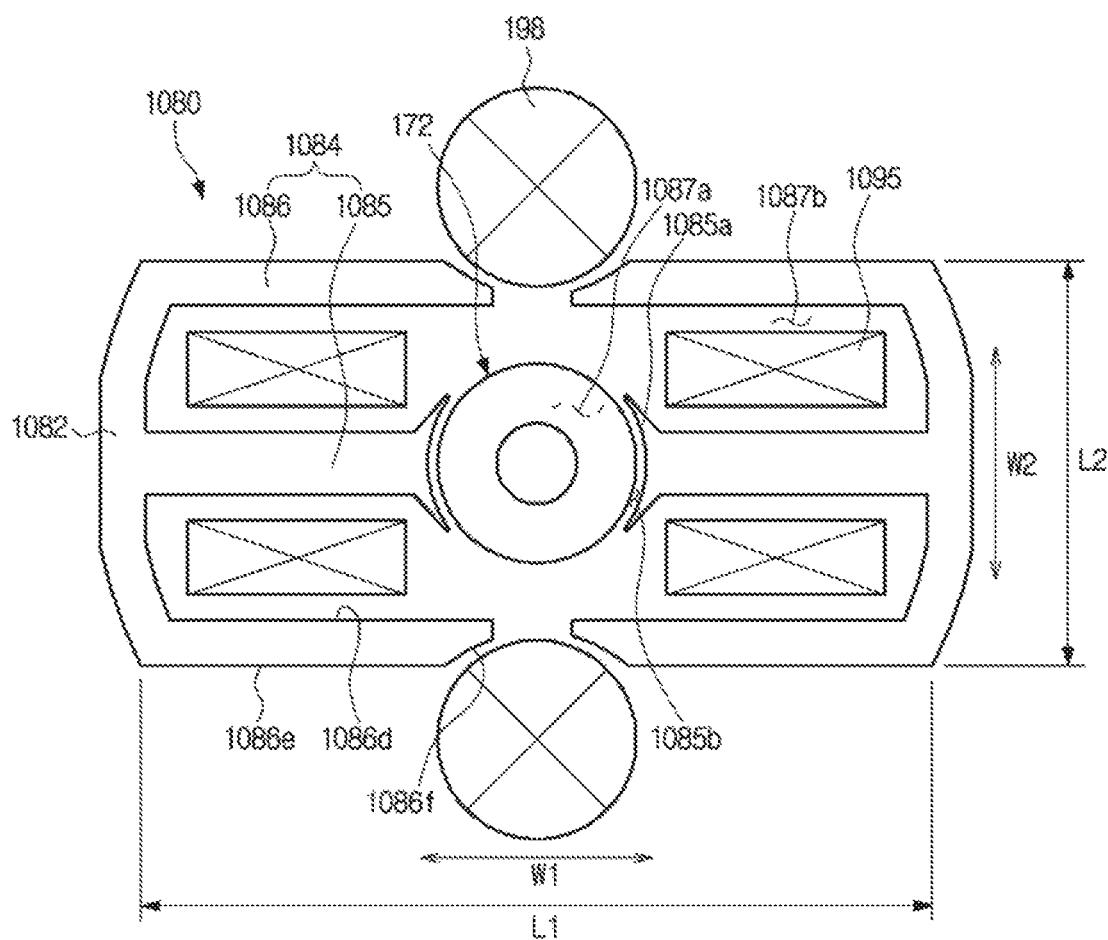
[Fig. 41]

[Fig. 42]
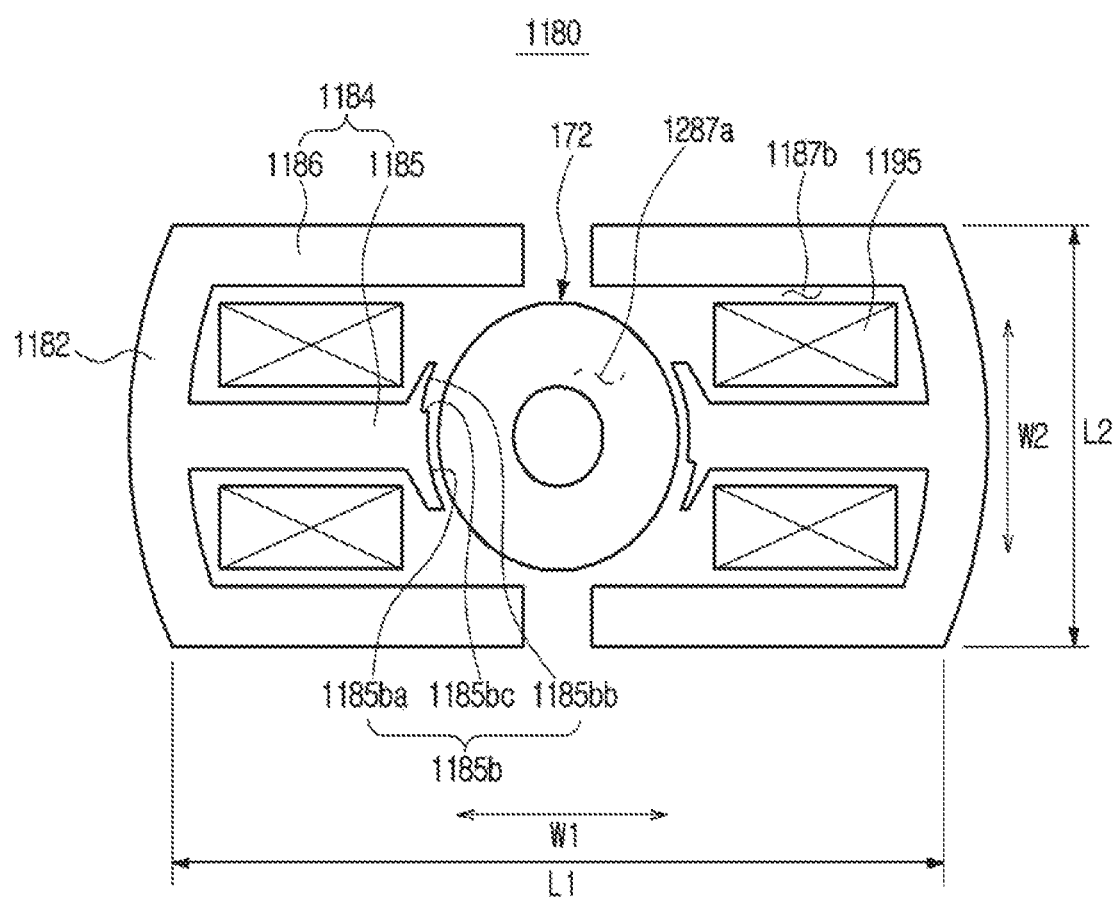

MOTOR ASSEMBLY AND CLEANER HAVING SAME

CROSS-REFERENCE TO RELATED APPLICATION

This application is a U.S. national stage application, which claims the benefit under 35 USC § 371 of PCT International Patent Application No. PCT/KR2015/003176 filed Mar. 31, 2015 which claims foreign priority benefit under 35 USC § 119 of Korean Patent Application No. 10-2014-0069826, filed on Jun. 10, 2014 and Korean Patent Application No. 10-2014-0184841, filed on Dec. 19, 2014, the entire contents of which are incorporated herein by reference.

TECHNICAL FIELD

The present invention relates to a motor assembly having an improved structure of a stator, and a cleaner having the same.

BACKGROUND ART

In general, a vacuum cleaner is a home appliance that sucks air containing foreign materials such as dust using vacuum pressure generated by a motor installed in a cleaner main body, and then filters out the foreign materials inside the cleaner main body.

The motor generates a suction force by discharging the air inside the vacuum cleaner to the outside to lower inside pressure. The suction force sucks foreign materials such as dust on a surface to be cleaned, together with outside air, through suction means, so that the foreign materials can be eliminated by a dust collecting apparatus.

The motor is a machine for acquiring a rotatory force from electrical energy, and includes a stator and a rotor. The rotor is configured to electromagnetically interact with the stator, and rotates by a force acting between a magnetic field and current flowing through a coil.

The motor rotates the rotor to generate a suction force by a suction fan rotating together with the rotor, and the components can be integrated into a single module. However, the motor, a component for fixing the motor, the suction fan, etc. spatially interfere with each other, resulting in an increase in size of the vacuum cleaner.

DISCLOSURE

Technical Problem

An aspect of the present disclosure is to provide a motor assembly having a compact size to improve the spatial efficiency of a cleaner main body, and a cleaner having the motor assembly.

Another aspect of the present disclosure is to provide a motor assembly capable of improving radiation efficiency by improving an air path structure, and a cleaner having the motor assembly.

Technical Solution

In accordance with an aspect of the present disclosure, a motor assembly includes a rotor configured to rotate; and a stator configured to electromagnetically interact with the rotor. The stator comprises a pair of stator bodies disposed to be symmetrical to each other with the rotor in between, each stator body having at least two stator cores arranged in parallel to each other.

The first direction is vertical to the second direction.

The pair of stator bodies comprises a pair of center cores disposed in a first direction to face each other with the rotor in between.

Each center core comprises an expanded core portion having a wider width than the other portion of the center core such that the inner surface of the expanded core portion surrounds the outer surface of the rotor.

Each stator body further comprises a pair of side cores located to both sides of the corresponding center core to be arranged in parallel to the center core.

The motor assembly further includes disposition space formed along a second direction of the stator.

The disposition space is formed on the same plane as the stator.

The motor assembly further includes a circuit board having a capacitor installed in the disposition space to avoid interference with the stator, and disposed on the rear surface of the stator in such a way to be vertical to a rotation axis of the rotor.

The pair of side cores of one stator body of the pair of stator bodies are coupled with the pair of side cores of the other stator body of the pair of stator bodies.

Each of the pair of side cores of one stator body of the pair of stator bodies comprises a coupling groove formed concavely at the end. Each of the pair of side cores of the other stator body of the pair of stator bodies comprises a coupling protrusion protruding to correspond to the coupling groove.

The motor assembly further includes a pair of auxiliary stators having a pair of auxiliary cores having a length that is shorter than a length of the center cores and disposed in a second direction to face each other with the rotor in between, the second direction being vertical to the first direction.

The pair of auxiliary stators is disposed between the pair of stator bodies.

Each center core comprises a center expanded core having a wider width than the other portion of the center core such that the inner surface of the center expanded core surrounds the outer surface of the rotor, and each auxiliary core comprises an auxiliary expanded core having a wider width than the other portion of the auxiliary core such that the inner surface of the auxiliary expanded core surrounds the outer surface of the rotor.

A coupling portion of the stator bodies in which the pair of stator bodies are coupled with the pair of auxiliary stators is thicker than the other portion of the pair of stator bodies.

In accordance with an aspect of the present disclosure, a motor assembly includes a rotor configured to rotate; and a stator configured to electromagnetically interact with the rotor. The stator includes a main stator having a pair of main stator bodies respectively including a pair of center cores disposed to face each other with the rotor in between; and a pair of auxiliary stators disposed to face each other with the rotor in between, having a pair of auxiliary cores having a length that is shorter than that of the center cores, and disposed between the pair of main stator bodies.

Each center core includes a main expanded core portion having a wider width than the other portion of the center core such that the inner surface of the main expanded core portion surrounds the outer surface of the rotor, and each auxiliary core comprises an auxiliary expanded core portion having a wider width than the other portion of the auxiliary core such that the inner surface of the auxiliary expanded core portion surrounds the outer surface of the rotor.

A coupling portion of the main stator bodies in which the pair of main stator bodies are coupled with the pair of auxiliary stator bodies is thicker than the other portion of the pair of main stator bodies.

The stator includes disposition space formed on the same plane as the main stator and the auxiliary stators. The stator further comprises a circuit board having a capacitor installed in the disposition space to avoid interference with the stator, and disposed on the rear surface of the stator in such a way to be vertical to a rotation axis of the rotor.

In accordance with an aspect of the present disclosure, a motor assembly includes a main body having a suction portion, and a filter member configured to filter out dust contained in air entered through the suction portion; a motor assembly disposed on a downstream with respect to the filter member inside the main body, and configured to generate a suction force. The motor assembly includes a housing having an air inlet in the front portion and an air outlet in the rear portion, the housing being in the shape of a cylinder; an impeller disposed inside the housing, and configured to generate a suction force in the suction portion; and a motor disposed on the rear surface of the impeller, and configured to transfer power to the impeller. The motor includes a rotor coupled with the impeller, and configured to rotate on a rotor axis extending in a front-back direction; a stator having a pair of stator bodies disposed to be symmetrical to each other with the rotor in between, and configured to electromagnetically interact with the rotor. The pair of stator bodies comprises at least two stator cores arranged in parallel to each other such that a stator core of one stator body of the stator bodies is disposed on the same line as a stator core of the other stator body of the stator bodies.

The motor further comprises disposition space disposed on the same plane as the stator.

The motor assembly further includes a circuit board having a capacitor installed in the disposition space to avoid interference with the stator, and disposed on the rear surface of the stator in such a way to be vertical to a rotation axis of the rotor.

Advantageous Effects

The motor and the cleaner having the same according to the present disclosure can improve the structure of the motor, thereby improving spatial efficiency, and achieving a compact size.

Also, since radiation efficiency can be improved, the performance of the motor can be improved.

BRIEF DESCRIPTION OF THE DRAWINGS

FIG. 1 shows a cleaner according to a first embodiment of the present disclosure.

FIG. 2 is a cross-sectional view showing a part of the configuration of the cleaner according to the first embodiment of the present disclosure.

FIG. 3 is a perspective view of a motor assembly according to a first embodiment of the present disclosure.

FIG. 4 is a cross-sectional view of the motor assembly according to the first embodiment of the present disclosure.

FIG. 5 is an exploded perspective view of the motor assembly according to the first embodiment of the present disclosure.

FIGS. 6A and 6B are exploded perspective views of a motor module according to a first embodiment of the present disclosure.

FIG. 7 is an exploded perspective view of a motor according to a first embodiment of the present disclosure.

FIG. 8 is a view showing arrangement of a motor and a circuit board according to a first embodiment of the present disclosure.

FIG. 9 is a front view of a motor according to a first embodiment of the present disclosure.

FIG. 10 shows electromagnetic flow of the motor according to the first embodiment of the present disclosure.

FIG. 11 is a perspective view of a rotor according to a first embodiment of the present disclosure.

FIG. 12 is an exploded perspective view of the rotor according to the first embodiment of the present disclosure.

FIGS. 13A and 13B are perspective views of a support member of the rotor according to the first embodiment of the present disclosure.

FIG. 14 is a cross-sectional view of the rotor according to the first embodiment of the present disclosure.

FIG. 15 is an exploded perspective view of an impeller and a rotor according to a first embodiment of the present disclosure.

FIG. 16 is a cross-sectional view showing coupling between an impeller and a rotor shaft according to a first embodiment of the present disclosure.

FIG. 17 shows a cleaner according to a second embodiment of the present disclosure.

FIG. 18 is a cross-sectional view showing the configuration of a part of the cleaner according to the second embodiment of the present disclosure.

FIG. 19 is a perspective view of a motor assembly according to a second embodiment of the present disclosure.

FIG. 20 is a cross-sectional view of the motor assembly according to the second embodiment of the present disclosure.

FIG. 21 is an exploded perspective view of the motor assembly according to the second embodiment of the present disclosure.

FIGS. 22A and 22B are exploded perspective views of a motor module according to a second embodiment of the present disclosure.

FIG. 23 is an exploded perspective view of a motor according to a second embodiment of the present disclosure.

FIG. 24 shows the arrangement of a motor and a circuit board according to a second embodiment of the present disclosure.

FIG. 25 is a front view of a motor according to a second embodiment of the present disclosure, and FIG. 26 shows the flow of a magnetic field formed in the motor according to the second embodiment of the present disclosure.

FIG. 27 is a graph showing the performance of a motor according to a second embodiment of the present disclosure.

FIG. 28 shows a stator according to a third embodiment of the present disclosure.

FIGS. 29 and 30 are perspective views of a motor module according to a fourth embodiment of the present disclosure.

FIG. 31 is a perspective view of a front resting housing according to the fourth embodiment of the present disclosure.

FIG. 32 is a perspective view of a rear resting housing according to the fourth embodiment of the present disclosure.

FIG. 33 shows a motor according to the fourth embodiment of the present disclosure.

FIG. 34 shows the arrangement of a resting housing and a motor according to the fourth embodiment of the present disclosure.

FIG. 35 is a view showing a motor according to a fifth embodiment of the present disclosure.

FIG. 36 shows a motor according to a sixth embodiment of the present disclosure.

FIG. 37 is a view for describing a method of manufacturing a rotor according to a seventh embodiment of the present disclosure.

FIG. 38 is a front view of a stator according to an eighth embodiment of the present disclosure.

FIG. 39 shows electromagnetic flow of the stator according to the eighth embodiment of the present disclosure.

FIG. 40 is a front view of a stator according to a ninth embodiment of the present disclosure.

FIG. 41 is a front view of a stator according to a tenth embodiment of the present disclosure.

FIG. 42 is a front view of a stator according to the eleventh embodiment of the present disclosure.

BEST MODE

Hereinafter, embodiments of the present disclosure will be described in detail with reference to the accompanying drawings.

FIG. 1 shows a cleaner according to a first embodiment of the present disclosure, and FIG. 2 is a cross-sectional view showing a part of the configuration of the cleaner according to the first embodiment of the present disclosure.

A cleaner 1 according to the first embodiment of the present disclosure may be a stick type cleaner.

The cleaner 1 may include a stick main body 10, a suction portion 20, and a cleaner main body 30.

The stick main body 10 may be coupled with the upper end of the cleaner main body 30 so that a user can grip the stick main body 10 to manipulate the cleaner 1. The stick main body 10 may include a controller 12 so that the user can control the cleaner 1 through the controller 12.

The suction portion 20 may be disposed below the cleaner main body 30 to contact a surface that is to be cleaned. The suction portion 20 may contact the surface that is to be cleaned, and suck dust or dirt on the surface into the inside of the cleaner main body 30 using a suction force generated by a motor assembly 100.

The cleaner main body 30 may include the motor assembly 100 installed therein, and a dust container 40. The motor assembly 100 may generate power to generate a suction force in the inside of the cleaner main body 30, and the dust container 40 may be disposed in the upper area of an air path than the motor assembly 100 to filter out dust or dirt from air sucked through the suction portion 20 to collect the dust or dirt.

FIG. 3 is a perspective view of a motor assembly according to a first embodiment of the present disclosure, FIG. 4 is a cross-sectional view of the motor assembly according to the first embodiment of the present disclosure, and FIG. 5 is an exploded perspective view of the motor assembly according to the first embodiment of the present disclosure.

The motor assembly 100 may be installed in the inside of the cleaner main body 30 to generate a suction force.

The motor assembly 100 may include a housing 102, a motor 170 installed in the inside of the housing 102 and configured to generate a suction force, a resting housing 142 configured to fix the motor 170 in the housing 102, and an impeller 130 installed on a rotor axis 172a of the motor 170 and configured to rotate.

The housing 102 may include a first housing 110, and a second housing 120 coupled with the first housing 110. The housing 102 may have a cylinder-like shape, however, the shape of the housing 102 is not limited to this. That is, the housing 102 may be formed in any other shape. The first housing 110 may be separated from the second housing 120 in the axial direction of the rotor axis 172a. The first housing 110 may include an air inlet 111 to introduce air sucked by the motor 170 into the inside of the housing 102, and the second housing 120 may include an air outlet 121 to discharge the air entered the inside of the housing 102. Since the second housing 120 is coupled with the first housing 110 on the rear surface of the first housing 110, the air inlet 111 may be disposed in the front portion of the housing 102, and the air outlet 121 may be disposed in the rear portion of the housing 102. However, the air inlet 111 and the air outlet 121 may be disposed at any other positions.

The first housing 110 may be coupled with the second housing 120 to form an air path 113 extending from the air inlet 111 to the air outlet 121 and to form inside space 127 in which the motor 170, the impeller 130, etc. are installed.

The air path 113 may include a module path 113a and a module outside path 113b. The motor assembly 100 may suck air through the impeller 130, and the sucked air may flow through the air path 113. Air entered the inside of the housing 102 may enter the inside of a motor module 140 by a path guide 194 of an insulator 190 to flow through the module path 113a, and pass between the outside of the motor module 140 and the inside of the housing 102 to flow through the module outside path 113b. The sucked air passing through the module path 113a may cool heat generated from the inside of the motor module 140. The sucked air passed through the module path 113a and the sucked air passed through the module outside path 113b may pass through a circuit board 196 to thus cool heat generated from the circuit board 196.

The first housing 110 may include a shroud 112.

The shroud 112 may be disposed to correspond to the impeller 130 or a diffuser 122 which will be described later, so as to guide air entered the inside of the housing 102 by the motor 170. The shroud 112 may be disposed to form wide space in the axial direction of the rotor axis 172a, so that a wide air path can be formed according to the flow direction of the sucked air by the motor 170 from the air inlet 111. The shroud 112 may guide air entered through the air inlet 111 to the inside of the housing 102, and may have a shape corresponding to the upper portion of the impeller 130.

In the inside of the air inlet 111 of the first housing 110, the impeller 130 may be disposed. The impeller 130 may rotate on the rotor axis 172a. The impeller 130 may include a plurality of blades 132 to generate the flow of air. The impeller 130 may be configured such that a radius of rotation of the plurality of blades 132 decreases away from a rotor 172, and air entered in the axial direction of the rotor axis 172a is discharged in the radial direction of the rotor axis 172a according to rotation of the impeller 130. However, the shape and location of the impeller 130 are not limited as long as the impeller 130 can flow air.

The impeller 130 may be made of a plastic material. More specifically, the impeller 130 may be made of carbon fiber reinforced plastic containing a carbon fiber.

The second housing 120 may include the diffuser 122. The diffuser 122 may be configured to increase the velocity of air flow by the impeller 130. The diffuser 122 may be positioned outside the impeller 130 in the radial direction of the impeller 130.

The diffuser 122 may be disposed in a radial direction with respect to the impeller 130. More specifically, the diffuser 122 may be formed in directions extending from the plurality of blades 132 of the impeller 130. The diffuser 122 may be formed with a plurality of ribs 123 and 124, and the plurality of ribs 123 and 124 may be spaced apart from each other in the directions extending from the plurality of blades 132. The plurality of ribs 123 and 124 may guide air flow by the impeller 130, while increasing the flow velocity of the air. More specifically, the diffuser 122 and the shroud 112 formed in the first housing 110 may form a diffuser path 125 to guide air flow by the impeller 130 while increasing the flow velocity of the air.

The plurality of ribs 123 and 124 may include a first rib 123 and a second rib 124. The first rib 123 may be disposed on the same plane as the downstream end of air flow by the impeller 130, and the second rib 124 may be inclined at a predetermined angle toward the rotor axis 172a so that air guided by the first rib 123 flows in an up-down direction being the axial direction of the rotor axis 172a in the inside of the housing 102.

In the inside of the housing 102, the motor module 140 may be installed. The motor module 140 may fix the motor 170 as a module in the inside of the housing 102.

The motor module 140 may include the motor 170 and the resting housing 142.

The resting housing 142 may include a front resting housing 150, and a rear resting housing 160 coupled with the front resting housing 150 with the motor 170 in between.

The front resting housing 150 may be fixed at the housing 102. More specifically, a resting hole 126 may be formed in the shape of a hole in the center of the second housing 120 so that the front resting housing 150 is coupled with the resting hole 126. The front resting housing 150 may be inserted into the resting hole 126, however, a method of coupling the front resting housing 150 with the resting hole 126 is not limited.

The front resting housing 150 may include a front resting housing body 151, an impeller resting portion 153, and a front resting portion 154. The front resting housing body 151 may have a disk-like shape, and include a body coupling portion 152 (see FIG. 6A) corresponding to the shape of the resting hole 126 so as to be coupled with the resting hole 126 of the second housing 120, as described above.

The impeller 130 may be rested at the impeller resting portion 153a on the front surface of the front resting housing body 151. The front surface of the impeller resting portion 153 may be formed to correspond to the shape of the rear surface of the impeller 130 in order not to interfere in rotation of the impeller 130 coupled on the rotor axis 172a.

The motor 170 may be rested at the front resting portion 154 on the rear surface of the front resting housing body 151. The front resting portion 154 may rest and fix a stator 180 thereon such that the center of the rotatable rotor 172 is aligned with the rotation center of the impeller 130.

The shape of the front resting portion 154 is not limited, and in the embodiment of the present disclosure, the front resting portion 154 may protrude from the front resting housing body 151 so that the motor 170 can be spaced a predetermined distance apart from the front resting housing body 151 and rested.

The location of the front resting portion 154 is not limited, however, in the embodiment of the present disclosure, since the stator 180 extends in a first direction W1 (see FIG. 8), four front resting portions 154 may be disposed to correspond to the edges of the stator 180.

The rear resting housing 160 may be coupled with the front resting housing 150, and the motor 170 may be located between the front resting housing 150 and the rear resting housing 160.

The rear resting housing 160 may include a rear resting housing body 161 and a rear resting portion 164. The rear resting housing body 161 may extend in the longitudinal direction of the stator 180 to correspond to the shape of the stator 180.

The location of the rear resting portion 164 is not limited, however, in the embodiment of the present disclosure, since the stator 180 extends in the longitudinal direction, four rear resting portions 164 may be disposed to correspond to the edges of the stator 180.

In order to couple the front resting housing 150 with the rear resting housing 160, screw holes 151b and 161b may be provided to couple the front resting housing 150 with the rear resting housing 160 using screws.

A structure in which the motor 170 is fixed in the inside of the front resting housing 150 and the rear resting housing 160 will be described in detail, later.

FIGS. 6A and 6B are exploded perspective views of a motor module according to a first embodiment of the present disclosure.

A front through hole 151a and a rear through hole 161a may be formed in the centers of the front resting housing 150 and the rear resting housing 160 so that the rotor axis 172a can pass through the front through hole 151a and the rear through hole 161a. In the front through hole 151a and the rear through hole 161a, a front bearing 173a and a rear bearing 173b may be disposed to rotate on the rotor axis 172a.

The front resting housing 150 may include a front resting protrusion 156 and the front resting portions 154.

The front resting portions 154 may be disposed on the inner surface of the front resting housing 150, so that the side surfaces of the motor 170 can be rested on the front resting portions 154. In order to align the centers of the rotor 172, the impeller 130, and the diffuser 122 when the stator 180 is rested or fixed on the front resting portions 154, the front through hole 151a may be formed at the same distance from the plurality of front resting portions 154.

The front resting protrusion 156 may protrude from the body of the front resting housing 150, along the circumference of the front resting portion 154, such that the inner side surface of the front resting protrusion 156 surrounds the motor 170. The front resting protrusion 156 may prevent the motor assembly 100 from being dislocated vertically to the rotor axis 172a when the motor assembly 100 operates. More specifically, the front surface of the motor 170 may be rested on the front resting portion 154, and the side surface of the motor 170 may be rested on a front protrusion resting surface 156a of the front resting protrusion 156. In the front resting protrusion 156, a front guide surface 156b may be formed to guide the motor 170 to be easily rested on the front resting portion 154. The front guide surface 156b may be formed on the end of the front resting protrusion 156 in such a way to be inclined at a predetermined angle toward the front protrusion resting surface 156a of the front resting protrusion 156 and connected to the front protrusion resting surface 156a.

The body of the front resting housing 150 may have a circle-like shape, and four front resting protrusions 156 may be formed to protrude from the body of the front resting housing 150.

The rear resting housing 160 may include a rear resting protrusion 166, and the rear resting portions 164.

The rear resting portions 164 may be installed in the inside of the rear resting housing 160 such that the other side surfaces of the motor 170 are rested on the rear resting portions 164. In order to align the centers of the rotor 172, the impeller 130, and the diffuser 122 when the stator 180 is rested or fixed on the rear resting portions 164, the rear through hole 161a may be formed at the same distance from the plurality of rear resting portions 164.

The rear resting protrusion 166 may protrude from the body of the rear resting housing 160, along the circumferences of the rear resting portions 164, such that the inner side surface of the rear resting protrusion 166 surrounds the motor 170. The rear resting protrusion 166 may prevent the motor assembly 100 from being dislocated vertically to the rotor axis 172a, together with the front resting protrusion 156, when the motor assembly 100 operates.

In the inner surface of the rear resting protrusion 166, a rear guide surface 167b may be formed with an inclination of a predetermined angle to guide the motor 170 to be easily rested on the rear resting portion 164 when the motor 170 is coupled with the rear resting protrusion 166. More specifically, the rear surface of the motor 170 may be rested on the rear resting portion 164, and the side surface of the motor 170 may be rested on a rear protrusion resting surface 167a of the rear resting protrusion 166. In the rear resting protrusion 166, the rear guide surface 167b may be formed to guide the motor 170 to be easily rested on the rear resting portion 164. The rear guide surface 167b may be formed on the end of the rear resting protrusion 166 in such a way to be inclined at a predetermined angle and connected to the rear protrusion resting surface 167a.

The body of the rear resting housing 160 may extend in the first direction W1 being the longitudinal direction of the stator 180, to correspond to the shape of the stator 180 which will be described later. Four rear resting protrusions 166 may be disposed in correspondence to the front resting protrusions 156 of the front resting housing 150.

The rear resting housing 160 may include a magnet sensor 144.

The magnet sensor 144 may be disposed on the same axis as a magnet of the rotor 172 to recognize a position of the rotor 172 according to rotation of the rotor 172. The magnet sensor 144 may transfer information about the position of the rotor 172 to a position sensor (not shown) of the circuit board 196, so that the circuit board 196 can control the position of the rotor 172.

The magnet sensor 144 may be rested on a sensor bracket 146 to transfer information to the position sensor of the circuit board 196. One end of the sensor bracket 146 may be coupled with a sensor resting portion 168 provided on the rear surface of the rear resting housing 160, and the other end of the sensor bracket 146 may be coupled with the circuit board 196. By providing the magnet sensor 144, instead of locating a position sensor on the rotor 172, it is possible to achieve the position control of the rotor 172 by adding a simple structure.

The front resting housing 150 and the rear resting housing 160 may have the screw holes 151b and 161b, respectively, so that the front resting housing 150 can be coupled with the rear resting housing 160 using screws 148. More specifically, in the current embodiment, four screw holes 151b may be respectively formed in the four front resting portions 154, and four screw holes 161b may be respectively formed in the four rear resting portions 164, so that the screws 148 can pass through the screw holes 161b of the rear resting portions 164 and then be coupled with the screw holes 151b of the front resting portions 154. That is, the front resting housing 150 may be coupled with and fixed at the rear resting housing 160 by the four screws 148.

FIG. 7 is an exploded perspective view of a motor according to a first embodiment of the present disclosure.

The motor 170 may include the rotor 172 and the stator 180.

The rotor 172 may be rotatable in the center of the stator 180.

The stator 180 may electromagnetically interact with the rotor 171.

The stator 180 may include a stator body 182, an insulator 190, and a coil 195.

A pair of stator bodies 182 may be disposed in the first direction W1 to face each other with the rotor 172 in between. That is, the stator bodies 182 may be disposed longitudinally in such a way to face each other. The pair of stator bodies 182 may be coupled with each other in the first direction W1 being a longitudinal direction. That is, the stator 180 may surround the rotor 172 such that the length of the stator 180 in the first direction W1 is longer than the length of the stator 180 in a second direction W2 (see FIG. 8) that is vertical to the first direction W1, instead of being disposed in the shape of a circle along the outer surface of the rotor 172. That is, if the length of the stator 180 in the first direction W1 is L1 and the length of the stator 180 in the second direction W2 is L2, L1 is longer than L2.

Since the stator 180 has a longer length in one direction than in the other direction, the outside space of the stator 180 in the other direction may be wider than the outside space of the stator 180 in the one direction. Therefore, a path passing the corresponding space can be ensured so that the cooling performance of the motor 170 and the performance of the motor assembly 100 can be improved.

Since the stator 180 is disposed in the first direction W1, disposition space 188 may be formed along the circumference direction of the stator 180, with the rotor 172 as the center. That is, the disposition space 188 may be formed along the side portions of the stator 180, which are vertical to the longitudinal direction of the stator 180.

The disposition space 188 may be formed on the same plane as the stator 180 to make better use of the inside space 127 of the motor assembly 100. The disposition space 188 may be formed in a semicircle-like shape, and in the disposition space 188, components of the motor assembly 100 may be installed. In the current embodiment of the present disclosure, a capacitor 198 may be installed in the disposition space 188.

A pair of disposition spaces 188 may be respectively formed to both sides of the stator 180, and accordingly, a pair of capacitors 198 may be disposed. In the current embodiment of the present disclosure, two capacitors 198 may be disposed in each disposition space 188 so that totally four capacitors 198 may be disposed. The capacitors 198 may function to smooth a voltage or to remove ripples.

In the center of the pair of stator bodies 182, rotor accommodating space 187a may be formed to accommodate the rotor 172. The stator bodies 182 may be formed by stacking a plurality of pressed steel plates.

Each stator body 182 may include at least one stator core 184. A plurality of stator cores 184 may be arranged in parallel to each other. Each stator body 182 may include at least two stator cores 184 arranged in parallel to each other, wherein the stator cores 184 may be arranged symmetrically with the rotor 170 in between.

The stator cores 184 may include a center core 185, and a side core 186 located to the side of the center core 185.

A pair of center cores 185 may face each other with the rotor 172 in between, and the rotor accommodating space 187*a* may be formed between the center cores 185 such that the rotor 172 is rotatable in the rotor accommodating space 187*a*. A pair of side cores 186 may be located to both sides of each center core 185 in such a way to be arranged in parallel to the center core 185.

The stator cores 184 of any one stator body 182 and the stator cores 184 of the other stator body 182 may be aligned on the same lines. That is, the stator cores 184 may be aligned on the same lines to face each other. In other words, on extension lines in longitudinal direction of the stator cores 184 of any one stator body 182, the stator cores 184 of the other stator body 182 may be disposed.

The pair of side cores 186 of any one stator 180 may be coupled with the pair of side cores 186 of the other stator 180. Any ones of the facing sides cores 186 may include coupling protrusions 186*a*, and the other ones of the side cores 186 may include coupling grooves 186*b* which the coupling protrusions 186*a* can be inserted into and coupled with.

The center core 185 and the side cores 186 may be arranged in parallel to each other in the same direction, which facilitates wiring when the coil 195 is wound around the stator 180.

A plurality of stator slots 187*b* may be formed between the stator cores 184. If the coil 195 is wound around the stator cores 184, the coil 195 may be accommodated in the stator slots 187*b*. In the inner ends of the stator cores 184 adjacent to the rotor 172, expanded core portions 185*a* in which the widths of the stator cores 184 are partially expanded may be formed. More specifically, in the inner end of the center core 184 facing the rotor 172, an expanded core portion 185*a* may be formed in which the width of the center core 184 is partially expanded to surround the outer surface of the rotor 172. Between the inner surface of the expanded core portion 185*a* and the outer surface of the rotor 172, an air gap 185*b* may be formed in which the rotor 172 rotates.

The insulator 190 may be formed of an electrical insulating material, and surround a part of the stator 180 and the stator cores 184. The insulator 190 may include an insulator body 191 corresponding to one surface of the stator body 182, a center core support 192 formed in the insulator 191 in correspondence to the center core 185, and a coil guide portion 193 protruding from the inner part in radial direction of the center coil support 192.

The coil 195 may be wound around the center core 185 and the center core support 192 in the state in which the insulator 190 is coupled with the stator body 182. However, the coil 195 may be wound around the side core 186 and the insulator 190 surrounding the side core 186. In the embodiment of the present disclosure, it will be described that the coil 195 is wound around the center core 185 and the center core support 192. That is, in the embodiment of the present disclosure, an example in which the coil 195 is wound around the center core 185 will be described, however, the coil 195 may be wound around the pair of side cores 186, as well as the center core 185, to have 3-phase poles, for output density and easy control.

The insulator 190 may include a flow guide 194. The flow guide 194 may be inclined from the ends in longitudinal direction of the stator 180 toward the air path 113, to pass a part of air sucked into the inside of the housing 102 by the impeller 130 through the inside of the motor module 140, thereby forming the module path 113*a*. That is, the air path 113 may be partitioned into the module path 113*a* and the module outside path 113*b* by the flow guide 194.

The insulator 190 may include a body coupling portion 191*a*. The body coupling portion 191*a* may be disposed at one side of the insulator body 191 to guide the coil 195 wound around the motor 170 to the circuit board 196. Also, the body coupling portion 191*a* may be inserted into and fixed at the circuit board 196 so that the motor 170 can be coupled with the circuit board 196.

FIG. 8 is a view showing arrangement of a motor and a circuit board according to a first embodiment of the present disclosure.

Below the motor 170, the circuit board 196 may be disposed to transfer electrical signals to the motor 170. In one surface of the circuit board 196, a mounting area 197 on which circuit elements are mounted may be provided. On the mounting area 197, circuit elements, such as heating elements, the capacitors 198, etc., may be mounted.

Since the motor 170 needs to receive electrical signals from the circuit board 196 and remove heat of the circuit board 196 through the flow of air generated by the operation of the motor 170, the motor 170 may be disposed adjacent to the circuit board 196. However, in order to prevent the motor 170 from interfering with the circuit elements, unnecessary space increases, resulting in an increase in size of the motor assembly 100.

In the embodiment of the present disclosure, the motor 170 may be long in one direction, and the disposition space 188 may be provided on the same plane. That is, in both sides of the stator 180 extending in the longitudinal direction, the disposition space 188 may be formed as free space in which the other elements of the motor assembly 100 can be installed. In the embodiment of the present disclosure, since the housing 102 has a cylinder-like shape, or the impeller 130 is in the shape of a circle, the disposition space 188 may be in the shape of a semicircle having an arc of a predetermined length.

In order to avoid interference with the motor 170, electric elements may be installed in the disposition space 188 of the motor 170 on the mounting area 197 of the circuit board 196. In the current embodiment, an example in which the capacitors 198 are installed in the disposition space 188 is shown, however, other elements may be installed in the disposition space 188.

Through the configuration, the motor 170 can be disposed close to the circuit board 196, which makes better use of the inside space of the housing 102.

FIG. 9 is a front view of a motor according to a first embodiment of the present disclosure, and FIG. 10 shows electromagnetic flow of the motor according to the first embodiment of the present disclosure.

The stator 180 may be configured such that the pair of stator bodies 182 are symmetrical to face each other.

The pair of expanded core portions 185*a* formed at the ends of the pair of center cores 185 around the rotor 172 may be configured such that the centers of the inner curved surfaces of the expanded core portions 185*a* are misaligned from each other. More specifically, the center of the inner surface of any one of the pair of expanded core portions 185*a* surrounding the outer surface of the rotor 172 may be misaligned with the center of the inner surface of the other one of the pair of expanded core portions 185*a*. Through the configuration, the pair of expanded core portions 185*a* surrounding the rotor 172 may apply electromagnetic effects with different magnitudes and in different directions to the rotor 172 so that the rotor 172 can rotate in any one direction.

FIG. 10 shows electromagnetic flow passing through the stator 182 and the rotor 172.

Electromagnetic flow passing through the stator 180 and the rotor 172 may be formed between any one of the pair of side cores 186 and the center core 185, by a change in polarity caused by rotation of the rotor 172.

Hereinafter, an assembling process of the motor assembly 100 according to an embodiment of the present disclosure will be described.

Referring to FIG. 7, the pair of stator bodies 182 may be coupled into the stator 180 by coupling the side cores 186 that face each other. At least one part of the stator 180 may be covered by the insulator 190 for electrical insolation.

Referring to FIGS. 6A and 6B, in the rotor accommodating space 187*a* formed in the pair of stator bodies 182 coupled with the insulator 190, the expanded core portions 185*a* and the air gap 185*b* may be formed so that the rotor 172 is inserted into the rotor accommodating space 187*a*, and the resting housing 142 may fix the structure as a module.

More specifically, one surface of the motor 170 may be rested on the front resting portion 154 of the front resting housing 150, the other surface of the motor 170 may be rested on the rear resting portion 164 of the rear resting housing 160, and the side surfaces of the motor 170 may be rested on the resting protrusions 156 and 166.

Also, the rotor axis 172*a* may pass through the through holes 151*a* and 161*a* of the resting housing 142, so that the concentric axis of the rotor 172 is aligned with that of the stator 180 when the motor 170 is rested on and coupled with the resting housing 142.

The front resting housing 150 may be coupled with the rear resting housing 160 by the screws 148, and a method of coupling the front resting housing 150 with the rear resting housing 160 is not limited to this.

In this way, the motor 170 and the resting housing 142 may be provided as a single module.

Referring to FIG. 5, the motor module 140 may be coupled with the resting hole 126 of the second housing 120. More specifically, the body coupling portion 152 of the front resting housing 150 may be coupled with the resting hole 126 of the second housing 120.

In the front portion of the motor module 140, the impeller 130 may be coupled on the rotor axis 172*a*. More specifically, the impeller 130 may be disposed on the impeller resting portion 153 of the front resting housing 150.

The first housing 110 may be coupled with the front portion of the second housing 120. In the inner surface of the first housing 110, the shroud 112 may be disposed to form a flow path in the inside of the housing 102, together with the impeller 130 and the diffuser 122.

Behind the motor module 140, the capacitors 198 may be disposed in the disposition space 188 of the motor 170, and the circuit board 196 may be coupled with the rear portion of the motor module 140 such that the electric elements do not interfere with the motor 170. More specifically, the motor module 140 may be physically coupled with the circuit board 196 by a circuit coupling member coupled with the insulator 190, and the coil 195 provided in the motor 170 may be electrically coupled with the circuit board 196.

By coupling the motor module 140 with the housing 102 and the circuit board 196, the motor assembly 100 can be assembled.

FIG. 11 is a perspective view of a rotor according to a first embodiment of the present disclosure, and FIG. 12 is an exploded perspective view of the rotor according to the first embodiment of the present disclosure.

The rotor 172 may be installed in the rotor accommodating space 187*a* of the stator 180. The rotor 172 may electromagnetically interact with the stator 180 in the rotor accommodating space 187*a*.

The rotor 172 may include a rotor shaft 172*b* and a magnet 173.

The rotor shaft 172*b* may be rotatable on the rotor axis 172*a*. One end of the rotor shaft 172*b* may be coupled with the impeller 130 so that the impeller 130 can rotate together with the rotor 172. The rotor shaft 172*b* may be in the shape of a pole. The rotor shaft 172*b* may rotate while forming the air gap 185*a* together with the expanded core portions 185*a* of the stator 180.

The rotor shaft 172*b* may pass through the magnet 173. That is, the magnet 173 may be disposed around the rotor shaft 172*b*. The shape and position of the magnet 173 are not limited, however, in the embodiment of the present disclosure, the magnet 173 may be in the shape of a ring so that the rotor shaft 172*b* can pass through the center of the ring.

The rotor 172 may include a support member 174.

The support member 174 may be adjacent to the magnet 173. More specifically, the support member 174 may be disposed adjacent to the magnet 173 in the direction of the rotor axis 172*a*. A pair of support members 174 may be respectively disposed at both ends of the magnet 173 in the direction of the rotor axis 172*a*. The support member 174 may be a balancer. That is, a pair of balancers may be respectively disposed at both ends of the magnet 173, so as to compensate for eccentricity according to rotation of the rotor 172.

The rotor shaft 172*b* may pass through the support members 174. That is, the support members 174 may be disposed around the rotor shaft 172*b*. The shape and position of the support members 174 are not limited, however, in the embodiment of the present disclosure, the support members 174 may be in the shape of a ring so that the rotor shaft 172*b* can pass through the center of the ring.

The support members 174 may include a first support member 174*a* disposed in one end of the magnet 173 in the direction of the rotor axis 172*a*, and a second support member 174*b* disposed in the other end of the magnet 173 in the direction of the rotor axis 172*a*. If the support members 174 are balancers, the first support member 174*a* is also referred to as a first balancer, and the second support member 174*b* is also referred to as a second balancer.

The rotor 172 may further include a magnet cover 176.

The magnet cover 176 may surround the outer surface of the magnet 173. If the rotor 172 rotates at high speed, the magnet 173 may be scattered so that the durability of the magnet 173 may deteriorate. For this reason, the magnet cover 176 may surround the outer surface of the magnet 173 to improve the durability of the magnet 173.

The magnet cover 176 may be formed of any material capable of improving the durability of the magnet 173, and in the current embodiment, the magnet cover 176 may be formed of a carbon fiber. By rolling the magnet cover 176 made of a carbon fiber to surround the outer surface of the magnet 173, and then hardening the magnet cover 176, the durability of the magnet cover 176 can be improved enough to bear the rapid rotation of the rotor 172.

The magnet cover 176 may be directly rolled on the magnet 173. Or, the magnet cover 176 may be wound around a jig in the shape of a round bar to be hardened, and then cover the outer surface of the magnet 173. The magnet cover 176 may be firmly fixed on the magnet 173 by an adhesive.

FIGS. 13A and 13B are perspective views of a support member of the rotor according to the first embodiment of the present disclosure, and FIG. 14 is a cross-sectional view of the rotor according to the first embodiment of the present disclosure.

The rotor 172 may include an inside channel 177 (see FIG. 14) through which an adhesive for bonding the rotor shaft 172b, the support member 174, the magnet 173, etc. flows.

The inside channel 177 may include an adhesion channel 178 and a magnet coupling channel 179. The adhesion channel 178 may be included in the support member 174, and the magnet coupling channel 179 may be included in the magnet 173.

The adhesion channel 178 and the magnet coupling channel 179 may communicate with each other. By injecting an adhesive into the channels 178 and 179 to make the adhesive flow through the channels 178 and 179, the individual components can be bonded with each other. The adhesion channel 178 and the magnet coupling channel 179 may be bent in order to bond a plurality of elements of the rotor 172. More specifically, the adhesion channel 178 and the magnet coupling channel 179 may communicate with each other and be bent such that an adhesive can flow to bond the support member 174, the magnet 173, and the rotor shaft 172b.

The magnet coupling channel 179 may be configured to allow an adhesive to flow to bond the magnet 173 with the rotor shaft 172. The magnet coupling channel 179 may be formed by the outer surface of the rotor shaft 172b and the inner surface of the magnet 173. The magnet coupling channel 179 may be a flow path that is in the shape of a ring, through which the adhesive can flow. If the adhesive is filled in the magnet coupling channel 179 and then coagulated, the magnet 173 may be bonded with the rotor shaft 172b.

The magnet coupling channel 179 may be formed between the rotor shaft 172b and the magnet 173, over a range between both ends of the magnet 173 on the rotor shaft 172b. That is, since an adhesive can be applied only on a necessary area for bonding the magnet 173 with the rotor shaft 172b, it is possible to increase manufacturing efficiency and to improve the quality of a product.

The adhesion channel 178 may form a flow path through which an adhesive can flow to bond the support member 174 with the magnet 173. The adhesion channel 178 may be formed in the support member 174.

The support member 174 may include an inlet 174aa and an outlet 174bb through which the adhesive can flow into the adhesion channel 178. The inlet 174aa may be formed in the outer surface of the first support member 174a, and the outlet 174bb may be formed in the outer surface of the second support member 174b. The numbers and positions of the inlet 174aa and the outlet 174bb are not limited, however, in the current embodiment, the numbers of the inlet 174aa and the outlet 174bb may correspond to those of a first channel 178a and a second channel 178b which will be described later.

The adhesive channel 178 may include the first channel 178a formed in the first support member 174a, and the second channel 178b formed in the second support member 174b.

The first channel 178a may be formed in the first support member 174a so that the adhesive can flow between the first support member 174a and one surface of the magnet 173. More specifically, the adhesive may flow between the first support member 174a and one surface of the magnet 173 facing the first support member 174a. One end of the first channel 178a may communicate with the inlet 174aa of the first support member 174a. The other end of the first channel 178a may communicate with the magnet coupling channel 179.

One or more first channels 178a may be formed. When a plurality of first channels 178a are formed, the arrangement of the first channels 178a is not limited. In the current embodiment, in order for the adhesive to uniformly flow into the inside channel 177, the first channels 178a may be spaced at regular intervals in the radial direction with respect to the direction of the rotor axis 172a. More specifically, three first channels 178a may be formed at angles of 120 degrees with respect to the rotor axis 172a.

The first channels 178a may include an inlet channel 178aa and a first flow channel 178ab.

The inlet channel 178aa may communicate with the inlet 174aa. The inlet channel 178aa may penetrate the first support member 174a, and communicate with the first flow channel 178ab.

The first flow channel 178ab may guide the adhesive entered the inlet channel 178aa to the magnet coupling channel 179. One end of the first flow channel 178ab may communicate with one end of the inlet channel 178aa, and the other end of the first flow channel 178ab may communicate with the magnet coupling channel 179.

The first flow channel 178ab may be formed in the inner surface of the first support member 174a facing one surface of the magnet 173. The first flow channel 178ab may form a flow path toward the rotor axis 172a from the end of the inlet channel 178aa to the magnet coupling channel 179.

The shape or position of the first flow channel 178ab is not limited, however, in the current embodiment, an example in which the first flow channel 178ab is formed in the inner surface of the first support member 174a is shown. However, the first flow channel 178ab may be formed with the same shape in the magnet 173.

The inlet 174aa may be spaced from the rotor shaft 172b, and the inlet channel 178aa communicating with the inlet 174aa may be spaced from the rotor axis 172a to be in parallel to the rotor axis 172a. In order to reduce the flow resistance of the adhesive, it is necessary to shorten the length of a flow path through which the adhesive moves. In contrast, in order to stably couple the magnet 173 with the first support member 174a, it is necessary to lengthen the length of the flow path. Therefore, by spacing the inlet 174aa from the rotor shaft 172b, and forming the inlet channel 178aa to penetrate the first support member 174a in parallel to the rotor axis 172a to thereby shorten the flow path of the inlet channel 178aa formed between the inlet 174aa and the first flow channel 178ab, it is possible to relatively increase the length of the first flow channel 178ab as much as possible.

The second channel 178b may be formed in the second support member 174b, so that the adhesive can flow between the second support member 174b and the other surface of the magnet 173. More specifically, the adhesive can flow between the second support member 174b and the other surface of the magnet 173 facing the second support member 174a. One end of the second channel 178b may communicate with the outlet 174bb of the second support member 174b. The other end of the second channel 178b may communicate with the magnet coupling channel 179.

One or more second channels 178b may be formed. When a plurality of second channels 178b are formed, the arrangement of the second channels 178b is not limited. In the current embodiment, in order for the adhesive to uniformly flow into the inside channel 177, the second channels 178b may be spaced at regular intervals in the radial direction with respect to the direction of the rotor axis 172*a*. More specifically, three second channels 178*b* may be formed at angles of 120 degrees with respect to the rotor axis 172*a*. However, the arrangement of the second channels 178*b* may not need to correspond to that of the first channels 178*a*.

The second channels 178*b* may include an outlet channel 178*ba* and a second flow channel 178*bb*.

The outlet channel 178*ba* may communicate with the outlet 174*bb*. The outlet channel 178*ba* may penetrate the second support member 174*b*, and communicate with the second flow channel 178*bb*.

The second flow channel 178*bb* may guide the adhesive passed through the first channel 178*a* and the magnet coupling channel 179 to the outlet channel 178*ba*. One end of the second flow channel 178*bb* may communicate with one end of the outlet channel 178*ba*, and the other end of the second flow channel 178*ba* may communicate with the magnet coupling channel 179.

The second flow channel 178*bb* may be formed in the inner surface of the second support member 174*b* facing one surface of the magnet 173. The second flow channel 178*bb* may form a flow path toward the rotor axis 172*a*, in the radial direction, from the magnet coupling channel 179 to the end of the outlet channel 178*ba*.

The shape or position of the second flow channel 178*bb* is not limited, however, in the current embodiment, an example in which the second flow channel 178*bb* is formed in the inner surface of the second support member 174*b* is shown. However, the second flow channel 178*bb* may be formed with the same shape in the magnet 173.

The outlet 174*bb* may be spaced from the rotor shaft 172*b*, and the outlet channel 178*ba* communicating with the outlet 174*bb* may be spaced from the rotor axis 172*a* to be in parallel to the rotor axis 172*a*. In order to reduce the flow resistance of the adhesive, it is necessary to shorten the length of a flow path through which the adhesive moves. In contrast, in order to stably couple the magnet 173 with the second support member 174*b*, it is necessary to lengthen the length of the flow path. Therefore, by spacing the outlet 174*bb* from the rotor shaft 172*b*, and forming the outlet channel 178*ba* to penetrate the second support member 174*b* in parallel to the rotor axis 172*a* to thereby shorten the flow path of the outlet channel 178*ba* formed between the outlet 174*bb* and the second flow channel 178*bb*, it is possible to relatively increase the length of the second flow channel 178*bb* as much as possible.

The support member 174 may include a leakage preventing groove 175.

The leakage preventing groove 175 may prevent the adhesive flowing along the channels from leaking to the outside. Also, the leakage preventing groove 175 may be configured to collect the adhesive therein, so that the support member 174 can be firmly bonded with the magnet 173. The leakage preventing groove 175 may be formed adjacent to the channels so that the adhesive leaking from the channels can be collected in the leakage preventing groove 175.

The leakage preventing groove 175 may be formed in a bonding portion in which the support member 174 contacts the magnet 173. The bonding portion may be formed in the shape of a surface, in the embodiment of the present disclosure, to surface contact the magnet 173. The leakage preventing groove 175 may form concave space with respect to the bonding portion to collect the adhesive in the concave space, thereby improving the bonding efficiency of the support member 174 and the magnet 173, while preventing the adhesive from leaking out.

The leakage preventing groove 175 may include an inner leakage preventing groove 175*a* and an outer leakage preventing groove 175*b*.

A plurality of inner leakage preventing grooves 175*a* may be respectively formed between the plurality of first channels 178*a* and between the plurality of second channels 178*b*. That is, the plurality of inner leakage preventing grooves 175*a* may be respectively formed between the plurality of first flow channels 178*ab* in the first support member 174*a*. Also, the plurality of inner leakage preventing grooves 175*a* may be respectively formed between the plurality of second flow channels 178*bb* in the second support member 174*b*.

The inner leakage preventing grooves 175*a* may be formed along the circumferential direction with the rotor axis 172*a* in the center, wherein each inner leakage preventing groove 175*a* may be in the shape of an arc. Since the inner leakage preventing grooves 175*a* are formed along the circumferential direction so that the support member 174 contacts the magnet 173, the magnet 173 may be not separated from the support member 174 although the rotor 172 rotates at high speed.

The outer leakage preventing groove 175*b* may be formed outside the adhesion channel 178, in the bonding portion. In the bonding portion including the first flow channel 178*ab* or the second flow channel 178*bb*, the outer leakage preventing groove 175*b* may be formed outside the first flow channel 178*ab* or the second flow channel 178*bb* with respect to the rotor axis 172*a*, thereby preventing an adhesive leaking out of the first flow channel 178*ab* or the second flow channel 178*bb* from leaking to the outside.

The shape of the outer leakage preventing groove 175*a* is not limited, however, in the embodiment of the present disclosure, the outer leakage preventing groove 175*a* may be formed in the shape of a ring in the bonding portion, in order to efficiently prevent leakage of the adhesive.

Also, although not shown in the drawings, an annular ring may be disposed in the outer leakage preventing groove 175*a*. The annular ring may be disposed in the outer leakage preventing groove 175*a* to thus prevent the adhesive from leaking through between the support member 174 and the magnet 173.

Hereinafter, a method of manufacturing the rotor 172 will be described.

The magnet 173 may be coupled with the rotor shaft 172*b*, and the pair of support members 174 may be respectively coupled with both ends of the magnet 173.

In the pair of support members 174, the inlet 174*aa* and the outlet 174*bb* may be respectively formed to be connected to the inside channel 177 so that an adhesive flows through the inside channel 177.

If the adhesive enters the inlet 174*aa*, the adhesive may pass through the inlet channel 178*aa* to flow through the first flow channel 178*ab* formed between the first support member 174*a* and the magnet 173.

The adhesive passed through the first flow channel 178*ab* may pass through the magnet coupling channel 179 formed between the magnet 173 and the rotor shaft 172*b*, to be guided to the second flow channel 178*bb* formed between the magnet 173 and the second support member 174*b*.

The adhesive passed through the second flow channel 178*bb* may pass through the outlet channel 178*ba* to be discharged to the outside through the outlet 174*bb*.

Through this process, the adhesive may be filled in the inside channel 177 and coagulated after a predetermined time has elapsed so that the individual elements can be coupled with each other.

Also, if the adhesive passing through the inside channel 177 leaks from the inside channel 177, the adhesive may be collected in the leakage preventing groove 175 so as to strengthen the coupling between the magnet 173 and the support member 174.

FIG. 15 is an exploded perspective view of an impeller and a rotor according to a first embodiment of the present disclosure, and FIG. 16 is a cross-sectional view showing coupling between an impeller and a rotor shaft according to a first embodiment of the present disclosure.

The impeller 130 may rotate together with the rotor shaft 172b.

The impeller 130 may include an impeller body 131, a shaft coupling portion 133, and the plurality of blades 132.

The cross-sectional area of the impeller body 131 may decrease along the direction of the rotor axis 172a, so that air entered in the direction of the rotor axis 172a is discharged in the radial direction of the rotor axis 172a according to rotation of the impeller 130.

The plurality of blades 132 may be connected to the impeller body 131 so as to rotate together with the impeller body 131, thereby forming an air current. The plurality of blades 132 may be arranged on the outer surface of the impeller body 131. More specifically, the rotor 172 may be disposed on the rear surface of the impeller body 131, and the plurality of blades 132 may be arranged on the front surface of the impeller body 131 to form an air current.

The shaft coupling portion 133 may be disposed in the impeller body 131 so that the rotor shaft 172b can be coupled with the impeller body 131. In the shaft coupling portion 133, a shaft inserting hole 133a may be formed into which the rotor shaft 172b can be inserted.

The shaft coupling portion 133 may include a shaft coupling surface 134 corresponding to the circumference surface of the rotor shaft 172b. The inner diameter of the shaft coupling portion 133 formed by the shaft coupling surface 134 may correspond to the outer diameter of the rotor shaft 172b, so that the rotor shaft 172b can be press-fitted in the shaft coupling portion 133.

A method of coupling the rotor shaft 172b with the shaft coupling portion 133 is not limited, and in the embodiment of the present disclosure, the rotor shaft 172b is press-fitted in the shaft coupling portion 133 so that the impeller 130 and the rotor shaft 172b can operate together.

Hereinafter, the motor assembly 200 according to a second embodiment of the present disclosure, and a cleaner 51 having the same will be described.

Descriptions for the same components as those of the above-described embodiment will be omitted.

FIG. 17 shows a cleaner according to a second embodiment of the present disclosure, and FIG. 18 is a cross-sectional view showing the configuration of a part of the cleaner according to the second embodiment of the present disclosure.

The cleaner 51 according to the second embodiment of the present disclosure may be a canister type cleaner, unlike the cleaner 51 according to the first embodiment of the present disclosure. Although the type of the cleaner 51 according to the second embodiment of the present disclosure is different from the type of the cleaner 51 according to the first embodiment of the present disclosure, the types of the cleaner 51 are classified for convenience of description. That is, the motor assembly 200 according to the second embodiment of the present disclosure can be applied to the stick type cleaner 51 according to the first embodiment of the present disclosure, and the motor assembly 200 according to the first embodiment can be applied to the canister type cleaner 51 according to the second embodiment of the present disclosure.

The cleaner 51 according to the second embodiment of the present disclosure may include a suction portion 60 and a cleaner main body 62.

The cleaner main body 62 may be connected to the suction portion 60 through a connection hose 70 and a connection pipe 72 such that a suction force generated in the cleaner main body 62 can be transferred to the suction portion 60, and between the connection hose 70 and the connection pipe 72, a handle 74 which a user can grip with his/her hand may be disposed.

The connection hose 70 may be a corrugated tube with flexibility, wherein one end of the connection hose 70 may be connected to the cleaner main body 62, and the other end of the connection hose 70 may be connected to the handle 74 so that the suction portion 60 can freely move within a predetermined range from the cleaner main body 62. The connection pipe 72 may have a predetermined length, wherein one end of the connection pipe 72 is connected to the suction portion 60, and the other end of the connection pipe 72 is connected to the handle 74 so that the user can move the suction portion 60 while gripping the handle 74 to clean the surface of a floor.

The connection hose 70 may be connected to the front portion of the cleaner main body 62 to receive sucked air.

The cleaner main body 62 may include the motor assembly 200, and a dust container 80. The motor assembly 200 may generate power to generate a suction force in the inside of the cleaner main body 62, and the dust container 80 may be disposed in the upper area of an air path than the motor assembly 200 to filter out dust or dirt from air sucked through the suction portion 60 to collect the dust or dirt.

FIG. 19 is a perspective view of a motor assembly according to a second embodiment of the present disclosure, FIG. 20 is a cross-sectional view of the motor assembly according to the second embodiment of the present disclosure, and FIG. 21 is an exploded perspective view of the motor assembly according to the second embodiment of the present disclosure.

The motor assembly 200 may be installed in the cleaner main body 62, and configured to generate a suction force.

The motor assembly 200 may include a housing 202, a motor 270 installed in the inside of the housing 202 and configured to generate a suction force, a resting housing 242 configured to fix the motor 207 in the housing 202, and an impeller 230 installed on the axis of the motor 270 and configured to rotate.

The housing 202 may include a first housing 210, a second housing 220 coupled with the first housing 210, and a third housing 230 coupled with the rear surface of the second housing 220. The housing 202 may have a cylinder-like shape, however, the shape of the housing 202 is not limited to this. That is, the housing 202 may be formed in any other shape. The first housing 210 may be separated from the second housing 220 in the axial direction of a rotor axis 272a. The first housing 210 may include an air inlet 211 to introduce air sucked by the motor 270 into the inside of the housing 202, and the third housing 228 may include an air outlet 229 to discharge the air entered the inside of the housing 202.

In the top surface of the first housing 210, a flow channel cut-off rib 214 may be formed to prevent air sucked by the motor 270 from leaking without being sucked into the air inlet 211. The flow channel cut-off rib 214 may be formed outside the air inlet 211, on the top surface of the first housing 210. At least one flow channel cut-off rib 214 may form concentric circles on the top surface of the first housing 210, with the air inlet 211 in the center of the top surface.

Since the third housing 228 is coupled with the second housing 220 at the rear surface of the second housing 220 coupled with the rear surface of the first housing 210, the air inlet 211 may be disposed in the front portion of the housing 202, and the air outlet 229 may be disposed in the rear portion of the housing 202. However, the air inlet 211 and the air outlet 229 may be disposed at any other positions.

The first housing 210, the second housing 220, and the third housing 228 may be coupled to form an air path 213 extending from the air inlet 211 to the air outlet 229, and to form inside space 227 in which the motor 270, the impeller 230, etc. are installed.

The air path 213 may include a module path 213*a*, and a module outside path 213*b*. The motor assembly 200 may suck air through the impeller 230, and the sucked air may flow through the air path 213. Air entered the inside of the housing 202 may enter the inside of a motor module 240 to flow through the module path 213*a*, and pass between the outside of the motor module 240 and the inside of the housing 202 to flow through the module outside path 213*b*. The sucked air passing through the module path 213*a* may cool heat generated from the inside of the motor module 240. The sucked air passed through the module path 213*a* and the sucked air passed through the module outside path 213*b* may pass through a circuit board 298 to thus cool heat generated from the circuit board 298.

The first housing 210 may include a shroud 212.

The shroud 212 may be disposed to correspond to the impeller 230 or a diffuser 222 which will be described later, so as to guide air entered the inside of the housing 202 by the motor 270. The shroud 212 may be disposed to form wide space in the axial direction of the rotor axis 272*a*, so that a wide air path can be formed according to the flow direction of the sucked air by the motor 270 from the air inlet 211. The shroud 212 may guide air entered through the air inlet 211 to the inside of the housing 202, and may have a shape corresponding to the upper portion of the impeller 230.

In the inside of the air inlet 211 of the first housing 210, the impeller 230 may be disposed. The impeller 230 may rotate on the rotor axis 272*a*. The impeller 230 may include a plurality of blades 232 to generate the flow of air. The impeller 230 may be configured such that a radius of rotation of the plurality of blades 232 decreases away from a rotor 272, and air entered in the axial direction of the rotor axis 172*a* is discharged in the radial direction of the rotor axis 272*a* according to rotation of the impeller 230. However, the shape and location of the impeller 230 are not limited as long as the impeller 230 can move air.

The second housing 220 may include the diffuser 222. The diffuser 222 may be configured to increase the velocity of air flow by the impeller 230. The diffuser 222 may be positioned outside the impeller 130 in the radial direction of the impeller 130.

The diffuser 222 may be disposed in a radial direction with respect to the impeller 230. More specifically, the diffuser 222 may be formed in directions extending from the plurality of blades 232 of the impeller 230. The diffuser 222 may be formed with a plurality of ribs 223 and 224, and the plurality of ribs 223 and 224 may be spaced apart from each other in the directions extending from the plurality of blades 232. The plurality of ribs 223 and 224 may guide air flow by the impeller 230, while increasing the flow velocity of the air. More specifically, the diffuser 222 and the shroud 211 formed in the first housing 210 may form a diffuser path 225 to guide air flow by the impeller 230 while increasing the flow velocity of the air.

The plurality of ribs 223 and 224 may include a first rib 223 and a second rib 224. The first rib 223 may be disposed on the same plane as the downstream end of air flow by the impeller 230, and the second rib 224 may be inclined at a predetermined angle toward the rotor axis 172*a* so that air guided by the first rib 223 can flow in an up-down direction being the axial direction of the rotor axis 272*a* in the inside of the housing 202.

In the inside of the housing 202, the motor module 240 may be installed. The motor module 240 may fix the motor 270 as a module in the inside of the housing 202.

The motor module 240 may include the motor 270 and the resting housing 242.

The resting housing 242 may include a front resting housing 250, and a rear resting housing 260 coupled with the front resting housing 250 with the motor 270 in between.

The front resting housing 250 may be fixed at the housing 202. More specifically, a resting hole 126 may be formed in the shape of a hole in the center of the second housing 220 so that the front resting housing 250 is coupled with the resting hole 226. The front resting housing 250 may be inserted into the resting hole 226, however, a method of coupling the front resting housing 250 with the resting hole 226 is not limited.

The front resting housing 250 may include a front resting housing body 251 (see FIG. 22A), an impeller resting portion 253, and a front resting portion 254 (see FIG. 22A). The front resting housing body 251 may have a disk-like shape, and include a body coupling portion 252 (see FIG. 22A) corresponding to the shape of the resting hole 226 so as to be coupled with the resting hole 226 of the second housing 220, as described above.

The impeller 230 may be rested at the impeller resting portion 253 on the front surface of the front resting housing body 251. The front surface of the impeller resting portion 253 may be formed to correspond to the shape of the rear surface of the impeller 230 in order not to interfere in rotation of the impeller 230 coupled on the rotor axis 272*a*.

The motor 270 may be rested at the front resting portion 254 on the rear surface of the front resting housing body 251. A stator 280 may be rested and fixed at the front resting portion 254 such that the center of the rotatable rotor 272 is aligned with the rotation center of the impeller 230.

The shape of the front resting portion 254 is not limited, and in the embodiment of the present disclosure, the front resting portion 254 may protrude from the front resting housing body 251 so that the motor 270 can be spaced a predetermined distance apart from the front resting housing body 251 and rested.

The location of the front resting portion 254 is not limited, however, in the embodiment of the present disclosure, since the stator 280 extends in the first direction W1, four front resting portions 254 may be disposed to correspond to the edges of the stator 280.

The rear resting housing 260 may be coupled with the front resting housing 250, and the motor 270 may be located between the front resting housing 250 and the rear resting housing 260.

The rear resting housing 260 may include a rear resting housing body 261 and a rear resting portion 264. The rear resting housing body 261 may extend in the first direction W1 being the longitudinal direction of the stator 280 to correspond to the shape of the stator 280.

In order to couple the front resting housing 250 with the rear resting housing 260, screw holes 251b and 261b may be provided to couple the front resting housing 250 with the rear resting housing 260 using screws 248.

A structure in which the motor 270 is fixed in the inside of the front resting housing 250 and the rear resting housing 260 will be described in detail, later.

FIGS. 22A and 22B are exploded perspective views of a motor module according to a second embodiment of the present disclosure.

A front through hole 251a and a rear through hole 261a may be formed in the centers of the front resting housing 250 and the rear resting housing 260 so that the rotor axis 272a can pass through the front through hole 251a and the rear through hole 261a. In the front through hole 251a and the rear through hole 261a, a front bearing 273a and a rear bearing 273b may be disposed to rotate on the rotor axis 272a.

The front resting housing 250 may include the front housing body 251, the front resting portion 254, and a front auxiliary resting portion 255.

The front resting housing body 251 may have a disk-like shape.

The front resting portion 254 may be disposed on the inside surface of the front resting housing body 251, so that the side surfaces of the motor 270 can be rested on the front resting portion 254. That is, the front resting portion 254 may be formed on the rear surface of the front resting housing body 251. In order to align the centers of the rotor 272, the impeller 230, and the diffuser 222 when the stator 280 is rested or fixed on the front resting portions 254, the front through hole 251a may be formed at the same distance from the plurality of front resting portions 154.

The front auxiliary resting portion 255 may be disposed on the inside surface of the front resting housing 250. Unlike the first embodiment, the motor 270 may further include a pair of auxiliary stators 287, and the auxiliary stators 287 may be rested on the front auxiliary resting portion 255 to be stably supported on the center portion of the motor 270 formed in the longitudinal direction.

The front auxiliary resting portion 255 may protrude from the front resting housing body 251. Since the pair of auxiliary stators 287 is provided, a pair of front auxiliary resting portions 255 may be disposed to correspond to the pair of auxiliary stators 287.

A front resting protrusion 256 may surround at least one part of the outer surface of the stator 280, and prevent the motor 270 from being dislocated vertically to the rotor axis 272a when the motor assembly 200 operates.

The front resting protrusion 256 may further protrude from the front resting housing body 251 than the front auxiliary resting portion 255 so that the inner surface of the front resting protrusion 256 can surround the auxiliary stator 287. The front resting protrusion 256 may correspond to the auxiliary stator 287, together with the front support resting portion 255. More specifically, the front resting protrusion 256 may surround the outer surface of the auxiliary stator 287. That is, the front surface of the motor 270 may be rested on the front resting portion 254 and the front auxiliary resting portion 255, and the side surface of the motor 270 may be rested on a front protrusion resting surface 256a of the front resting protrusion 256. In the front resting protrusion 256, a front guide surface 256b may be formed to guide the motor 270 to be easily rested on the front resting portion 254. The front guide surface 256b may be formed in the end of the front resting protrusion 256, with an inclination of a predetermined angle toward the inside of the front resting protrusion 256, and the front guide surface 256b may be connected to the front protrusion resting surface 256a.

The rear resting housing 260 may include the rear resting housing body 261, a rear resting protrusion 266, and the rear resting portion 264.

The rear resting housing body 261 may extend in the longitudinal direction of the stator 280 to correspond to the shape of the stator 280.

The rear resting protrusion 266 may protrude forward from the rear resting housing body 261 to support the side surface of the stator 280. The rear resting protrusion 266 may prevent the motor 270 from being dislocated vertically to the rotor axis 272a, together with the front resting protrusion 256, when the motor assembly 200 operates.

The rear resting protrusion 266 may include a first rear resting protrusion 266a and a second rear resting protrusion 266b.

The first rear resting protrusion 266a may fix one end of the stator 280 in the first direction W1 being the longitudinal direction of the stator 280, and the second rear resting protrusion 266b may fix the other end of the stator 280 in the second direction W2 that is vertical to the first direction W1. That is, the end of a main stator 281 may be fixed on the first rear resting protrusion 266a, and the auxiliary stator 287 may be fixed on the second rear resting protrusion 266b.

The rear resting portion 264 may be disposed in the inner surfaces of the first rear resting protrusion 266a and the second rear resting protrusion 266b, so that the other surface of the motor 270 can be rested and supported on the rear resting portion 264. More specifically, the rear resting portion 264 may include a first rear resting portion 264a disposed in the inner surface of the first rear resting protrusion 266a, and a second rear resting portion 264b disposed in the inner surface of the second rear resting protrusion 266b.

The rear resting protrusion 266 may include a rear guide surface 267b inclined at a predetermined angle toward the inner surface of the rear resting protrusion 266, to guide the motor 270 to be easily rested on the first rear resting portion 264a and the second rear resting portion 264b. More specifically, the rear surface of the motor 270 may be rested on the rear resting portion 264, and the side surface of the motor 270 may be rested on the rear protrusion resting surface 267a of the rear resting protrusion 266. In the rear resting protrusion 266, the rear guide surface 267b may be formed to guide the motor 270 to be easily rested on the rear resting portion 264. The rear guide surface 267b may be formed in the end of the rear resting protrusion 266, with an inclination of a predetermined angle, and connected to the rear protrusion resting surface 267a.

The body of the rear resting housing 260 may extend in the longitudinal direction of the stator 280 to correspond to the shape of the stator 280 which will be described later. Four rear resting protrusions 266 may be disposed alternately with the front resting protrusions 256 of the front resting housing 250. That is, the front resting protrusions 256 and the rear resting protrusions 266 may be arranged alternately so as to more firmly support the motor 270.

The rear resting housing 260 may include a magnet sensor 244.

The magnet sensor 244 may be disposed on the same axis as a magnet 245 of the rotor 272 to recognize the position of the rotor 272 according to rotation of the rotor 272. The magnet sensor 244 may transfer information about the position of the rotor 272 to a position sensor (not shown) of the circuit board 298, so that the circuit board 298 can control the position of the rotor 272 based on the information about the position of the rotor 272.

The magnet sensor 244 may be rested on a sensor bracket 246 to transfer information to the position sensor of the circuit board 298. One end of the sensor bracket 246 may be coupled with a sensor resting portion 268 provided on the rear surface of the rear resting housing 260, and the other end of the sensor bracket 246 may be coupled with the circuit board 298. By providing the magnet sensor 244, instead of locating a position sensor on the rotor 272, it is possible to achieve the position control of the rotor 272 by adding a simple structure.

The front resting housing 250 and the rear resting housing 260 may have the screw holes 251b and 261b, respectively, so that the front resting housing 250 can be coupled with the rear resting housing 260 using the screws 248. More specifically, in the current embodiment, two screw holes 251b may be respectively formed in the two front auxiliary resting portions 255, and two screw holes 261b may be respectively formed in the two second rear resting portions 264b, so that the screws 248 can pass through the screw holes 261b of the second rear resting portions 264b and then be coupled with the screw holes 251b of the corresponding front auxiliary resting portions 255. That is, the front resting housing 250 may be coupled with the rear resting housing 260 by the two screws 248.

FIG. 23 is an exploded perspective view of a motor according to a second embodiment of the present disclosure.

The motor 270 may include the rotor 272 and the stator 280.

The rotor 272 may be rotatable in the center of the stator 280.

The stator 280 may electromagnetically interact with the rotor 272.

The stator 280 may include the main stator 281 and the auxiliary stator 287.

The main stator 281 may include a main stator body 282, and at least one main stator core 283 extending from the main stator body 282.

A pair of main stator bodies 282 may be provided in the first direction W1 to face each other with the rotor 272 in between. That is, the main stator bodies 282 may be disposed longitudinally in such a way to face each other. The pair of the stator bodies 282 may be coupled with each other in the first direction W1 being a longitudinal direction. That is, the main stator 281 may surround the rotor 272 such that the length of the main stator 281 in the first direction W1 is longer than the length of the main stator 281 in the second direction W2 that is vertical to the first direction W1, instead of being disposed in the shape of a circle along the outer surface of the rotor 172. That is, if the length of the stator 280 in the first direction W1 is L1 and the length of the stator 280 in the second direction W2 is L2, L1 is longer than L2.

The main stator core 283 may include a center core 284, and a side core 285 located to the side of the center core 284.

A pair of center cores 284 may face each other with the rotor 272 in between, and rotor accommodating space 291 may be formed between the center cores 284 so that the rotor 272 can rotate in the rotor accommodating space 291. A pair of side cores 285 may be located to both sides of each center core 284 in such a way to be arranged in parallel to the center core 284.

A plurality of stator slots 283a may be formed between the center core 284 and the side cores 285. If a coil 299 is wound around the center core 284, the coil 299 may be accommodated in the stator slots 283a. In the inner end of each center core 284 adjacent to the rotor 272, a main expanded core portion 284a in which the width of the stator core 284 is partially expanded may be formed. More specifically, in the inner end of each center core 284 facing the rotor 272, the main expanded core portion 284a may be formed in which the width of the center core 284 is partially expanded to surround the outer surface of the rotor 272. Between the inner surface of the main expanded core portion 284a and the outer surface of the rotor 272, an air gap 284b (see FIG. 24) may be formed in which the rotor 272 rotates.

The auxiliary stator 287 may electromagnetically interact with the rotor 272 together with the main stator 281. The pair of auxiliary stators 287 may face each other with the rotor 272 in between, and may be arranged in another direction that is vertical to one direction. The pair of auxiliary stators 287 may face each other with the rotor 272 in between, between the pair of main stator bodies 282.

Each auxiliary stator 287 may include an auxiliary stator body 288, and at least one auxiliary core 289 extending from the auxiliary stator body 288.

A pair of auxiliary cores 289 may face each other with the rotor 272 in between. The auxiliary cores 289 may have a length that is shorter than the center core 284, and be arranged in the other direction that is vertical to the one direction. The rotor accommodating space 291 may be formed between the auxiliary cores 289 so that the rotor 172 can rotate in the rotor accommodating space 291. That is, the rotor accommodating space 291 may be formed between the pair of center cores 284 and between the pair of auxiliary cores 289.

In the inner end of each auxiliary core 289 adjacent to the rotor 272, an auxiliary expanded core portion 289a in which the width of the auxiliary core 289 is partially expanded may be formed. More specifically, in the inner end of each auxiliary core 289 facing the rotor 272, the auxiliary expanded core portion 289a may be formed in which the width of the auxiliary core 289 is partially expanded to surround the outer surface of the rotor 272. Between the inner surface of the auxiliary expanded core portion 289a and the outer surface of the rotor 272, the air gap 284b may be formed in which the rotor 172 rotates.

The main stators 281 and the auxiliary stators 287 may be formed by stacking a plurality of pressed steel plates.

Each main stator 281 may include a main coupling portion 286 formed at the end of each side core 285 and curved toward the outside. The main coupling portion 286 may increase the strength of a coupling part at which the main stator 281 is coupled with the corresponding auxiliary stator 287, and enable the motor 270 to be stably supported on the resting housing 242. That is, if the main coupling portion 286 is coupled with the auxiliary stator 287, the main coupling portion 286 may have a thickness that is thicker than the other portion of the main stator 281. Through the configuration, the strength of the coupling part between the main stator 281 and the auxiliary stator 287 may increase, and the main stator 281 and the auxiliary stator 287 may be stably supported on the front auxiliary resting portion 255 and the second rear resting portion 264b.

In the main coupling portion 286, a coupling groove 286b may be formed to be coupled with the auxiliary stator 287, and a coupling protrusion 288a may be formed in the auxiliary stator 287. More specifically, the auxiliary stators 287 may be disposed between the pair of main coupling portions 286 facing each other, and the main stators 281 may be coupled with the auxiliary stators 287 by coupling between the coupling grooves 286a formed in the main coupling portions 286 and the coupling protrusions 288a formed at both sides of the auxiliary stator 287.

The auxiliary stator 287 may include a contact flange 290 and a fixing groove 288b.

The contact flange 290 may extend in one direction from the auxiliary stator body 288 toward the main stators 281 located to both sides of the auxiliary stator body 288, and be disposed in the inside of the main coupling portions 286. The main coupling portion 286 may include a coupling surface 286a (see FIG. 24) formed concavely in the inner surface so that the contact flange 290 can be rested on the coupling surface 286a. The contact flange 290 may include a flange resting surface 290a (see FIG. 24) formed convexly to correspond to the coupling surface 286a. In the current embodiment, the coupling surface 286a and the flange resting surface 290a are a concave surface and a convex surface, respectively, however, the shapes of the coupling surface 286a and the flange resting surface 290a are not limited as long as surface contact between the coupling surface 286a and the flange resting surface 290a is possible. The coupling surface 286a and the flange resting surface 290a may have an inclination of a predetermined angle with respect to the one direction and the other direction, so that the auxiliary stator 287 cannot easily escape from the main stator 281.

Since the contact flange 290 is rested on the inner surface of the main coupling portion 286, the auxiliary stator 287 can be prevented from moving from the inside of the main coupling portion 286 to the outside of the main coupling portion 286.

The fixing groove 288b may be formed at the outer end of the auxiliary stator body 288, in such a way to be concave toward the center of the auxiliary stator body 288. The side surface of the screw 248 inserted when the front resting housing 250 is coupled with the rear resting housing 260 may be located on the fixing groove 288b, so that the side surface of the screw 248 may be rested on the fixing groove 288b to support one side of the auxiliary stator 287.

The insulator 294 may be formed of an electrical insulating material, and surround a part of the stator 280 and the center cores 284. The insulator 294 may include an insulator body 295 corresponding to the stator body 280, a center core support 296 formed in the insulator body 295 in correspondence to the center core 284, and a coil guide portion 297 protruding from the inner part in radial direction of the center coil support 296.

The insulator 294 may include a body coupling portion 295a. The body coupling portion 295a may be formed in one side of the insulator body 295, and guide the coil 299 wound around the motor 270 to the circuit board 298. Also, the body coupling portion 295a may be inserted into and fixed at the circuit board 298, so that the motor 270 can be coupled with the circuit board 298.

The coil 299 may be wound around the center core 284 and the center core support 296 in the state in which the insulator 294 is coupled with the stator body 280. However, the coil 299 may be wound around the side core 285 and the insulator 294 surrounding the side core 285. In the embodiment of the present disclosure, it will be described that the coil 299 is wound around the center core 284 and the center core support 296.

The insulator 294 may include a core enhancing portion 295b. The core enhancing portion 295b may be disposed outside the stator 280 to support the stator 280 in an up-down direction. In the embodiment of the present disclosure, the core enhancing portion 295b may be disposed outside the side cores 285 to support the side cores 285 in the up-down direction. Since the stator 280 is formed by stacking a plurality of pressed steel plates, the core enhancing portion 295b supports the stator 280 in the up-down direction to thereby improve the durability of the stator 280.

In the current embodiment, the path guide 194 is not provided, unlike the first embodiment, however, the path guide 194 may be applied to the current embodiment.

Since the stator 280 is disposed in the first direction W1, disposition space 292 may be formed along the circumference of the stator 280, with the rotor 272 as the center. That is, the disposition space 292 may be formed in areas that are vertical to the longitudinal direction of the stator 280.

The disposition space 292 may be formed on the same plane as the stator 280 to make better use of the inside space 227 of the motor assembly 200. The disposition space 292 may be formed in a semicircle-like shape, and in the disposition space 292, components of the motor assembly 200 may be installed. In the embodiment of the present disclosure, a capacitor 298b may be installed in the disposition space 292.

A pair of disposition space 292 may be respectively formed to both sides of the stator 280, and accordingly, a pair of capacitors 298b may be installed. In the embodiment of the present disclosure, two capacitors 298b may be installed in each disposition space 292 so that totally four capacitors 298b may be installed. The capacitors 298b may function to smooth a voltage or to remove ripples.

FIG. 24 shows the arrangement of a motor and a circuit board according to a second embodiment of the present disclosure.

Below the motor 270, the circuit board 298 may be disposed to transfer electrical signals to the motor 270. In one surface of the circuit board 298, a mounting area 298a on which circuit elements are mounted may be provided. On the mounting area 298a, circuit elements, such as heating elements, the capacitors 298b, etc., may be mounted.

Since the motor 270 needs to receive electrical signals from the circuit board 298 and remove heat of the circuit board 298 through the flow of air generated by the operation of the motor 270, the motor 270 may be disposed adjacent to the circuit board 298. However, in order to prevent the motor 270 from interfering with the circuit elements, unnecessary space increases, resulting in an increase in size of the motor assembly 200.

In the embodiment of the present disclosure, the motor 120 may be long in one direction, and the disposition space 292 may be provided on the same plane. That is, in both sides of the stator 280 extending in the longitudinal direction, the disposition space 292 may be formed as a free space in which the other elements of the motor assembly 200 can be installed. In the embodiment of the present disclosure, since the housing 202 has a cylinder-like shape, or the impeller 230 is in the shape of a circle, the disposition space 292 may be in the shape of a semicircle having an arc of a predetermined length.

The electric elements may be mounted on the mounting area 298a of the circuit board 298, and installed in the disposition space 292 of the motor 170, in order to avoid interference with the motor 170.

In the current embodiment, an example in which the capacitors 298b are installed in the disposition space 292 is shown, however, other electric elements may be installed in the disposition space 292.

Through the configuration, the motor 270 can be disposed close to the circuit board 298, which makes better use of the inside space of the housing 202.

FIG. 25 is a front view of a motor according to a second embodiment of the present disclosure, and FIG. 26 shows the flow of a magnetic field formed in the motor according to the second embodiment of the present disclosure.

The stators 280 may be symmetrical to each other with respect to the rotor 272.

A pair of main expanded core portions 284a and a pair of auxiliary expanded core portions 289a forming the air gap 284b together with the outer surface of the rotor 272 around the rotor 272 may be configured such that the centers of the inner curved surfaces of the pair of main expanded core portions 284a and the pair of auxiliary expanded core portions 289a are misaligned from each other.

More specifically, the center of the inner surface of any one main expanded core portion 284a or any one auxiliary expanded core portion 289a surrounding the outer surface of the rotor 272 may be misaligned with the center of the inner surface of the other main expanded core portion 284a or the other auxiliary expanded core portion 289a.

Through the configuration, the pair of main expanded core portions 284a or the pair of auxiliary expanded core portions 289a surrounding the rotor 172 may apply electromagnetic effects with different magnitudes and in different directions to the rotor 272 so that the rotor 272 can rotate in any one direction.

The stator bodies 282 and 288 may include a direction checking groove 282a to check the coupling direction of the stators 280. In the embodiment of the present disclosure, an example in which the direction checking groove 282a is formed in the main stator body 281 is shown. However, the location of the direction checking groove 282a is not limited, and the direction checking groove 282a may be formed at any one side of the main stator body 282 such that it can distinguish the left and right of the main stator body 282. As described above, the center of the inner surface of any one main expanded core portion 284a or any one auxiliary expanded core portion 289a may be misaligned with the center of the inner surface of the other main expanded core portion 284a or the other auxiliary expanded core portion 289a. That is, any one end of the main expanded core portions 284a or the auxiliary expanded core portions 289a may be closer to the rotor 272 than the other end of the main expanded core portions 284a or the auxiliary expanded core portions 289a.

If the pair of stator bodies 282 or 288 are coupled with each other without distinguishing the left and right ones of the pair of stator bodies 282 or 288 so that the ends of the main expanded core portions 284a or the auxiliary expanded core portions 289a closer to the rotor 272 are aligned in the same direction, no starting torque required for initial rotation of the rotor 272 may be generated. Therefore, by coupling the pair of stator bodies 282 or 288 with each other such that the direction checking grooves 282a formed in the respective stator bodies 282 or 288 are symmetrical with respect to the rotor 272, it is possible to easily generate starting torque required for initial rotation of the rotor 272. The direction checking grooves 282a described in the current embodiment can be applied to all embodiments of the present disclosure.

FIG. 26 shows a magnetic field formed in a stator and a rotor.

If current is supplied to the motor 270, the stator 280 may interact with the rotor 272 to form a magnetic field. The magnetic field may be formed in the stator 280 and the rotor 272 due to a change in polarity by rotation of the rotor 272.

Hereinafter, a process of assembling the motor assembly 200 according to an embodiment of the present disclosure will be described.

Referring to FIG. 23, the pair of main stator bodies 282 may be coupled with each other with the pair of auxiliary stators 287 in between. That is, the opposite side cores 285 of the pair of main stator bodies 282 may be respectively coupled with the auxiliary stators 287, thereby forming the stator 280.

At least one part of the stator 280 may be covered by the insulator 294 for electrical insulation.

Referring to FIGS. 22A and 22B, the expanded core portions 284a and 289a and the air gap 284b may be formed in the rotor accommodating space 291 formed in the stator 280 coupled with the insulator 294 so that the rotor 272 is inserted into the air gap 284b, and the resting housing 242 may fix the motor 270 as a module.

More specifically, both surfaces of the motor 270 may be respectively rested on the front resting portion 254 of the front resting housing 250 and the rear resting portion 264 of the rear resting housing 260 and the front auxiliary resting portion 255, and the side surfaces of the motor 270 may be rested on the front resting protrusion 256 and the rear resting protrusion 266.

Also, the rotor axis 172a may pass through the through hole of the resting housing 242, so that the concentric axis of the rotor 272 is aligned with that of the stator 280 when the motor 270 is rested on and coupled with the resting housing 242.

The front resting housing 250 may be coupled with the rear resting housing 260 by the screws 248, and a method of coupling the front resting housing 250 with the rear resting housing 260 is not limited to this.

Through this process, the motor 270 and the resting housing 242 may be provided as the motor module 240.

Referring to FIG. 21, the motor module 240 may be coupled with the resting hole 226 of the second housing 220. More specifically, the body coupling portion 252 of the front resting housing 250 may be coupled with the resting hole 226 of the second housing 220.

In the front portion of the motor module 240, the impeller 230 may be coupled on the rotor axis 272a. More specifically, the impeller 230 may be disposed on the impeller resting portion 253 of the front resting housing 250.

The first housing 210 may be coupled with the front portion of the second housing 220. In the inner surface of the first housing 210, the shroud 212 may be disposed to form a flow path in the inside of the housing 202, together with the impeller 230 and the diffuser 222.

Behind the motor module 240, the capacitors 298b may be disposed in the disposition space 292 of the motor 270, and the circuit board 298 may be coupled with the rear portion of the motor module 240 such that the electric elements do not interfere with the motor 270. More specifically, the motor module 240 may be physically coupled with the circuit board 298 by a circuit coupling member coupled with the insulator 294, and the coil 299 provided in the motor 270 may be electrically coupled with the circuit board 298.

By coupling the motor module 240 with the housing 202 and the circuit board 298, the motor assembly 200 can be assembled.

FIG. 27 is a graph showing the performance of a motor according to a second embodiment of the present disclosure.

The horizontal axis represents the phase of a counter electromotive force, and the vertical axis represents the magnitude of the counter electromotive force. A dotted line represents a counter electromotive force for the motor 170 having the pair of stator bodies 182 formed in the first direction W1, in regard of the first embodiment, and a solid line represents a counter electromotive force for the motor 270 in which the stator 280 has the main stator 281 and the auxiliary stator 287, in regard of the second embodiment.

The motor 270 including the auxiliary stator 287 can increase a counter electromotive force, unlike the motor 170 of the first embodiment having no auxiliary stator 287, and accordingly, the motor 270 can easily increase the capacity. Since the motor 270 can easily increase the capacity, it is possible to expand the capacity without stacking an additional stator. That is, the motor 270 can increase the capacity without increasing the size of the stator, which may lead to miniaturization of the motor 270.

Hereinafter, a motor assembly according to a third embodiment of the present disclosure, and a cleaner having the same will be described.

Descriptions for the same components as those of the above-described embodiment will be omitted.

FIG. 28 shows a stator according to a third embodiment of the present disclosure.

In the current embodiment, a stator 380 may have a shape that is different from that of the stator 280 of the second embodiment. The current embodiment is different from the second embodiment, in view of the shape and coupling configuration of the stator 380.

A motor 370 may include a main stator 381 and an auxiliary stator 387.

The auxiliary stator 387 may include an auxiliary stator body 388, and at least one auxiliary core 389 extending from the auxiliary stator body 388.

The auxiliary stator body 388 may have a width that is wider than that of a side core 385 of the adjacent main stator 381, in order to increase the strength of a coupling part at which the main stator 381 is coupled with the auxiliary stator 387. More specifically, the outer surface of the auxiliary stator body 388 may be convex with respect to the inner surface of the auxiliary stator body 388.

A pair of auxiliary cores 389 may face each other with a rotor 372 in between. The auxiliary cores 389 may have a length that is shorter than that of the center core 384, and be arranged in the other direction that is vertical to the one direction. Rotor accommodating space 391 may be formed between the auxiliary cores 389 so that the rotor 372 can rotate in the rotor accommodating space 391. That is, the rotor accommodating space 391 may be formed between the pair of center cores 384 and between the pair of auxiliary cores 389.

In the inner end of each auxiliary core 389 adjacent to the rotor 372, an auxiliary expanded core portion 389a in which the width of the auxiliary core 389 is partially expanded may be formed. More specifically, in the inner end of each auxiliary core 389 facing the rotor 372, the auxiliary expanded core portion 389a may be formed in which the width of the auxiliary core 389 is partially expanded to surround the outer surface of the rotor 372. Between the inner surface of the auxiliary expanded core portion 389a and the outer surface of the rotor 372, an air gap 384b may be formed in which the rotor 372 rotates.

The auxiliary stator 387 may include an air barrier. The air barrier may have great resistance against the flow of a magnetic field to change the flow of the magnetic field, thereby causing the magnetic field to more smoothly flow. In the current embodiment, the air barrier may be formed in the shape of a hole in the auxiliary stator body 388, at the outer portion of the auxiliary stator body 388 than the auxiliary core 389.

In the main stator 381, a coupling groove 386b may be formed at the end of the side core 385 and coupled with the auxiliary stator 387, and a coupling protrusion 388a may be formed in the auxiliary stator 387. The main stator 381 may be coupled with the auxiliary stator 387 when the coupling protrusion 388a is inserted into the coupling groove 386b.

A main stator body 382, a main stator core 383, a main expanded core portion 384a, a stator slot 383a, a main coupling portion 386, and disposition space 392 are the same as the corresponding ones of the above-described embodiments.

Hereinafter, a motor assembly 470 according to a fourth embodiment of the present disclosure, and a cleaner having the same will be described.

Descriptions for the same components as those of the above-described embodiments will be omitted.

FIGS. 29 and 30 are perspective views of a motor module according to a fourth embodiment of the present disclosure, FIG. 31 is a perspective view of a front resting housing according to the fourth embodiment of the present disclosure, FIG. 32 is a perspective view of a rear resting housing according to the fourth embodiment of the present disclosure, FIG. 33 shows a motor according to the fourth embodiment of the present disclosure, and FIG. 34 shows the arrangement of a resting housing and a motor according to the fourth embodiment of the present disclosure.

In the current embodiment, a stator 480 may have a shape that is different from that of the stator 380 of the third embodiment.

The current embodiment is different from the third embodiment, in view of the shape of the stator 480 and the coupling configuration of a resting housing 442.

An auxiliary stator 487 may include an auxiliary stator body 488, and at least one auxiliary core 489 extending from the auxiliary stator body 488.

The auxiliary stator body 488 may have the same width as a side core 485 of the main stator 481. More specifically, the outer surface of the side core 485 may be on the same plane as the outer surface of the auxiliary stator body 488.

Unlike the stators 280 and 380 of the second and third embodiments, no configuration may protrude from the side surface of the stator 480, so that larger disposition space 492 can be formed than in the second and third embodiments, inside the same housing.

A pair of auxiliary cores 489 may face each other with the rotor 472 in between. The auxiliary cores 489 may have a length that is shorter than that of the center core 484, and be arranged in the other direction that is vertical to the one direction. Rotor accommodating space 491 may be formed between the auxiliary cores 489 so that the rotor 472 can rotate in the rotor accommodating space 491. That is, the rotor accommodating space 491 may be formed between the pair of center cores 484 and between the pair of auxiliary cores 489.

In the inner end of each auxiliary core 489 adjacent to the rotor 472, an auxiliary expanded core portion 489a in which the width of the auxiliary core 189 is partially expanded may be formed. More specifically, in the inner end of each auxiliary core 489 facing the rotor 472, an auxiliary expanded core portion 489a may be formed in which the width of the auxiliary core 489 is partially expanded to surround the outer surface of the rotor 472. Between the inner surface of the auxiliary expanded core portion 489a and the outer surface of the rotor 472, an air gap 484b may be formed in which the rotor 472 rotates.

In the main stator 481, a coupling protrusion 488a may be formed at the end of the side core 485 and coupled with the auxiliary stator 487, and in the auxiliary stator 487, a coupling groove 486b may be formed. The main stator 481 may be coupled with the auxiliary stator 487 when the coupling protrusion 488*a* is inserted into the coupling groove 486*b*.

The stator 480 may be fixed by the resting housing 442.

The front resting housing 450 may include a front resting housing body 451, a front resting portion 454, and a front auxiliary resting portion 455. The front resting housing body 451 may have a disk-like shape.

The motor 470 may be rested at the front resting portion 454 on the rear surface of the front resting housing body 451. The stator 480 may be rested and fixed at the front resting portion 454 such that the center of the rotor 472 rotating between the stators 480 is aligned with the rotation center of an impeller. The front resting portion 454 may be disposed on the inside surface of the front resting housing body 451, so that one surface of the motor 470 is rested on the front resting portion 454. That is, the front resting portion 454 may be disposed on the rear surface of the front resting housing body 451.

The shape of the front resting portion 454 is not limited, and in the embodiment of the present disclosure, the front resting portion 454 may protrude from the front resting housing body 451 so that the motor 470 is spaced a predetermined distance apart from the front resting housing body 451 and rested.

The location of the front resting portion 454 is not limited, however, in the embodiment of the present disclosure, since the stator 180 extends in the longitudinal direction, four front resting portions 454 may be disposed to correspond to the edges of the stator 480.

The front auxiliary resting portion 455 may be disposed on the inside surface of the front resting housing 450. The auxiliary stator 487 may be rested on the front auxiliary resting portion 455 so that the center portion of the motor 470 extending in the longitudinal direction can be stably supported.

The front auxiliary resting portion 455 may protrude from the front resting housing body 451. Since a pair of auxiliary stators 487 are disposed, a pair of front auxiliary resting portions 455 may be provided to correspond to the pair of auxiliary stators 487.

The front resting housing 450 may include a front resting protrusion 456. The front resting protrusion 456 may surround at least one part of the outer surface of the stator 480 to prevent the stator 480 from moving in the left or right direction to be dislocated when the motor assembly operates.

The front resting protrusion 456 may further protrude from the front resting housing body 451 than the front resting portion 454 such that the inner side surface can surround the main stator 481. The front resting protrusion 456 may correspond to the main stator 481 together with the front auxiliary resting portion 455, and more specifically, the front resting protrusion 456 may surround the outer surface of the main stator 481.

The front resting protrusion 456 may include a front protrusion resting surface 456*a* on which the side surface of the motor 470 is rested, and a front guide surface 456*b* extending from the front protrusion resting surface 456*a* and formed with an inclination of a predetermined angle toward the inside of the front resting protrusion 456*a* so that the motor 470 can be easily rested on the front resting protrusion 456*a*.

The rear resting housing 460 may be coupled with the front resting housing 450, and the motor 470 may be located between the front resting housing 450 and the rear resting housing 460.

The rear resting housing 460 may include a rear resting housing body 461, a rear resting portion 464, and a rear resting protrusion 466. The rear resting housing body 461 may extend in the longitudinal direction of the stator 480 to correspond to the shape of the stator 480.

The motor 470 may be rested at the rear resting portion 464 on the front surface of the rear resting housing body 461. The stators 480 may be rested on and fixed at the front resting portion 454 such that the center of the rotor 472 rotating between the stators 480 is aligned with the center of the impeller. The rear resting portion 464 may be disposed in the inside surface of the rear resting housing body 461, so that the other surface of the motor 470 is rested on the rear resting portion 464.

The shape of the rear resting portion 464 is not limited, and in the embodiment of the present disclosure, the rear resting portion 464 may protrude from the rear resting housing body 461 so that the motor 470 can be spaced a predetermined distance apart from the rear resting housing body 461 and rested.

The location of the rear resting portion 464 is not limited, however, in the embodiment of the present disclosure, since the stator 480 extends in the longitudinal direction, four rear resting portions 464 may be disposed to correspond to the edges of the stator 480.

A rear auxiliary resting portion 465 may be disposed on the inside surface of the rear resting housing 460. The auxiliary stator 487 may be rested on the rear auxiliary resting portion 465 so that the center portion of the motor 470 extending in the longitudinal direction can be stably supported.

The rear auxiliary resting portion 465 may protrude from the rear resting housing body 461, and since the pair of auxiliary stators 487 is disposed, a pair of rear auxiliary resting portions 465 may be disposed to correspond to the pair of auxiliary stators 487.

The rear resting protrusion 466 may protrude along the circumference of the rear resting portion 464 from the body of the rear resting portion 460, such that the inner side surface of the rear resting protrusion 466 surrounds the motor 470. In the inner side surface of the rear resting protrusion 466, a rear guide surface 467*b* may be formed with an inclination of a predetermined angle to guide the motor 470 to be easily rested on the rear resting portion 464 when the motor 470 is coupled with the rear resting protrusion 466. More specifically, the rear surface of the motor 470 may be rested on the rear resting portion 464, and the side surface of the motor 470 may be rested on a rear protrusion resting surface 467*a* of the rear resting protrusion 466. In the rear resting protrusion 466, the rear guide surface 467*b* may be formed to guide the motor 470 to be easily rested on the rear resting portion 464. The rear guide surface 467*b* may be formed in the end of the rear resting protrusion 466 in such a way to be inclined at a predetermined angle and connected to the rear protrusion resting surface 467*a*.

The front resting housing 450 and the rear resting housing 460 may have screw holes 451*b* and 461*b*, respectively, so that the front resting housing 450 can be coupled with the rear resting housing 460 using screws 448.

A front through hole 451*a* and a rear through hole 461*a* may be formed in the centers of the front resting housing 450 and the rear resting housing 460 so that the rotor axis 472*a* can pass through the front through hole 451*a* and the rear through hole 461*a*.

A main stator body 482, a main stator core 483, and a main expanded core portion 484*a* are the same as the corresponding ones of the above-described embodiments.

Hereinafter, a motor assembly according to a fifth embodiment of the present disclosure, and a cleaner having the same will be described.

Descriptions for the same components as those of the above-described embodiment will be omitted.

FIG. 35 is a view showing a motor according to a fifth embodiment of the present disclosure.

The current embodiment is different from the first embodiment, in view of the shape of a stator 580. In the current embodiment, a pair of stators 580 may be coupled with each other in the other direction which is different from the one direction. More specifically, the pair of stators 580 may be disposed in one direction being a longitudinal direction with respect to a rotor 572, however, the pair of stators 580 may be coupled with each other in the other direction.

The stator 580 may include a stator body 582, a stator core 584, and an expanded core portion 585*a*.

A pair of stator bodies 582 may be formed longitudinally along one direction such that both ends of the stator bodies 582 can be coupled with each other. That is, in order to couple the stator bodies 582 with each other, a coupling groove 586*b* may be formed in the end of any one of the stator bodies 582, and a coupling protrusion 586*a* may be formed in the end of the other one of the stator bodies 582. By coupling the pair of stator bodies 582 with each other, rotor accommodating space 587*a* for accommodating the rotor 572 may be formed in the center area of the pair of stator bodies 582.

The stator core 584 may include a center core 585 and a side core 586.

The center core 585 may be disposed in the center portion of the stator body 582, and extend from the stator body 582. In the first embodiment, the center core 185 is disposed along the one direction being the longitudinal direction of the stator 180, however, in the current embodiment, the center core 585 may be formed along the other direction of the stator body 582. A pair of center cores 585 may be disposed to face each other with respect to the rotor 572, and rotor accommodating space 587*a* may be formed between the pair of center cores 585 so that the rotor 572 can rotate in the rotor accommodating space 587*a*.

In the inner end of each center core 585 adjacent to the rotor 572, an expanded core portion 585*a* in which the width of the center core 585 is partially expanded may be formed. More specifically, in the inner end of each center core 584 facing the rotor 572, the expanded core portion 585*a* may be formed in which the width of the center core 585 is partially expanded to surround the outer surface of the rotor 572. Between the inner surface of the expanded core portion 585*a* and the outer surface of the rotor 572, an air gap may be formed in which the rotor 572 rotates.

The side core 586 may be disposed along the one direction of the stator body 582, and a pair of side cores 586 may be formed to both sides of the stator body 582 with the center core 585 in between. Through the configuration, the plurality of side cores 586 may face each other when the stator bodies 582 are coupled with each other.

Hereinafter, a motor assembly according to a sixth embodiment of the present disclosure, and a cleaner having the same will be described.

Descriptions for the same components as those of the above-described embodiment will be omitted.

FIG. 36 shows a motor according to a sixth embodiment of the present disclosure.

In the current embodiment, a stator 680 may have the same shape as the stator 580 of the fifth embodiment, and a coupling method of the stator 680 may be different from that of the stator 580.

In the fifth embodiment, the stator bodies 582 may include the coupling grooves 586*b* and the coupling protrusions 586*a* to couple the stators 580 with each other, however, in the current embodiment, a pair of stators 680 may each include a fixing surface 683 for coupling.

The fixing surface 683 may be formed concavely in both ends of a stator body 682, and the section of the fixing surface 683 may be in the shape of an arc. If the stators 680 contact to face each other, the fixing surfaces 683 may be connected to each other so that the section of the fixing surfaces 683 is in the shape of a semicircle.

In the fixing surface 683 made after the stators 680 contact for coupling, a fixing protrusion may be formed to prevent the stators 680 from moving in one direction. The fixing protrusion may extend from the resting housing of the above-described embodiment, or the side surface of a screw for coupling of the resting housing may function as the fixing protrusion.

The stators 680 may be fixed in the other direction by the resting housing of the above-described embodiment, which is not described in the current embodiment.

Hereinafter, a motor assembly according to a seventh embodiment of the present disclosure, and a cleaner having the same will be described.

The current embodiment is different from the first embodiment, in view of the configuration of a magnet cover 776.

FIG. 37 is a view for describing a method of manufacturing a rotor according to a seventh embodiment of the present disclosure.

In the first embodiment, by rolling the magnet cover 176 to surround the outer surface of the magnet 173, and then hardening the magnet cover 176, the magnet cover 176 is provided to surround the magnet 176.

In the current embodiment, the magnet cover 776 may include a cover body 776*a* formed in the shape of a ribbon.

The cover body 776*a* may be twisted around the outer surface of the magnet 773. The cover body 776*a* may be twisted to become the magnet cover 776 surrounding the outer surface of the magnet 773. The cover body 776*a* may be twisted to correspond to the length of the magnet 773, and accordingly, the cover body 776*a* may be applied in various ways according to the length of the magnet 773.

The cover body 776*a* may be twisted directly around the outer surface of the magnet 773. Or, the cover body 776*a* may be wound around a jig in the shape of a round bar and then hardened to manufacture the magnet cover 776, and the magnet cover 776 may cover the outer surface of the magnet 773. The magnet cover 776 may be firmly fixed on the magnet 773 by an adhesive.

Hereinafter, a motor assembly according to an eighth embodiment of the present disclosure, and a cleaner having the same will be described.

Descriptions for the same components as those of the above-described embodiment will be omitted.

FIG. 38 is a front view of a stator according to an eighth embodiment of the present disclosure, and FIG. 39 shows electromagnetic flow of the stator according to the eighth embodiment of the present disclosure.

A stator 880 may electromagnetically interact with the rotor 172.

A pair of stator bodies 882 may be disposed in the first direction W1 to face each other with the rotor 172 in between. That is, the stator bodies 882 may be disposed longitudinally to face each other. The stator 880 may surround the rotor 172 such that the length of the stator 880 in the first direction W1 is longer than the length of the stator 880 in a second direction W2 that is vertical to the first direction W1, instead of being disposed in the shape of a circle along the outer surface of the rotor 172. That is, if the length of the stator 880 in the first direction W1 is L1 and the length of the stator 880 in the second direction W2 is L2, L1 is longer than L2.

Each stator body 882 may include at least one stator core 884. The stator core 884 may include a center core 885, and a side core 886 disposed to the side of the center core 885.

A pair of center cores 885 may be disposed to face each other with respect to the rotor 172, and rotor accommodating space 887a may be formed between the pair of center cores 885 so that the rotor 172 can rotate in the rotor accommodating space 887a. A pair of side cores 886 may be located to both sides of each center core 885 in such a way to be arranged in parallel to the center core 885.

A plurality of stator slots 887b may be formed between the stator cores 884. If the coil 895 is wound around the stator cores 884, the coil 895 may be accommodated in the stator slots 887b. In the inner end of each stator core 884 adjacent to the rotor 172, an expanded core portion 885a in which the width of the stator core 884 is partially expanded may be formed. More specifically, in the inner end of each center core 885 facing the rotor 172, the expanded core portion 885a may be formed in which the width of the center core 885 is partially expanded to surround the outer surface of the rotor 172. Between the inner surface of the expanded core portion 885a and the outer surface of the rotor 172, an air gap 885b may be formed in which the rotor 172 rotates.

The stator 880 may be configured such that the stator bodies 882 are symmetrical to face each other.

The pair of expanded core portions 885a formed at the ends of the pair of center cores 885 around the rotor 172 may be configured such that the centers of the inner curved surfaces of the expanded core portions 185a are misaligned from each other. More specifically, the center of the inner surface of any one of the pair of expanded core portions 885a surrounding the outer surface of the rotor 172 may be misaligned with the center of the inner surface of the other one of the pair of expanded core portions 885a. Through the configuration, the pair of expanded core portions 885a surrounding the rotor 172 may apply electromagnetic effects with different magnitudes and in different directions to the rotor 172 so that the rotor 172 can rotate in any one direction.

The side cores 886 of any one stator body 882 of the pair of stator bodies 882 may be spaced apart from the side cores 886 of the other stator body 882 of the pair of stator bodies 882. That is, the pair of stator bodies 882 may face each other, with the rotor 172 in between, without being coupled with each other.

Each side core 886 may include a core curved portion 886c. The core curved portion 886c may be curved from the end of the side core 886 toward the rotor 172. The core curved portion 886c may be located close to the rotor 172, to reduce an air gap between the side core 886 and the rotor 172. The end of the core curved portion 886c may surround a part of the outer surface of the rotor 172 to reduce the air gap between the side core 886 and the rotor 172. That is, the end of the core curved portion 886c may be curved to correspond to the outer surface of the rotor 172.

The center core 885 may be thicker than the side core 886 located to both sides of the center core 885, in consideration of electromagnetic flow of the stator 880 and the rotor 172.

The shape of the core curved portion 886c is not limited, as long as it is curved from the side core 886 such that the end of the side core 886 is close to the rotor 172.

FIG. 39 is a view for describing the flow of a magnetic field of the stator according to the eighth embodiment of the present disclosure. If current is supplied, the stator 880 may electromagnetically interact with the rotor 172 to form a magnetic field. The magnetic field may be formed in the stator 880 and the rotor 272 due to a change in polarity by rotation of the rotor 272.

Hereinafter, a motor assembly according to a ninth embodiment of the present disclosure, and a cleaner having the same will be described.

Descriptions for the same components as those of the above-described embodiment will be omitted.

FIG. 40 is a front view of a stator according to a ninth embodiment of the present disclosure.

A stator 980 may include a main stator 981 and an auxiliary stator 987.

The main stator 981 may include a main stator body 982, and at least one main stator core 983 extending from the main stator body 982.

A pair of main stator bodies 982 may be disposed in the first direction W1 to face each other with the rotor 172 in between. That is, the stator bodies 982 may be disposed longitudinally to face each other. The main stator 981 may surround the rotor 172 such that the length of the main stator 981 in the first direction W1 is longer than the length of the main stator 981 in the second direction W2 that is vertical to the first direction W1, instead of being disposed in the shape of a circle along the outer surface of the rotor 172. That is, if the length of the stator 980 in the first direction W1 is L1 and the length of the stator 980 in the second direction W2 is L2, L1 is longer than L2.

The main stator core 983 may include a center core 984, and a side core 985 located to the side of the center core 984.

A pair of center cores 984 may be disposed to face each other with the rotor 172 in between, and rotor accommodating space 991 may be formed between the pair of center cores 984 so that the rotor 172 can rotate in the rotor accommodating space 991. A pair of side cores 985 may be located to both sides of each center core 984 to be arranged in parallel to the center core 984.

A plurality of stator slots 983a may be formed between the center cores 984 and between the side cores 985. If a coil 999 is wound around the center core 984, the coil 999 may be accommodated in the stator slots 983a. In the inner end of each center core 984 adjacent to the rotor 172, a main expanded core portion 984a in which the width of the center core 984 is partially expanded may be formed. More specifically, in the inner end of each center core 984 facing the rotor 172, the main expanded core portion 984a may be formed in which the width of the center core 984 is partially expanded to surround the outer surface of the rotor 172. Between the inner surface of the main expanded core portion 984a and the outer surface of the rotor 172, an air gap 984b may be formed in which the rotor 172 rotates.

A pair of auxiliary stators 987 may electromagnetically interact with the rotor 172 together with the main stator 981. The pair of auxiliary stators 987 may face each other with the rotor 172 in between, and may be arranged in the other direction that is vertical to the one direction. The pair of auxiliary stators 987 may face each other with the rotor 172 in between, between the pair of main stator bodies 982.

The auxiliary stators 987 may include an auxiliary stator body 988, and at least one auxiliary core 989 extending from the auxiliary stator body 988.

The auxiliary stator body 988 may have the same width as that of the side core 985 of the main stator 981. More specifically, the outer surface of the side core 985 may be disposed on the same plane as the outer surface of the auxiliary stator body 988.

A pair of auxiliary cores 989 may face each other with the rotor 272 in between. The auxiliary cores 989 may have a length that is shorter than that of the center core 984, and be arranged in the other direction that is vertical to the one direction. Rotor accommodating space 991 may be formed between the auxiliary cores 989 so that the rotor 172 can rotate in the rotor accommodating space 991. That is, the rotor accommodating space 991 may be formed between the pair of center cores 984 and between the pair of auxiliary cores 989.

In the inner end of each auxiliary core 989 adjacent to the rotor 172, an auxiliary expanded core portion 989a in which the width of the auxiliary core 989 is partially expanded may be formed. More specifically, in the inner end of each auxiliary core 989 facing the rotor 272, the auxiliary expanded core portion 989a may be formed in which the width of the auxiliary core 989 is partially expanded to surround the outer surface of the rotor 172. Between the inner surface of the auxiliary expanded core portion 989a and the outer surface of the rotor 172, an air gap 984b may be formed in which the rotor 172 rotates.

Each auxiliary stator 987 may include an air barrier 987a formed in the shape of a hole in the auxiliary stator body 988, and a bridge 987b.

If the motor is driven, magnetic flux passing the auxiliary stator 987 may be formed by electromagnetic interaction of the stator 980 and the rotor 172, and among the magnetic flux passing through the auxiliary stator 987, leakage magnetic flux that does not act valid when it passes from one end of the auxiliary stator 987 to the other end of the auxiliary stator 987 may be generated.

Therefore, by disposing the air barrier 987a in the auxiliary stator body 988, and forming the bridge 987b to the outer side of the air barrier 987a, the bridge 987b being thinner than the adjacent auxiliary stator body 988, such leakage magnetic flux can be minimized. The air barrier 987a may be formed in the shape of a hole in the auxiliary stator body 988.

Although not shown in the drawings, by including a bracket (not shown) that is vertical to the stator 980 through the air barrier 987a, it is possible to enhance the durability of the stator 980 or to firmly fix the stator 980.

In the current embodiment, each auxiliary stator body 988 includes a single air barrier 987a and a single bridge 987b, however, the numbers of the air barrier 987a and the bridge 987b are not limited.

Hereinafter, a motor assembly according to a tenth embodiment of the present disclosure, and a cleaner having the same will be described.

Descriptions for the same components as those of the above-described embodiment will be omitted.

FIG. 41 is a front view of a stator according to a tenth embodiment of the present disclosure.

The current embodiment is different from the eighth embodiment, in view of the shape of the side cores of the stator.

A stator 1080 may electromagnetically interact with the rotor 172.

A pair of stator bodies 1082 may be disposed in the first direction W1 to face each other with the rotor 172 in between. That is, the stator bodies 1082 may be disposed longitudinally to face each other. The stator 1080 may surround the rotor 172 such that the length of the stator 1080 in the first direction W1 is longer than the length of the stator 880 in the second direction W2 that is vertical to the first direction W1, instead of being disposed in the shape of a circle along the outer surface of the rotor 172. That is, if the length of the stator 1080 in the first direction W1 is L1 and the length of the stator 1080 in the second direction W2 is L2, L1 is longer than L2.

Each stator body 1082 may include at least one stator core 1084. The stator core 1084 may include a center core 1085, and a side core 1086 located to the side of the center core 1085.

A pair of center cores 1085 may be disposed to face each other with the rotor 172 in between, and rotor accommodating space 1087a may be formed between the pair of center cores 1085 so that the rotor 172 can rotate in the rotor accommodating space 1087a. A pair of side cores 1086 may be located to both sides of each center core 1085 to be arranged in parallel to the center core 1085.

A plurality of stator slots 1087b may be formed between the stator cores 1084. If a coil 1095 is wound around the stator cores 1084, the coil 1095 may be accommodated in the stator slots 1087b. In the inner end of each stator core 1084 adjacent to the rotor 172, an expanded core portion 1085a in which the width of the stator core 1084 is partially expanded may be formed. More specifically, in the inner end of each center core 1085 facing the rotor 172, the expanded core portion 1085a may be formed in which the width of the center core 1085 is partially expanded to surround the outer surface of the rotor 172. Between the inner surface of the expanded core portion 1085a and the outer surface of the rotor 172, an air gap 1085b may be formed in which the rotor 172 rotates.

The stator 1080 may be configured such that the stator bodies 1082 are symmetrical to face each other.

The pair of expanded core portions 1085a formed at the ends of the pair of center cores 1085 around the rotor 172 may be configured such that the centers of the inner curved surfaces of the expanded core portions 1085a are misaligned from each other. More specifically, the center of the inner surface of any one of the pair of expanded core portions 1085a surrounding the outer surface of the rotor 172 may be misaligned with the center of the inner surface of the other one of the pair of expanded core portions 1085a. Through the configuration, the pair of expanded core portions 1085a surrounding the rotor 172 may apply electromagnetic effects with different magnitudes and in different directions to the rotor 172 so that the rotor 172 can rotate in any one direction.

The side cores 1086 of any one stator body 1082 of the pair of stator bodies 1082 may be spaced apart from the side cores 1086 of the other stator body 1082 of the pair of stator bodies 1082. That is, the pair of stator bodies 1082 may face each other, with the rotor 172 in between, without being coupled with each other.

The thickness of the end of each side core 1086 may be thinner than that of the other portion of the side core 1086. If the surface of the side core 1086 facing the center core 1085 is an inner surface 1086a, and the opposite surface of the inner surface 1086a is an outer surface 1086e, the end of the side core 1086 may be formed concavely such that the outer surface 1086d is inclined toward the inner surface 1086e. That is, the side core 1086 may include a core concave surface 1086f that is concave with respect to the outer surface 1086e of the other portion of the side core 1086.

The capacitor 198 may be installed outside the side core 1086, and in order to ensure the disposition space 188 in the case of installing a larger capacity of capacitor 198, the core concave surface 1086f may be formed in the side core 1086 to widen space for installing the capacitor 198.

The shape of the core concave surface 1086f is not limited, however, in the embodiment of the present disclosure, the core concave surface 1086f may be formed in the shape of a curved surface in consideration of the outer appearance of the capacitor 198. In the embodiment of the present disclosure, the core concave surface 1086f may be formed in the end of the side core 1086, however, the core concave surface 1086f may be formed at any location as long as it is formed in at least one portion of the outer surface 1086e of the side core 1086.

Since the center core 1085 and the side core 1086 are arranged in parallel to each other in the same direction, a coil can be easily wound around the stator 1080.

Hereinafter, a motor assembly according to an eleventh embodiment, and a cleaner having the same will be described.

Descriptions for the same components as those of the above-described embodiment will be omitted.

FIG. 42 is a front view of a stator according to the eleventh embodiment of the present disclosure.

A stator 1180 may electromagnetically interact with the rotor 172.

The stator 1180 may include a stator body 1182, an insulator 1190, and a coil 1195.

A pair of stator bodies 1182 may be disposed in the first direction W1 to face each other with the rotor 172 in between. That is, the stator bodies 1182 may be disposed longitudinally to face each other. The stator 1180 may surround the rotor 172 such that the length of the stator 1180 in the first direction W1 is longer than the length of the stator 1180 in the second direction W2 that is vertical to the first direction W1, instead of being disposed in the shape of a circle along the outer surface of the rotor 172. That is, if the length of the stator 1180 in the first direction W1 is L1 and the length of the stator 1180 in the second direction W2 is L2, L1 is longer than L2.

Each stator body 1182 may include at least one stator core 1184. The stator core 1184 may include a center core 1185, and a side core 1186 located to the side of the center core 1185.

A pair of center cores 1185 may be disposed to face each other with the rotor 172 in between, and rotor accommodating space 1187a may be formed between the pair of center cores 1185 so that the rotor 172 can rotate in the rotor accommodating space 887a. A pair of side cores 1186 may be located to both sides of each center core 885 to be arranged in parallel to the center core 1185.

A plurality of stator slots 1187b may be formed between the stator cores 1184. If a coil 1195 is wound around the stator cores 1184, the coil 1195 may be accommodated in the stator slots 1187b. In the inner end of each stator core 1184 adjacent to the rotor 172, an expanded core portion 1185a in which the width of the stator core 1184 is partially expanded may be formed. More specifically, in the inner end of each center core 1185 facing the rotor 172, the expanded core portion 1185a may be formed in which the width of the center core 1185 is partially expanded to surround the outer surface of the rotor 172. Between the inner surface of the expanded core portion 1185a and the outer surface of the rotor 172, an air gap 1185b may be formed in which the rotor 172 rotates.

The stator 1180 may be configured such that the stator bodies 1182 are symmetrical to face each other.

A pair of expanded core portions 1185a formed in the ends of the pair of center cores 1185 positioned around the rotor 172 may have steps at the inner surfaces. More specifically, the inner surface 1185b of each of the pair of expanded core portions 1185a may include a first surface 1185ba facing the rotor 172, and a second surface 1185bb further spaced from the rotor 172 than the first surface 1185ba and stepped from the first surface 1185ba. An inner step portion 1185bc may be formed between the first surface 1185ba and the second surface 1185bb so that the first surface 1185ba and the second surface 1185bb can be positioned at different distances from the rotor 172. Since a part of each expanded core portion 1185a is positioned closer to the rotor 172 than the other part of the expanded core portion 1185a in order to rotate the rotor 172, starting torque may be generated to rotate the rotor 172 in any one direction when the stator 1180 electromagnetically interacts with the rotor 172. Since the first surface 1185ba is stepped from the second surface 1185bb, starting torque can be reliably generated.

The widths of the first surface 1185ba and the second surface 1185bb and the depth of the inner step portion 1185ba are not limited, as long as the first surface 1185ba and the second surface 1185bb are formed at different distances from the rotor 172.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A motor assembly comprising:
   a rotor; and
   a stator configured to electromagnetically interact with the rotor to rotate the rotor with respect to the stator,
   wherein the stator comprises a first stator part and a second stator part, the first stator part and the second stator part facing each other so that the rotor is configured to rotate therebetween, and
   wherein each of the first stator part and the second stator part comprises:
   a stator body;
   side cores extended from both ends of the stator body, the side cores being parallel to each other; and
   a center core extended from the stator body and disposed between the side cores, the center core comprising an expanded core portion expanded outward at an end of the center core so that an inner surface of the expanded core portion surrounds an outer surface of the rotor, and the expanded core portion having a width wider than a width of the center core; and
   auxiliary stators respectively having an auxiliary core, the auxiliary core having a length that is shorter than a length of the center core and disposed to face each other with the rotor in between, and
   wherein the side cores are coupled with the auxiliary stators so that when coupled, the auxiliary stators are disposed between the side cores of the first stator part and the side core of the second stator part, and coupling parts disposed on an end of the side cores where the auxiliary stators are coupled to, are thicker than other parts of the side cores.

2. The motor assembly according to claim 1, wherein the center core of the first stator part and the center core of the second stator part disposed in a first direction to face each other with the rotor in between.

3. The motor assembly according to claim 2, further comprising disposition space formed along a second direction of the stator, the second direction being perpendicular to the first direction.

4. The motor assembly according to claim 2, wherein the auxiliary cores disposed in a second direction to face each other, the second direction being perpendicular to the first direction.

5. The motor assembly according to claim 3, wherein the disposition space is formed on a same plane as the stator.

6. The motor assembly according to claim 3, further comprising a circuit board having a capacitor disposed in the disposition space to avoid interference with the stator, and disposed on a rear surface of the stator in such a way to be vertical to a rotation axis of the rotor.

7. The motor assembly according to claim 4, wherein the auxiliary stators are disposed between the first stator part and the second stator part.

8. The motor assembly according to claim 4, wherein the auxiliary core comprises an auxiliary expanded core having a wider width than the auxiliary core such that an inner surface of the auxiliary expanded core surrounds the outer surface of the rotor.

9. The motor assembly according to claim 1, wherein when the first stator part and the second stator part are coupled together, a space is formed between the first stator part and the second stator part to accommodate the rotor.

10. The motor assembly according to claim 9, wherein one of the side cores of the first stator part and the second stator part comprises a coupling groove formed concavely at an end thereof, and an other one of the side cores of the first stator part and the second stator part comprises a coupling protrusion corresponding to the coupling groove so that the first stator part and the second stator part are coupled with each other by the coupling protrusion and the corresponding coupling groove.

11. The vacuum cleaner according to claim 1, wherein closed shape coils are to be wound around the center cores of the first stator part and the second stator part, respectively.

12. The motor assembly according to claim 1, the inner surface of the expanded core portion has a width wider than the width of the center core.

13. The motor assembly according to claim 1, wherein a distance between one of the side cores and the expanded core portion is smaller than a distance between the one of the side cores and the center core.

14. A motor assembly comprises:
a rotor; and
a stator configured to electromagnetically interact with the rotor to rotate the rotor with respect to the stator,
wherein the stator comprises:
a main stator having a first stator part and a second stator part, the first stator part and the second stator part facing each other so that the rotor is configured to rotate therebetween,
wherein each of the first stator part and the second stator part comprises:
a stator body;
side cores extended from both ends of the stator body, the side cores being parallel to each other; and
a center core extended from the stator body and disposed between the side cores, the center core comprising an expanded core portion expanded at an end of the center core so that an inner surface of the expanded core portion surrounds an outer surface of the rotor, and the expanded core portion having a width wider than a width of the center core; and
auxiliary stators disposed to face each other so that the rotor is configured to rotate therebetween, and respectively having an auxiliary core, the auxiliary core having a length that is shorter than a length of the center core, and disposed between the a first stator part and a second stator part, and
wherein coupling parts disposed on an end of the side cores where the auxiliary stators are coupled to are coupled with the auxiliary stator is thicker than other parts of the side cores.

15. The motor assembly according to claim 14, wherein each auxiliary core comprises an auxiliary expanded core portion having a wider width than the auxiliary core such that an inner surface of the auxiliary expanded core portion surrounds the outer surface of the rotor.

16. The motor assembly according to claim 14, wherein the stator comprises:
disposition space formed on a same plane as the main stator and the auxiliary stators, and
wherein the stator further comprises a circuit board having a capacitor disposed in the disposition space to avoid interference with the stator, and disposed on a rear surface of the stator in such a way to be vertical to a rotation axis of the rotor.

17. The vacuum cleaner according to claim 14, wherein closed shape coils are to be wound around the center cores of the first stator part and the second stator part, respectively.

18. A vacuum cleaner comprises:
a main body having a suction portion, and a filter configured to filter out dust contained in air entered through the suction portion;
a motor assembly disposed on a downstream with respect to the filter inside the main body, and configured to generate a suction force,
wherein the motor assembly comprises:
a housing having an air inlet in a front portion and an air outlet in a rear portion, the housing being in a shape of a cylinder;
an impeller disposed inside the housing, and configured to generate the suction force in the suction portion; and
a motor disposed on a rear surface of the impeller, and configured to transfer power to the impeller,
wherein the motor comprises:
a rotor coupled with the impeller, and configured to rotate on a rotor axis extending in a front-back direction;
a stator having a first stator part and a second stator part, the first stator part and the second stator part facing each other, and configured to electromagnetically interact with the rotor so that the rotor is configured to rotate therebetween, and
wherein each of the first stator part and the second stator part comprises:
a stator body;
side cores extended from both ends of the stator body, the side cores being parallel to each other; and
a center core extended from the stator body and disposed between the side cores the center core comprising an expanded core portion expanded outward at an end of the center core so that an inner surface of the expanded core portion surrounds an outer surface of the rotor, and the stator cores of the first stator part and the second stator part are disposed on a same line; and auxiliary stators respectively having an auxiliary core, the auxiliary core having a length that is shorter than a length of the center core and disposed to face each other with the rotor in between, and wherein the side cores are coupled with the auxiliary stators so that when coupled, the auxiliary stators are disposed between the side cores of the first stator part and the side core of the second stator part, and coupling parts disposed on an end of the side cores where the auxiliary stators are coupled to are thicker than other parts of the side cores.

19. The vacuum cleaner according to claim 18, wherein the motor further comprises disposition space disposed on a same plane as the stator.

20. The vacuum cleaner according to claim 18, further comprising a circuit board having a capacitor disposed in the disposition space to avoid interference with the stator, and disposed on a rear surface of the stator in such a way to be vertical to a rotation axis of the rotor.

21. The vacuum cleaner according to claim 18, wherein a pair of closed shape coils to be wound around the pair of the center cores, respectively.

* * * * *

UNITED STATES PATENT AND TRADEMARK OFFICE
CERTIFICATE OF CORRECTION

PATENT NO. : 10,916,975 B2
APPLICATION NO. : 15/317644
DATED : February 9, 2021
INVENTOR(S) : Keun Young Yoon It is certified that error appears in the above-identified patent and that said Letters Patent is hereby corrected as shown below:

In the Claims

Column 44, Line 12:
In Claim 14, delete "the a" and insert --the--, therefor.

Column 43, Line 44:
In Claim 11, delete "vacuum cleaner" and insert --motor assembly--.

Column 44, Line 32:
In Claim 17, delete "vacuum cleaner" and insert --motor assembly--.

Signed and Sealed this
Twenty-sixth Day of April, 2022

Katherine Kelly Vidal
*Director of the United States Patent and Trademark Office*